(12) United States Patent
Kuriki

(10) Patent No.: US 8,686,308 B2
(45) Date of Patent: Apr. 1, 2014

(54) CONDUCTIVE SHEET AND CAPACITIVE TOUCH PANEL

(75) Inventor: Tadashi Kuriki, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 207 days.

(21) Appl. No.: 13/111,098

(22) Filed: May 19, 2011

(65) Prior Publication Data

US 2011/0290631 A1 Dec. 1, 2011

(30) Foreign Application Priority Data

May 27, 2010 (JP) ................................. 2010-121865
Dec. 22, 2010 (JP) ................................. 2010-286253

(51) Int. Cl.
*H03K 17/975* (2006.01)

(52) U.S. Cl.
USPC ............ 200/600; 200/512; 345/174; 345/175

(58) Field of Classification Search
None
See application file for complete search history.

(56) References Cited

U.S. PATENT DOCUMENTS

| | | | |
|---|---|---|---|
| 5,113,041 A | 5/1992 | Blonder et al. | |
| 7,202,855 B2 | 4/2007 | Shigetaka et al. | |
| 7,202,859 B1 | 4/2007 | Speck et al. | |
| 8,269,744 B2 | 9/2012 | Agari et al. | |
| 2004/0239650 A1 | 12/2004 | Mackey | |
| 2012/0146942 A1 * | 6/2012 | Kamoshida et al. | 345/174 |
| 2012/0293457 A1 | 11/2012 | Agari et al. | |

FOREIGN PATENT DOCUMENTS

| | | |
|---|---|---|
| JP | 05-224818 A | 9/1993 |
| JP | 2003-099185 A | 4/2003 |
| JP | 2010-086684 A | 4/2010 |
| JP | 2010097536 A | 4/2010 |
| WO | 95/27334 A1 | 10/1995 |
| WO | 97/18508 A1 | 5/1997 |
| WO | 2010/013679 A1 | 2/2010 |

OTHER PUBLICATIONS

Rejection of the Application, dated Dec. 11, 2012, issued in corresponding JP Application No. 2011-104845, 7 pages in English and Japanese.

* cited by examiner

*Primary Examiner* — Renee Luebke
*Assistant Examiner* — Ahmed Saeed
(74) *Attorney, Agent, or Firm* — Sughrue Mion, PLLC

(57) ABSTRACT

First conductive patterns, which each contain two or more first large lattices electrically connected by a first connection in series in a first direction, are formed on a first transparent substrate, and second conductive patterns, which each contain two or more second large lattices electrically connected by a second connection in series in a second direction perpendicular to the first direction, are formed on a second transparent substrate. As viewed from above, the first conductive patterns and the second conductive patterns are arranged adjacent to each other, and the first connection and the second connection are arranged facing each other. The first large lattices are electrically connected via three or more connection paths in the first connection, and the second large lattices are electrically connected via three or more connection paths in the second connection.

20 Claims, 27 Drawing Sheets

FIG. 17
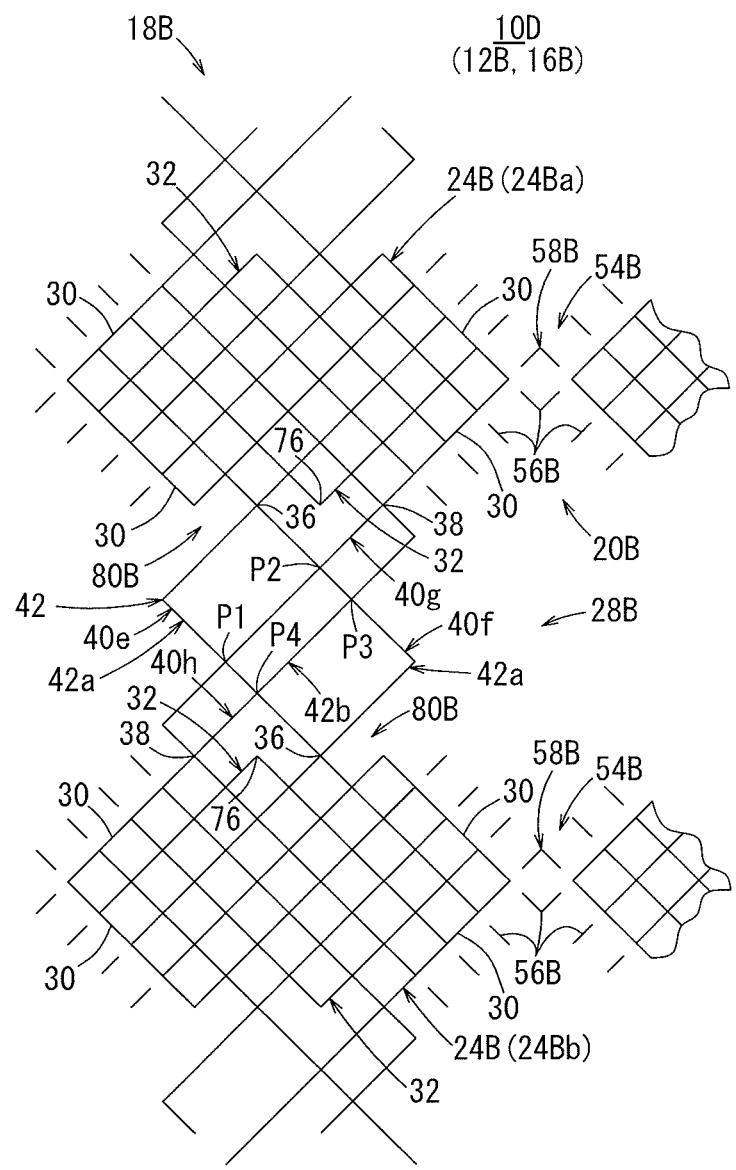
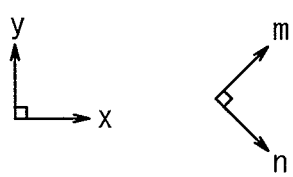

CONDUCTIVE SHEET AND CAPACITIVE TOUCH PANEL

CROSS-REFERENCE TO RELATED APPLICATION

This application is based upon and claims the benefit of priority from Japanese Patent Applications No. 2010-121865 filed on May 27, 2010 and No. 2010-286253 filed on Dec. 22, 2010, of which the contents are incorporated herein by reference.

BACKGROUND OF THE INVENTION

1. Field of the Invention

The present invention relates to a conductive sheet and a capacitive touch panel, for example suitable for use in a projected capacitive touch panel.

2. Description of the Related Art

Touch panels have attracted much attention in recent years. For example, some touch panels, which use ITO (indium tin oxide) as an electrode material to make an electrode matrix less visible, have been disclosed (see, Japanese Laid-Open Patent Publication Nos. 2010-086684 and 05-224818, etc.)

Though the touch panel has currently been used mainly in small devices such as PDAs (personal digital assistants) and mobile phones, it is expected to be used in large devices such as personal computer displays.

The conventional electrode is composed of the ITO (indium tin oxide) and therefore has a high resistance of about several hundred ohm/sq. Thus, when the conventional touch panel is used in the large device in the above future trend, the large-sized touch panel has a low current transfer rate between the electrodes, and thereby exhibits a low response speed (taking a long time to detect the position touched with a finger tip).

A large number of lattices made of thin wires of a metal (thin metal wires) may be arranged to form an electrode with a lowered surface resistance. Touch panels using the electrode of the thin metal wires are known from International Publication No. WO 97/018508, Japanese Laid-Open Patent Publication No. 2003-099185, U.S. Pat. No. 5,113,041, International Publication No. WO 95/027334, U.S. Patent Application Publication No. 2004/0239650, U.S. Pat. No. 7,202,859, International Publication No. WO 2010/013679, etc.

Conductive sheets according to International Publication No. WO 97/018508, Japanese Laid-Open Patent Publication No. 2003-099185, U.S. Pat. No. 5,113,041 (FIG. 1a), and International Publication No. WO 95/027334 each have a first conductive pattern formed by arranging a large number of the thin metal wires in the vertical direction, a second conductive pattern formed by arranging a large number of the thin metal wires in the horizontal direction, and an insulating layer disposed between the first and second conductive patterns.

Conductive sheets according to U.S. Patent Application Publication No. 2004/0239650 and U.S. Pat. No. 7,202,859 each have a first conductive pattern formed by arranging the thin metal wires each having a plurality of S-shaped portions in the vertical direction and a second conductive pattern formed by arranging the thin metal wires each having a plurality of S-shaped portions in the horizontal direction.

A touch switch according to International Publication No. WO 2010/013679 has a substrate, a plurality of first electrodes arranged at regular intervals on one surface of the substrate, and a plurality of second electrodes arranged at regular intervals on the other surface of the substrate, and the first and second electrodes are arranged into a lattice pattern. The touch switch is attached to the front of a display device.

In addition, in International Publication No. WO 2010/013679, the first electrode shown in FIG. 7 has a plurality of sensing sections each containing a combination of a plurality of small lattices. The sensing sections are connected via two connection paths of conductive wires in a connection part.

However, in the above examples, when one thin metal wire is broken, an address associated with the broken wire cannot be recognized disadvantageously. In the touch switch of International Publication No. WO 2010/013679, the sensing sections of the first electrode are connected only via two connection paths. Therefore, it is highly probable that both the two connection paths are broken to completely disconnect the sensing sections.

SUMMARY OF THE INVENTION

In view of the above problems, an object of the present invention is to provide a conductive sheet and a capacitive touch panel, which can have a lower probability of complete disconnection between sensing sections as compared with conventional ones, can have a low-resistance conductive pattern on a substrate, and can exhibit an improved visibility, an improved touch position detection sensitivity, and an improved detection accuracy.

[1] A conductive sheet according to a first aspect of the present invention, comprising a substrate, a first conductive part formed on one main surface of the substrate, and a second conductive part formed on the other main surface of the substrate, wherein the first conductive part contains two or more first conductive patterns that each contain two or more first sensing sections electrically connected in series in a first direction by a first connection and are arranged in a second direction perpendicular to the first direction, the second conductive part contains two or more second conductive patterns that each contain two or more second sensing sections electrically connected in series in the second direction by a second connection and are arranged in the first direction, the first and second sensing sections each contain a combination of two or more small lattices, the first conductive patterns are arranged adjacent to the second conductive patterns as viewed from above, the first and second connections are arranged facing each other with the substrate interposed therebetween, the first sensing sections are electrically connected via three or more connection paths in the first connection, and the second sensing sections are electrically connected via three or more connection paths in the second connection.

[2] The conductive sheet according to the first aspect, wherein the first connection contains three or more conductive wires connecting one or more vertices of the small lattices in one first sensing section and one or more vertices of the small lattices in another first sensing section, and the second connection contains three or more conductive wires connecting one or more vertices of the small lattices in one second sensing section and one or more vertices of the small lattices in another second sensing section.

[3] The conductive sheet according to the first aspect, wherein the first connection contains first and second conductive wire portions connecting one or more vertices of the small lattices in one first sensing section and one or more vertices of the small lattices in another first sensing section, a third conductive wire portion connecting another vertex of the small lattices in the one first sensing section and the first conductive wire portion, and a fourth conductive wire portion connecting another vertex of the small lattices in the other first sensing section and the second conductive wire portion, and the second connection contains fifth and sixth conductive wire portions connecting one or more vertices of the small lattices in one second sensing section and one or more vertices of the small lattices in another second sensing section, a seventh conductive wire portion connecting another vertex of the small lattices in the one second sensing section and the fifth conductive wire portion, and an eighth conductive wire portion connecting another vertex of the small lattices in the other second sensing section and the sixth conductive wire portion.

[4] The conductive sheet according to the first aspect, wherein the first conductive part further contains a first auxiliary pattern containing a plurality of first auxiliary wires around a side of the first sensing sections, the second conductive part further contains a second auxiliary pattern containing a plurality of second auxiliary wires around a side of the second sensing sections, and the first and second auxiliary patterns overlap with each other to form a combined pattern between the first and second conductive patterns as viewed from above.

[5] The conductive sheet according to the first aspect, wherein the combined pattern contains a combination of two or more small lattices.

[6] The conductive sheet according to the first aspect, wherein the first sensing sections and the second sensing sections have substantially the same size or have different sizes.

[7] The conductive sheet according to the first aspect, wherein the first sensing sections are formed of substantially square large lattices and the second sensing sections are formed of substantially rectangular large lattices.

[8] A conductive sheet according to a second aspect of the present invention, comprising a substrate and a conductive part formed on a main surface thereof, wherein the conductive part contains two or more conductive patterns that each contain two or more sensing sections composed of a thin metal wire electrically connected in series in a first direction by a connection composed of a thin metal wire and are arranged in a second direction perpendicular to the first direction, the sensing sections each contain a combination of two or more small lattices, and the sensing sections are electrically connected via three or more connection paths in the connection.

[9] The conductive sheet according to the second aspect, wherein when Na represents the number of the thin metal wires extending from contact points between one sensing section and the connection into the connection, Nb represents the number of the thin metal wires extending between a plurality of intersection points in the connection, Nc represents the number of the thin metal wires extending from contact points between the other adjacent sensing section and the connection into the connection, and N represents the number of the connection paths between the adjacent two sensing sections, the conductive sheet satisfies $N=Na\times(Nb+Nc-1)$.

[10] The conductive sheet according to the second aspect, wherein the connection contains a quadrangular portion arranged in a predetermined connection direction between the adjacent two sensing sections, the quadrangular portion contains a first quadrangular portion having the opposite thin metal wires at a distance La and a second quadrangular portion having the opposite thin metal wires at a distance Lb, and the quadrangular portion satisfies La>Lb.

[11] The conductive sheet according to the second aspect, wherein the distance Lb is equal to a side length of the small lattices.

[12] The conductive sheet according to the second aspect, wherein the quadrangular portion satisfies $1.2\times Lb \leq La \leq 3.0\times Lb$.

[13] The conductive sheet according to the second aspect, wherein the quadrangular portion satisfies $La=2\times Lb$.

[14] The conductive sheet according to the second aspect, wherein the first quadrangular portion is arranged on each side of the second quadrangular portion.

[15] The conductive sheet according to the second aspect, wherein the connection contains a protrusion composed of a thin metal wire perpendicularly extending from a side, the length of the side being 3 or more times larger than a side length of the small lattices.

[16] The conductive sheet according to the second aspect, wherein the protrusion extends toward the inside of the connection.

[17] The conductive sheet according to the second aspect, wherein the protrusion extends outward from the connection.

[18] A conductive sheet according to a third aspect of the present invention, comprising a substrate, a first conductive part formed on one main surface of the substrate, and a second conductive part formed on the other main surface of the substrate, wherein the first conductive part contains two or more first conductive patterns that each contain two or more first pad portions connected by a first connection, the second conductive part contains two or more second conductive patterns that each contain two or more second pad portions connected by a second connection, the first and second conductive patterns are approximately perpendicularly crossed on the connections, the first and second conductive patterns are composed of a thin wire pattern having a line width of 15 μm or less, the first pad portions are electrically connected via three or more connection paths in the first connection, and the second pad portions are electrically connected via three or more connection paths in the second connection.

[19] A capacitive touch panel according to a fourth aspect of the present invention, comprising the conductive sheet according to any one of the first to third aspects.

As described above, in the present invention, the probability of the complete disconnection between the sensing sections or the pads can be lowered as compared with conventional technologies, the resistance of the conductive pattern formed on the substrate can be lowered, the visibility can be improved, and the conductive sheet can be suitably used in a capacitive touch panel or the like.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 17 is a plan view showing a pattern example of a second conductive part formed on a second conductive sheet of the fourth conductive sheet laminate;

DESCRIPTION OF THE PREFERRED EMBODIMENTS

Several embodiments of the conductive sheet and the capacitive touch panel of the present invention will be described below with reference to FIGS. 1 to 27. It should be noted that, in this description, a numeric range of "A to B" includes both the numeric values A and B as the lower limit and upper limit values.

Figure 1:
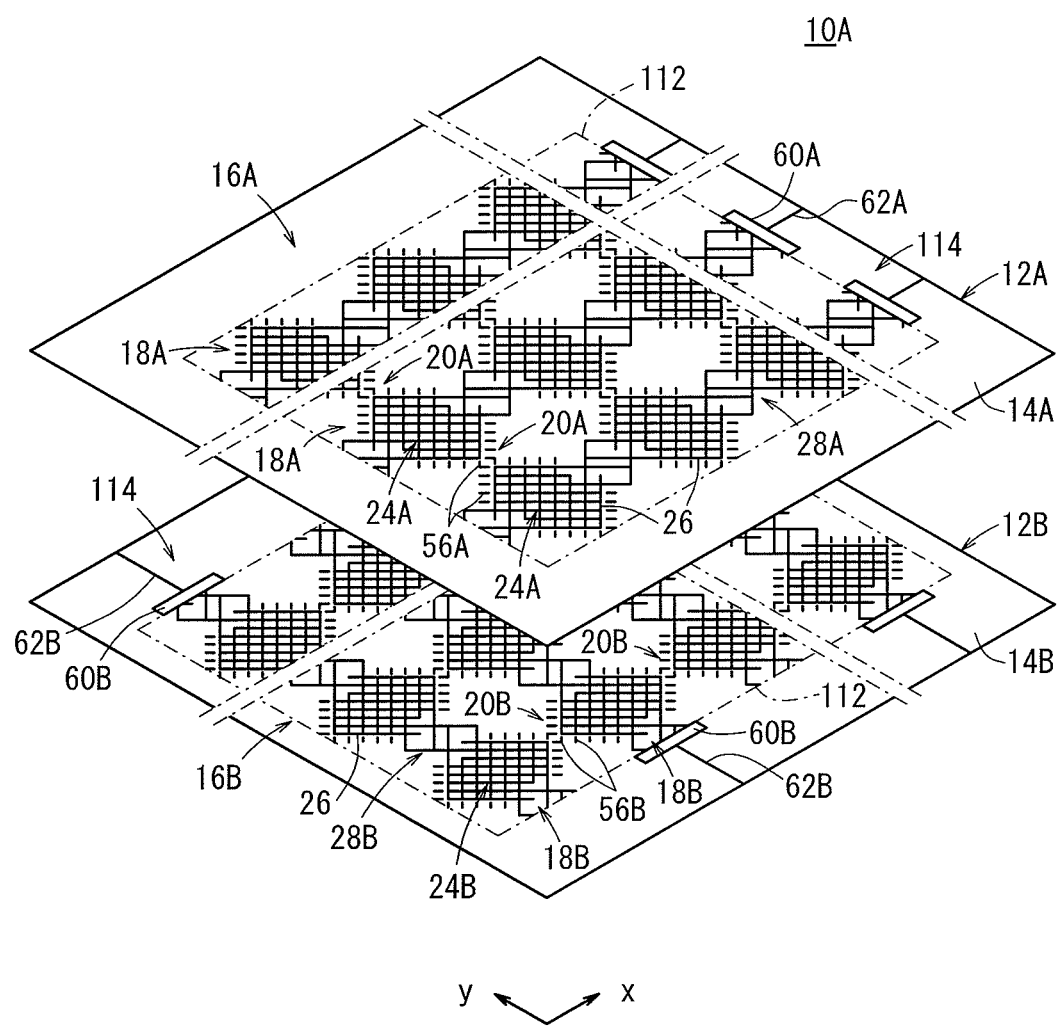
FIG. 1 is an exploded perspective view partially showing a conductive sheet laminate according to a first embodiment (a first conductive sheet laminate)
Figure 2A:
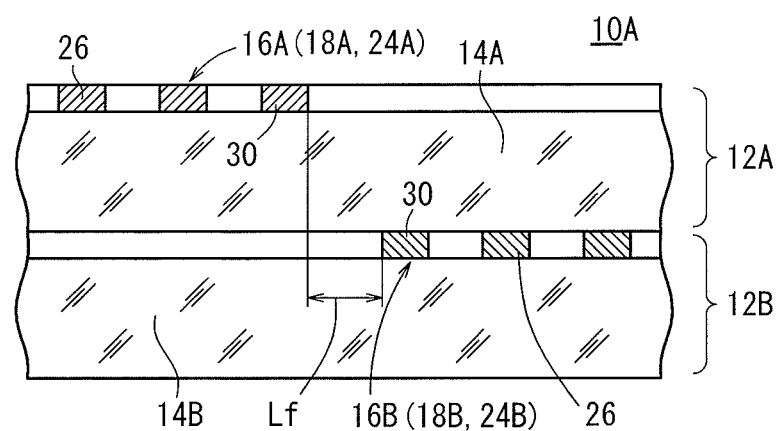
FIG. 2A is a cross-sectional view partially showing an example of the first conductive sheet laminate.

As shown in FIGS. 1 and 2A, a conductive sheet laminate according to a first embodiment (hereinafter referred to as the first conductive sheet laminate 10A) is obtained by stacking a first conductive sheet 12A and a second conductive sheet 12B. For example, an x direction corresponds to the horizontal or vertical direction of a projected capacitive touch panel 100 or a display panel 110 equipped therewith to be hereinafter described (see FIG. 7).

Figure 3:
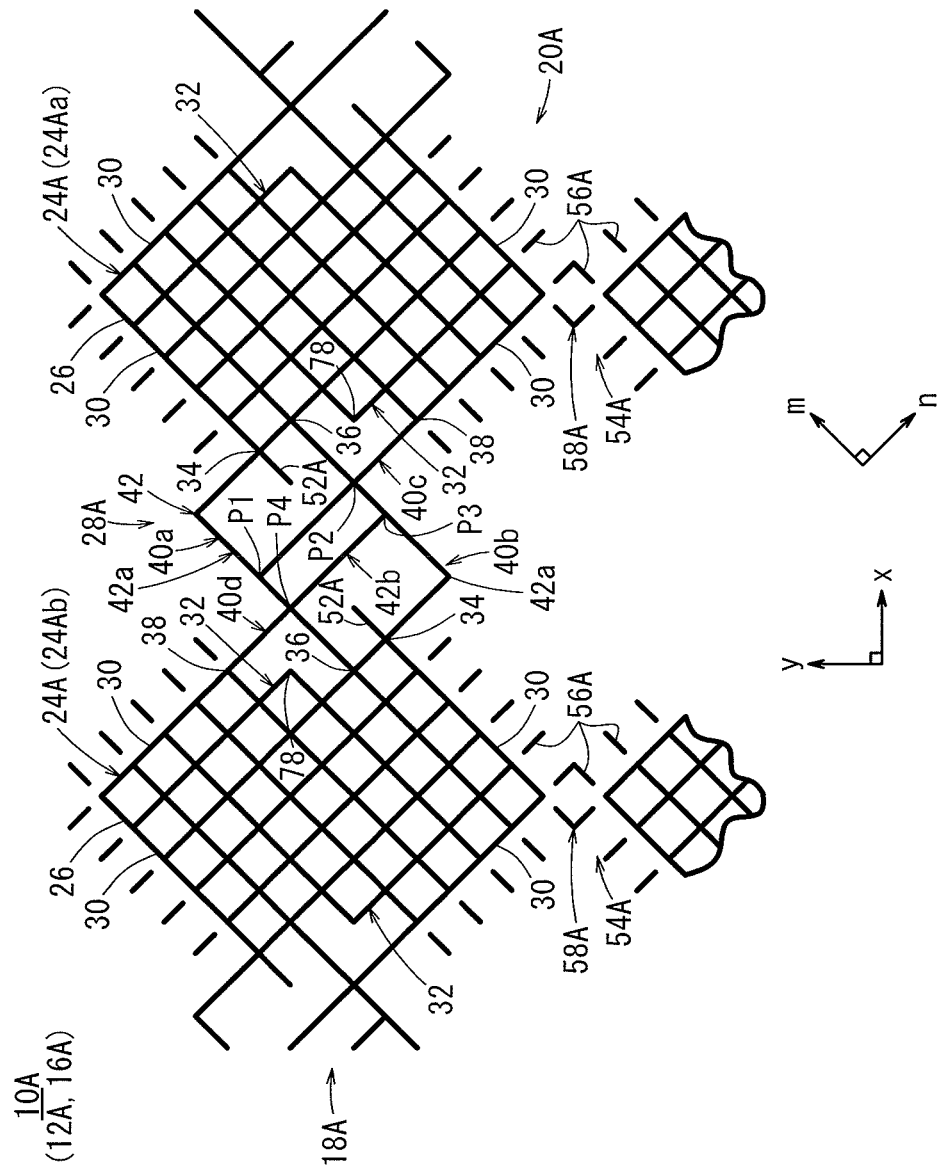
FIG. 3 is a plan view showing a pattern example of a first conductive part formed on a first conductive sheet of the first conductive sheet laminate.

As shown in FIGS. 1 and 3, the first conductive sheet 12A has a first conductive part 16A formed on one main surface of a first transparent substrate 14A (see FIG. 2A). The first conductive part 16A contains two or more first conductive patterns 18A and first auxiliary patterns 20A. The first conductive patterns 18A extend in a first direction (the x direction), are arranged in a second direction (a y direction) perpendicular to the first direction, each contain a large number of lattices, and are composed of a thin metal wire. The first auxiliary patterns 20A are arranged around the first conductive patterns 18A and are composed of a thin metal wire.

The first conductive pattern 18A contains two or more first large lattices (first sensing sections, first pad portions) 24A composed of the thin metal wire. The first large lattices 24A are connected in series in the first direction, and each contain a combination of two or more small lattices 26. The above first auxiliary pattern 20A is formed around a side of the first large lattice 24A and is not connected to the first large lattice 24A. The small lattice 26 is shown as the smallest square in the drawings. First connections 28A are formed between the first large lattices 24A, and each adjacent two of the first large lattices 24A are electrically connected by the first connection 28A. For example, the thin metal wire contains gold (Au), silver (Ag), or copper (Cu). The thin metal wire is hereinafter referred to also as the conductive wire.

As shown in FIG. 3, the first large lattice 24A has a shape provided by a square composed of the small lattices 26 by removing several small lattices 26 (five small lattices 26 in this embodiment) from each corner on a diagonal line of the square. Thus, the first large lattice 24A has four straight sides 30 and two zigzag sides 32.

In this example, the first large lattice 24A and the first connection 28A are connected at three connection points (contact points), i.e. a first contact point 34, a second contact point 36, and a third contact point 38. Among vertices of the small lattices 26 in the first large lattice 24A, the first contact point 34 corresponds to a vertex closest to the adjacent first large lattice 24A. The second contact point 36 corresponds to a vertex adjacent to the first contact point 34 on the zigzag side 32. The third contact point 38 corresponds to a vertex second closest to the adjacent first large lattice 24A, thus to an intersection point between the straight side 30 and the zigzag side 32. Second large lattices 24B to be hereinafter described have the same contact points. When the adjacent two first large lattices 24A are distinguished, one of the first large lattices 24A is represented by a reference sign 24Aa, and the other is represented by a reference sign 24Ab.

The first connection 28A has a first conductive wire portion 40a having an L-shaped with one corner for connecting the first contact point 34 of the one first large lattice 24Aa and the second contact point 36 of the other first large lattice 24Ab, and further has a second conductive wire portion 40b having an L-shaped with one corner for connecting the first contact point 34 of the other first large lattice 24Ab and the second contact point 36 of the one first large lattice 24Aa. One rectangular portion 42 is formed by the first conductive wire portion 40a and the second conductive wire portion 40b.

A third direction (an m direction) bisects the angle between the first and second directions, and a fourth direction (an n direction) is perpendicular to the third direction. The first connection 28A has a third conductive wire portion 40c extending from the third contact point 38 of the one first large lattice 24Aa to the first conductive wire portion 40a in the fourth direction, and further has a fourth conductive wire portion 40d extending from the third contact point 38 of the other first large lattice 24Ab to the second conductive wire portion 40b in the fourth direction. In addition, the first connection 28A has an intersection point P1 between the first conductive wire portion 40a and the third conductive wire portion 40c, an intersection point P2 between the second conductive wire portion 40b and the third conductive wire portion 40c, an intersection point P3 between the second conductive wire portion 40b and the fourth conductive wire portion 40d, and an intersection point P4 between the first conductive wire portion 40a and the fourth conductive wire portion 40d. Thus, in the first connection 28A, the rectangular portion 42 contains a first rectangle 42a adjacent to the one first large lattice 24Aa having the first contact point 34, the second contact point 36, the first intersection point P1, and the second intersection point P2, a second rectangle 42b having the first to fourth intersection points P1 to P4, and a first rectangle 42a adjacent to the other first large lattice 24Ab having the first contact point 34, the second contact point 36, the third intersection point P3, and the fourth intersection point P4.

In the first rectangle 42a, the long side is 3 times longer than the side of the small lattice 26, and the short side is 2 times longer than the side of the small lattice 26. On the other hand, in the second rectangle 42b, the long side is 3 times longer than the side of the small lattice 26, and the short side has the same length as the side of the small lattice 26. Thus, when the thin metal wires (the long sides) of the first rectangle 42a are arranged facing each other at a distance La and the thin metal wires (the long sides) of the second rectangle 42b are arranged facing each other at a distance Lb, the rectangular portion 42 satisfies La>Lb and preferably satisfies $1.2 \times Lb \leq La \leq 3.0 \times Lb$. In this example, the distance Lb is equal to the side length of the small lattice 26 as described above, and the rectangular portion 42 satisfies La=2×Lb.

Figure 4:
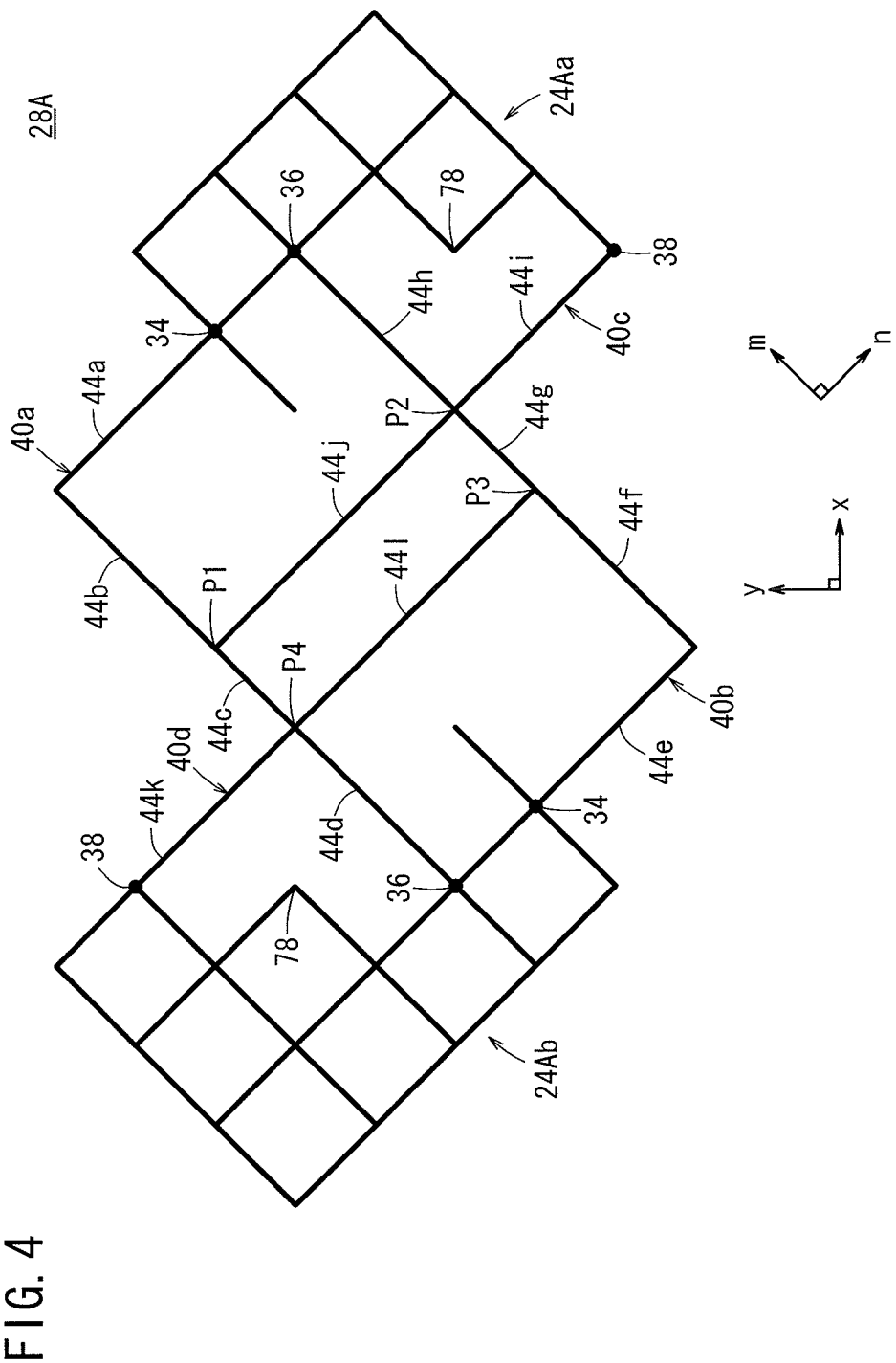
FIG. 4 is an enlarged plan view showing a first connection of FIG. 3.

As shown in FIG. 4, the first conductive wire portion 40a contains a first conductive wire 44a extending from the first contact point 34 of the one first large lattice 24Aa in the fourth direction, a second conductive wire 44b extending from the end of the first conductive wire 44a to the first intersection point P1 in the third direction, a third conductive wire 44c connecting the first intersection point P1 and the fourth intersection point P4, and a fourth conductive wire 44d connecting the fourth intersection point P4 and the second contact point 36 of the other first large lattice 24Ab.

The second conductive wire portion 40b contains a fifth conductive wire 44e extending from the first contact point 34 of the other first large lattice 24Ab in the fourth direction, a sixth conductive wire 44f extending from the end of the fifth conductive wire 44e to the third intersection point P3 in the third direction, a seventh conductive wire 44g connecting the third intersection point P3 and the second intersection point P2, and an eighth conductive wire 44h connecting the second intersection point P2 and the second contact point 36 of the one first large lattice 24Aa.

The third conductive wire portion 40c contains a ninth conductive wire 44i connecting the third contact point 38 of the one first large lattice 24Aa and the second intersection point P2, and a tenth conductive wire 44j connecting the second intersection point P2 and the first intersection point P1.

The fourth conductive wire portion 40d contains an eleventh conductive wire 44k connecting the third contact point 38 of the other first large lattice 24Ab and the fourth intersection point P4, and a twelfth conductive wire 44l connecting the fourth intersection point P4 and the third intersection point P3.

The first connection 28A having the above structure acts to electrically connect the first large lattices 24A via three or more connection paths. Specifically, the first connection 28A has, from the first contact point 34 of the first large lattice 24Aa, the following six connection paths:
(1) a first connection path (12 times longer than the side length of the small lattice) extending from the first contact point 34 of the first large lattice 24Aa through the conductive wires 44a, 44b, 44c, 44l, 44f, and 44e to the first contact point 34 of the first large lattice 24Ab;
(2) a second connection path (12 times longer than the side length of the small lattice) extending from the first contact point 34 of the first large lattice 24Aa through the conductive wires 44a, 44b, 44j, 44g, 44f, and 44e to the first contact point 34 of the first large lattice 24Ab;
(3) a third connection path (7 times longer than the side length of the small lattice) extending from the first contact point 34 of the first large lattice 24Aa through the conductive wires 44a, 44b, 44c, and 44d to the second contact point 36 of the first large lattice 24Ab;
(4) a fourth connection path (13 times longer than the side length of the small lattice) extending from the first contact point 34 of the first large lattice 24Aa through the conductive wires 44a, 44b, 44j, 44g, 44l, and 44d to the second contact point 36 of the first large lattice 24Ab;
(5) a fifth connection path (7 times longer than the side length of the small lattice) extending from the first contact point 34 of the first large lattice 24Aa through the conductive wires 44a, 44b, 44c, and 44k to the third contact point 38 of the first large lattice 24Ab; and
(6) a sixth connection path (13 times longer than the side length of the small lattice) extending from the first contact point 34 of the first large lattice 24Aa through the conductive wires 44a, 44b, 44j, 44g, 44l, and 44k to the third contact point 38 of the first large lattice 24Ab.

The first connection 28A further has six connection paths from each of the second contact point 36 and the third contact point 38 of the first large lattice 24Aa though the detailed explanation thereof is omitted. Consequently, the first connection 28A has eighteen connection paths.

Thus, in general, when N represents the number of the connection paths between the adjacent two large lattices, Na represents the number of the thin metal wires extending from the contact points between the one large lattice and the connection into the connection, Nb represents the number of the thin metal wires extending between the intersection points in the connection, and Nc represents the number of the thin metal wires extending from the contact points between the other large lattice and the connection into the connection, the conductive sheet satisfies N=Na×(Nb+Nc−1).

Figure 5A:
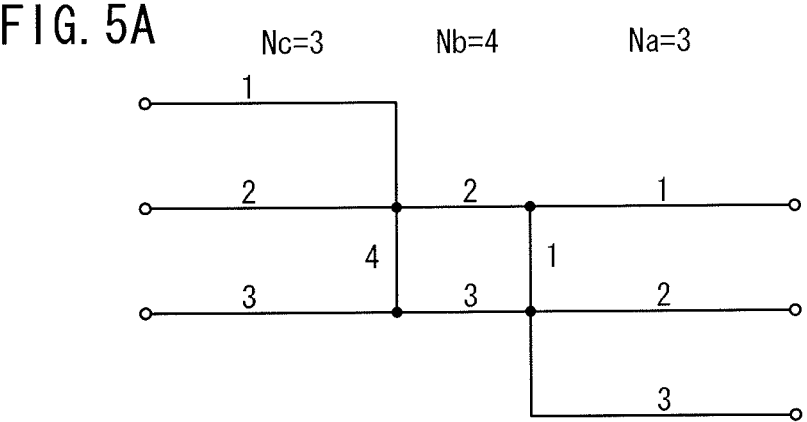
FIG. 5A is an explanatory view showing the connection state of the first connection.

In the example of the first connection 28A shown in FIG. 3, Na is 3, Nb is 4, Nc is 3, and thus N=3×(4+3−1)=18 as shown in FIG. 5A.

Figure 5B:
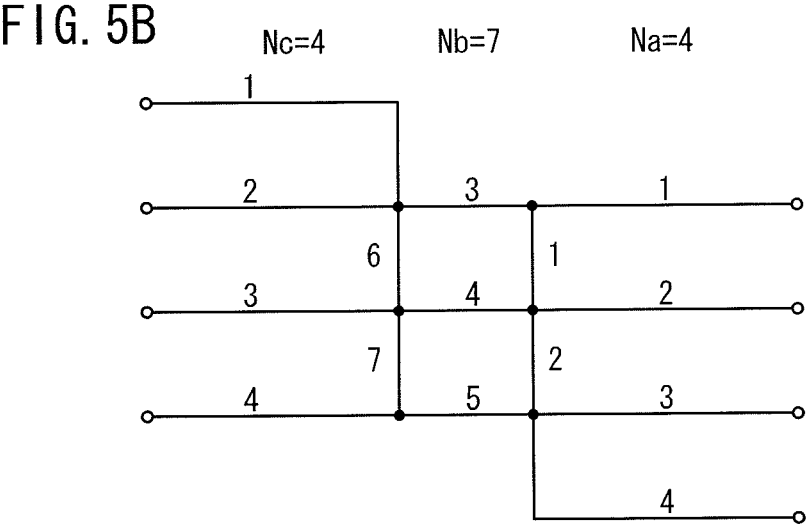
FIG. 5B is an explanatory view showing the connection state of a first variant example of the first connection.
Figure 5C:
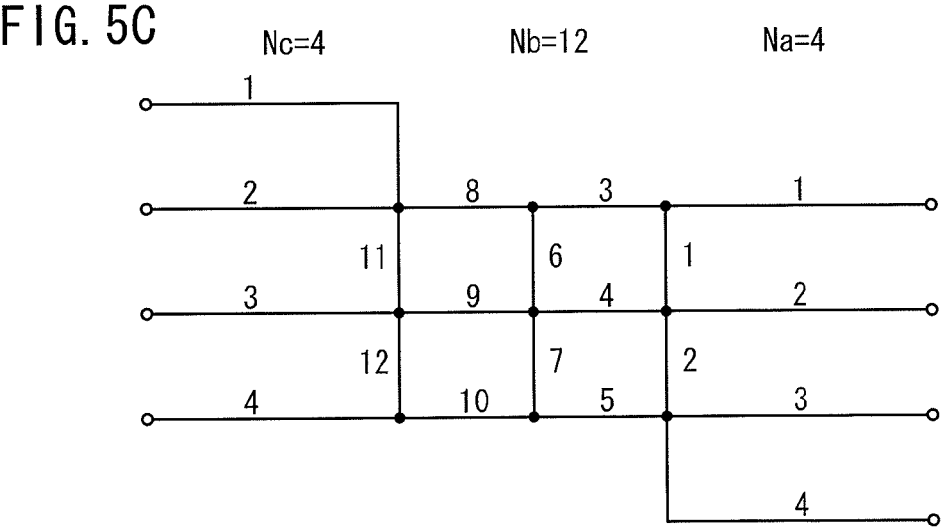
FIG. 5C is an explanatory view showing the connection state of a second variant example of the first connection.

Variant examples of the first connections 28A include those shown in FIGS. 5B and 5C. In the first variant example of FIG. 5B, Na is 4, Nb is 7, Nc is 4, and thus N=4×(7+4−1)=40. In the second variant example of FIG. 5C, Na is 4, Nb is 12, Nc is 4, and thus N=4×(12+4−1)=60.

The first connection 28A further has protrusions composed of the thin metal wire (first protruding wires 52A). Each of the protrusions is perpendicular to the long side of the first rectangle 42a (3 or more times longer than the side of the small lattice 26) and extends from the first contact point 34 on the long side toward the second rectangle 42b. Thus, the protrusion extends toward the inside of the first connection 28A. The length of the first protruding wire 52A is equal to the side length of the small lattice 26.

An electrically isolated first insulation 54A is disposed between the adjacent first conductive patterns 18A.

The first auxiliary pattern 20A contains a plurality of first auxiliary wires 56A having an axis direction parallel to the third direction (arranged along the side of the first large lattice 24A perpendicular to the third direction), a plurality of first auxiliary wires 56A having an axis direction parallel to the fourth direction (arranged along the side of the first large lattice 24A perpendicular to the fourth direction), and two first L-shaped patterns 58A arranged facing each other. Each of the first L-shaped patterns 58A is formed by combining two first auxiliary wires 56A into an L-shaped in the first insulation 54A.

The axis-direction length of each first auxiliary wire 56A is ½ of the inside side length of the small lattice 26. The first auxiliary wire 56A is positioned at a predetermined distance from the first large lattice 24A (a distance equal to ½ of the inside side length of the small lattice 26 in this example).

As shown in FIG. 1, in the first conductive sheet 12A having the above structure, in one end of each first conductive pattern 18A, the first connection 28A is not formed on the open end of the first large lattice 24A. In the other end of the first conductive pattern 18A, the end of the first large lattice 24A is electrically connected to a first terminal wiring pattern 62A composed of a thin metal wire by a first wire connection 60A.

Figure 6:
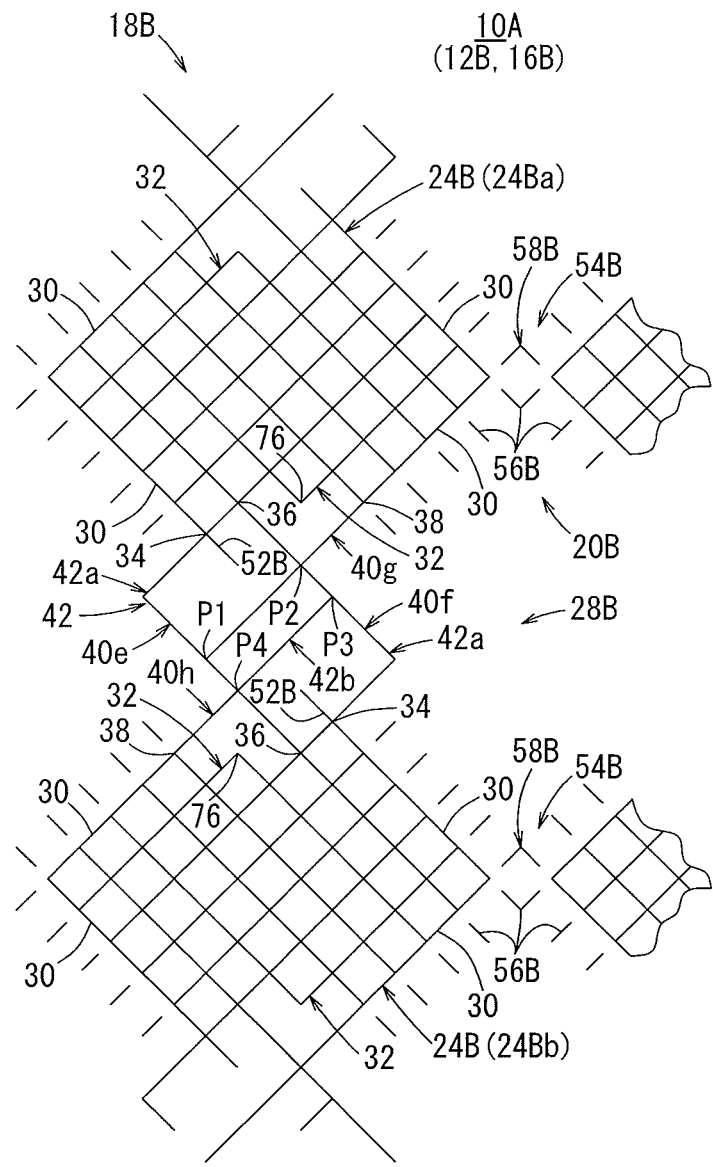
FIG. 6 is a plan view showing a pattern example of a second conductive part formed on a second conductive sheet of the first conductive sheet laminate.

On the other hand, as shown in FIGS. 1 and 6, the second conductive sheet 12B has a second conductive part 16B formed on one main surface of a second transparent substrate 14B (see FIG. 2A). The second conductive part 16B contains two or more second conductive patterns 18B and second auxiliary patterns 20B. The second conductive patterns 18B extend in the second direction (the y direction), are arranged in the first direction (the x direction), each contain a large number of lattices, and are composed of a thin metal wire. The second auxiliary patterns 20B are arranged around the second conductive patterns 18B and are composed of a thin metal wire.

The second conductive pattern 18B contains two or more second large lattices (second sensing sections, second pad portions) 24B composed of the thin metal wire. The second large lattices 24B are connected in series in the second direction, and each contain a combination of two or more small lattices 26. The above second auxiliary pattern 20B is formed around a side of the second large lattice 24B and is not connected to the second large lattice 24B. Second connections 28B are formed between the second large lattices 24B, and each adjacent two of the second large lattices 24B are electrically connected by the second connection 28B.

As shown in FIG. 6, the second large lattice 24B has a shape provided by a square composed of the small lattices 26 from which several small lattices 26 (five small lattices 26 in this embodiment) are removed at each corner on a diagonal line of the square. Thus, the second large lattice 24B has four straight sides 30 and two zigzag sides 32.

When the adjacent two second large lattices 24B are distinguished in the following explanation, one of the second large lattices 24B is represented by a reference sign 24Ba, and the other is represented by a reference sign 24Bb.

The second connection 28B has the same structure as the first connection 28A, and the duplicate explanations thereof are omitted. The second connection 28B has a fifth conductive wire portion 40e having an L-shaped with one corner for connecting the first contact point 34 of the one second large lattice 24Ba and the second contact point 36 of the other second large lattice 24Bb, and further has a sixth conductive wire portion 40f having an L-shaped with one corner for connecting the first contact point 34 of the other second large lattice 24Bb and the second contact point 36 of the one second large lattice 24Ba. One rectangular portion 42 is formed by the fifth conductive wire portion 40e and the sixth conductive wire portion 40f.

The second connection 28B has a seventh conductive wire portion 40g extending from the third contact point 38 of the one second large lattice 24Ba to the fifth conductive wire portion 40e in the fourth direction, and further has an eighth conductive wire portion 40h extending from the third contact point 38 of the other second large lattice 24Bb to the sixth conductive wire portion 40f in the fourth direction.

Though not shown in FIG. 6, the fifth conductive wire portion 40e contains first to fourth conductive wires 44a to 44d in the same manner as the first conductive wire portion 40a, the sixth conductive wire portion 40f contains fifth to eighth conductive wires 44e to 44h in the same manner as the second conductive wire portion 40b, the seventh conductive wire portion 40g contains ninth and tenth conductive wires 44i and 44j in the same manner as the third conductive wire portion 40c, and the eighth conductive wire portion 40h contains eleventh and twelfth conductive wires 44k and 44l in the same manner as the fourth conductive wire portion 40d.

The other components of the second connection 28B are equal to those of the first connection 28A, and the duplicate explanations thereof are omitted.

In the second conductive sheet 12B, an electrically isolated second insulation 54B is disposed between the adjacent second conductive patterns 18B.

The second auxiliary pattern 20B contains a plurality of second auxiliary wires 56B having an axis direction parallel to the fourth direction (arranged along the side of the second large lattice 24B perpendicular to the fourth direction), a plurality of second auxiliary wires 56B having an axis direction parallel to the third direction (arranged along the side of the second large lattice 24B perpendicular to the third direction), and two second L-shaped patterns 58B arranged facing each other. Each of the second L-shaped patterns 58B is formed by combining two second auxiliary wires 56B into an L-shaped in the second insulation 54B.

The axis-direction length of each second auxiliary wire 56B is ½ of the inside side length of the small lattice 26. The second auxiliary wire 56B is positioned at a predetermined distance from the second large lattice 24B (a distance equal to ½ of the inside side length of the small lattice 26 in this example).

As shown in FIG. 1, in the second conductive sheet 12B having the above structure, for example, in one end of each alternate odd-numbered second conductive pattern 18B and in the other end of each even-numbered second conductive pattern 18B, the second connection 28B is not formed for making the open ends of the second large lattice 24B. In the other end of each odd-numbered second conductive pattern 18B and in one end of each even-numbered second conductive pattern 18B, the end of the second large lattice 24B is electrically connected to a second terminal wiring pattern 62B composed of a thin metal wire by a second wire connection 60B.

The side length of each of the first large lattices 24A and the second large lattices 24B (the length of the straight side 30) is preferably 3 to 10 mm, more preferably 4 to 6 mm. When the side length is less than the lower limit, for example in the case of using the first conductive sheet 12A and the second conductive sheet 12B in a touch panel, the first large lattices 24A and the second large lattices 24B exhibit a lowered electrostatic capacitance in the detection process, and the touch panel is likely to cause a detection trouble. On the other hand, when the side length is more than the upper limit, the position detection accuracy may be deteriorated. The side length of each small lattice 26 in the first large lattices 24A and the second large lattices 24B is preferably 50 μm or more, more preferably 50 to 500 μm, further preferably 150 to 300 μm, for the same reasons. When the side length of the small lattice 26 is within this range, the first conductive sheet 12A and the second conductive sheet 12B have high transparency and thereby can be suitably used at the front of a display device with excellent visibility.

The line width of each of the first conductive patterns 18A (the first large lattices 24A and the first connections 28A) and the second conductive patterns 18B (the second large lattices 24B and the second connections 28B) is 1 to 15 μm.

The line width of each of the first auxiliary patterns 20A (the first auxiliary wires 56A) and the second auxiliary patterns 20B (the second auxiliary wires 56B) is 1 to 15 μm, and may be equal to or different from those of the first conductive patterns 18A and the second conductive patterns 18B. It is preferred that the first conductive patterns 18A, the second conductive patterns 18B, the first auxiliary patterns 20A, and the second auxiliary patterns 20B have the same line width.

A touch panel 100 containing the first conductive sheet 12A and the second conductive sheet 12B will be described below with reference to FIG. 7.

The touch panel 100 has a sensor body 102 and a control circuit such as an input circuit (not shown). As shown in FIGS. 1, 2A, and 7, the sensor body 102 contains the above first conductive sheet laminate 10A (the stack of the first conductive sheet 12A and the second conductive sheet 12B) and thereon a protective layer 106 (not shown in FIG. 2A). The first conductive sheet laminate 10A and the protective layer 106 can be disposed on a display panel 110 of a display device 108 such as a liquid crystal display. As viewed from above, the sensor body 102 has a sensor region 112 corresponding to a display screen 110a of the display panel 110 and a terminal wiring region 114 (a so-called frame) corresponding to the periphery of the display panel 110.

As shown in FIG. 1, in the first conductive sheet 12A used in the touch panel 100, the above first conductive patterns 18A are arranged in the sensor region 112, and the first terminal wiring patterns 62A composed of the thin metal wire extend from the first wire connections 60A in the terminal wiring region 114.

Figure 7:
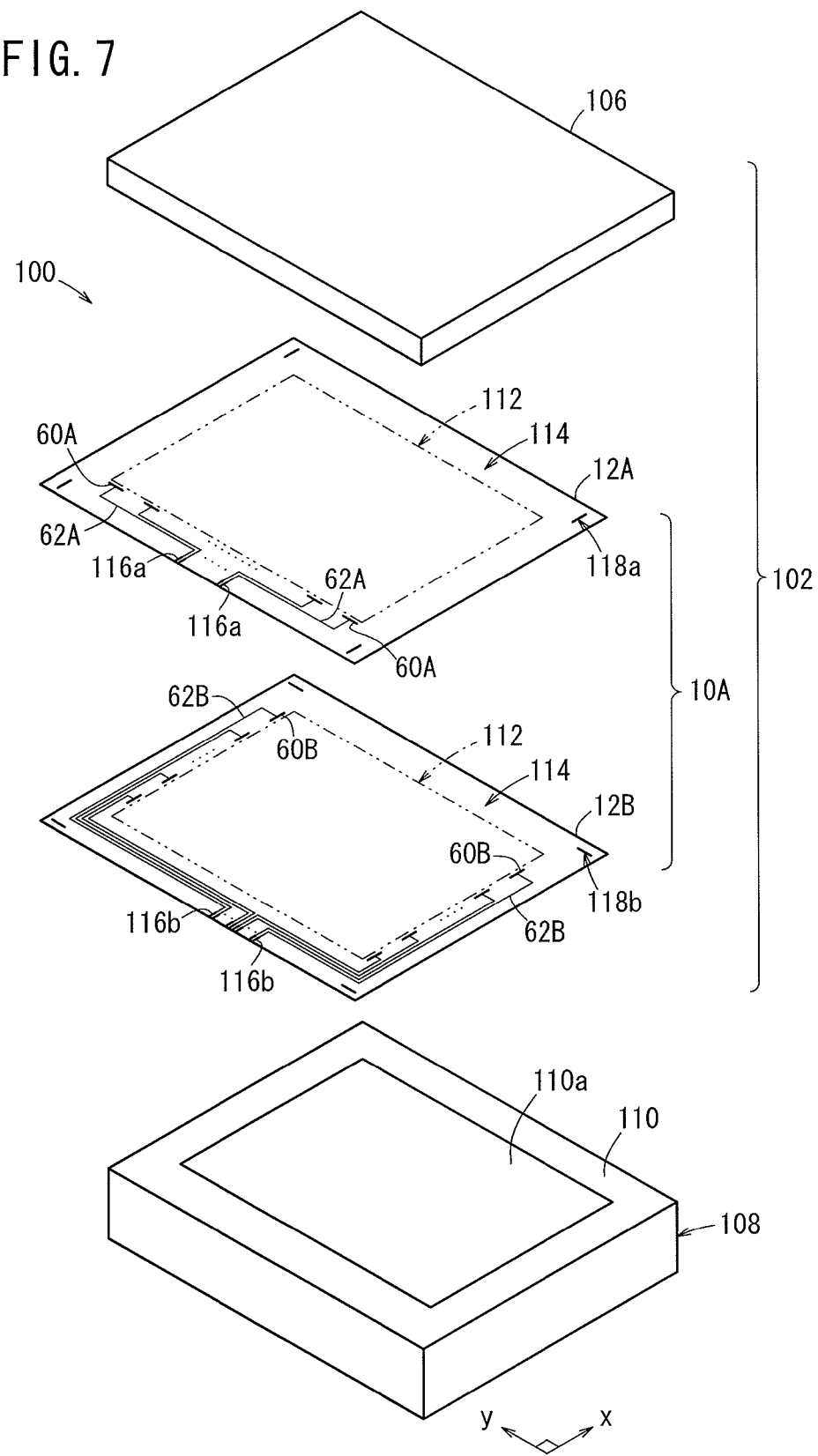
FIG. 7 is a perspective view showing a touch panel using the first conductive sheet laminate.

In the example of FIG. 7, the first conductive sheet 12A and the sensor region 112 each have a rectangular shape as viewed from above. In the terminal wiring region 114, a plurality of first terminals 116a are arranged in the longitudinal center in the length direction of the periphery on one long side of the first conductive sheet 12A. The first wire connections 60A are arranged in a straight line in the y direction along one long side of the sensor region 112 (a long side closest to the one long side of the first conductive sheet 12A). The first terminal wiring pattern 62A extends from each first wire connection 60A to the center of the one long side of the first conductive sheet 12A, and is electrically connected to the corresponding first terminal 116a. Thus, the first terminal wiring patterns 62A, connected to each pair of corresponding first wire connections 60A formed on the right and left of the one long side of the sensor region 112, have approximately the same lengths. Of course, the first terminals 116a may be formed in a corner of the first conductive sheet 12A or in the vicinity thereof. However, in this case, the length difference between the longest first terminal wiring pattern 62A and the shortest first terminal wiring pattern 62A is increased, whereby the longest first terminal wiring pattern 62A and the first terminal wiring patterns 62A in the vicinity thereof are disadvantageously poor in the rate of transferring a signal to the corresponding first conductive pattern 18A. Thus, in this embodiment, the first terminals 116a are formed in the longitudinal center of the one long side of the first conductive sheet 12A, whereby the local signal transfer rate deterioration is prevented to increase the response speed.

Also in the second conductive sheet 12B, the second conductive patterns 18B are arranged in the sensor region 112, and the second terminal wiring patterns 62B extend from the second wire connections 60B in the terminal wiring region 114.

As shown in FIG. 7, in the terminal wiring region 114, a plurality of second terminals 116b are arranged in the longitudinal center in the length direction of the periphery on one long side of the second conductive sheet 12B. For example, the odd-numbered second wire connections 60B are arranged in a straight line in the x direction along one short side of the sensor region 112 (a short side closest to one short side of the second conductive sheet 12B), and the even-numbered second wire connections 60B are arranged in a straight line in the x direction along the other short side of the sensor region 112 (a short side closest to the other short side of the second conductive sheet 12B).

For example, each odd-numbered second conductive pattern 18B is connected to the corresponding odd-numbered second wire connection 60B, and each even-numbered second conductive pattern 18B is connected to the corresponding even-numbered second wire connection 60B. The second terminal wiring patterns 62B extend from the odd-numbered and even-numbered second wire connections 60B to the center of one long side of the second conductive sheet 12B, and are each electrically connected to the corresponding second terminal 116b. Thus, for example, the 1st and 2nd second terminal wiring patterns 62B have approximately the same lengths, and similarly the (2n−1)-th and (2n)-th second terminal wiring patterns 62B have approximately the same lengths (n=1, 2, 3, . . . ).

Of course, the second terminals 116b may be formed in a corner of the second conductive sheet 12B or in the vicinity thereof. However, in this case, as described above, the longest second terminal wiring pattern 62B and the second terminal wiring patterns 62B in the vicinity thereof are disadvantageously poor in the rate of transferring a signal to the corresponding second conductive pattern 18B. Thus, in this embodiment, the second terminals 116b are formed in the longitudinal center of the one long side of the second conductive sheet 12B, whereby the local signal transfer rate deterioration is prevented to increase the response speed.

The first terminal wiring patterns 62A may be arranged in the same manner as the above second terminal wiring patterns 62B, and the second terminal wiring patterns 62B may be arranged in the same manner as the above first terminal wiring patterns 62A.

When the first conductive sheet laminate 10A is used in the touch panel 100, a protective layer is formed on the first conductive sheet 12A, and the first terminal wiring patterns 62A extending from the first conductive patterns 18A in the first conductive sheet 12A and the second terminal wiring patterns 62B extending from the second conductive patterns 18B in the second conductive sheet 12B are connected to a scan control circuit or the like.

A self or mutual capacitance technology can be preferably used for detecting a touch position. In the self capacitance technology, a voltage signal for the touch position detection is sequentially supplied to the first conductive patterns 18A, and further a voltage signal for the touch position detection is sequentially supplied to the second conductive patterns 18B. When a finger comes into contact with or close to the upper surface of the protective layer 106, the capacitance between the first conductive pattern 18A and the second conductive pattern 18B in the touch position and the GND (ground) is increased, whereby signals from this first conductive pattern 18A and this second conductive pattern 18B have waveforms different from those of signals from the other conductive patterns. Thus, the touch position is calculated by a control circuit based on the signals transmitted from the first conductive pattern 18A and the second conductive pattern 18B. On the other hand, in the mutual capacitance technology, for example, a voltage signal for the touch position detection is sequentially supplied to the first conductive patterns 18A, and the second conductive patterns 18B are sequentially subjected to sensing (transmitted signal detection). When a finger comes into contact with or close to the upper surface of the protective layer 106, the stray capacitance of the finger is added in parallel to the parasitic capacitance between the first conductive pattern 18A and the second conductive pattern 18B in the touch position, whereby a signal from this second conductive pattern 18B has a waveform different from those of signals from the other second conductive patterns 18B. Thus, the touch position is calculated by a control circuit based on the order of the first conductive pattern 18A supplied with the voltage signal and the signal transmitted from the corresponding second conductive pattern 18B. Even when two fingers come into contact with or close to the upper surface of the protective layer 106 simultaneously, the touch positions can be detected by using the self or mutual capacitance technology. Conventional related detection circuits used in projected capacitive technologies are described in U.S. Pat. Nos. 4,582,955, 4,686,332, 4,733,222, 5,374,787, 5,543,588, and 7,030,860, U.S. Patent Application Publication No. 2004/0155871, etc.

Figure 8:
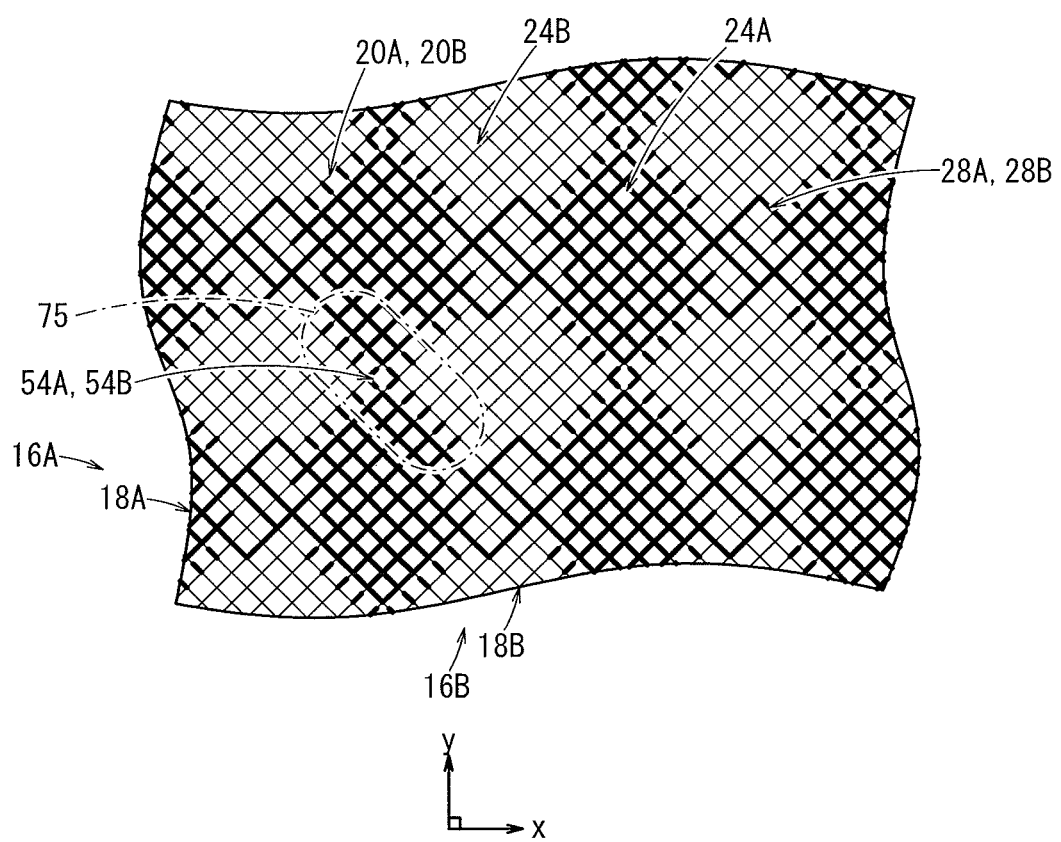
FIG. 8 is a plan view partially showing an example of the first conductive sheet laminate formed by combining the first and second conductive sheets.

For example, as shown in FIG. 8, when the first conductive sheet 12A is stacked on the second conductive sheet 12B to form the first conductive sheet laminate 10A, the first conductive patterns 18A and the second conductive patterns 18B are crossed. Specifically, the first connections 28A of the first conductive patterns 18A and the second connections 28B of the second conductive patterns 18B are arranged facing each other with the first transparent substrate 14A (see FIG. 2A) interposed therebetween, and also the first insulations 54A of the first conductive part 16A and the second insulations 54B of the second conductive part 16B are arranged facing each other with the first transparent substrate 14A interposed therebetween. Though the first conductive patterns 18A and the second conductive patterns 18B are exaggeratingly shown by thick lines and thin lines, respectively, to clearly represent the positions thereof in FIGS. 3, 6, 8 to 15 and 17 to 24, they have the same line width.

When the stacked first conductive sheet 12A and second conductive sheet 12B are observed from above, the spaces between the first large lattices 24A of the first conductive sheet 12A are filled with the second large lattices 24B of the second conductive sheet 12B. Thus, the surface is covered with the large lattices. In this case, the first auxiliary patterns 20A and the second auxiliary patterns 20B overlap with each other to form combined patterns 75 between the first large lattices 24A and the second large lattices 24B.

In the combined pattern 75, the first auxiliary wires 56A and the second auxiliary wires 56B are perpendicularly crossed and do not overlap with each other.

Thus, in the combined pattern 75, the combination of the first auxiliary wires 56A arranged along a side of the first large lattice 24A and the second auxiliary wires 56B arranged along a side of the second large lattice 24B is such that, as viewed from above, one end of each first auxiliary wire 56A (the end farther from the first large lattice 24A) is connected to the straight side 30 of the second large lattice 24B, the other end of each first auxiliary wire 56A (the end closer to the first large lattice 24A) is connected to one end of the second auxiliary wire 56B (the end closer to the second large lattice 24B), and the other end of each second auxiliary wire 56B (the end farther from the second large lattice 24B) is connected to the straight side 30 of the first large lattice 24A, so that a plurality of the small lattices 26 are arrayed. As a result, the boundaries between the first large lattices 24A and the second large lattices 24B can hardly be found.

For example, in the case of not forming the first auxiliary patterns 20A and the second auxiliary patterns 20B, blank areas corresponding to the combined patterns 75 are formed, whereby the edges of the first large lattices 24A and the second large lattices 24B are highly visible, deteriorating the visibility. This problem may be solved by overlapping each straight side 30 of the first large lattices 24A with the corresponding straight side 30 of the second large lattices 24B to prevent the formation of the blank area. However, when the stack position accuracy is slightly deteriorated, the overlaps of the straight lines have large widths (the straight lines are thickened), whereby the boundaries between the first large lattices 24A and the second large lattices 24B are highly visible, deteriorating the visibility.

In contrast, in this embodiment, the first auxiliary wires 56A and the second auxiliary wires 56B are stacked in the above manner, whereby the boundaries between the first large lattices 24A and the second large lattices 24B are made less visible to improve the visibility.

In a case where each straight side 30 of the first large lattices 24A is overlapped with the corresponding straight side 30 of the second large lattices 24B to prevent the formation of the blank area as described above, the straight sides 30 of the second large lattices 24B are positioned right under the straight sides 30 of the first large lattices 24A. In this case, all straight sides 30 of the first large lattices 24A and the second large lattices 24B function as conductive portions, so that a parasitic capacitance is formed between the straight side 30 of the first large lattice 24A and the straight side 30 of the second large lattice 24B, and the parasitic capacitance acts as a noise on charge information to significantly deteriorate the S/N ratio. Furthermore, since the parasitic capacitance are formed between each pair of the first large lattice 24A and the second large lattice 24B, a large number of the parasitic capacitances are connected in parallel in the first conductive patterns 18A and the second conductive patterns 18B to increase the CR time constant. When the CR time constant is increased, there is a possibility that the waveform rise time of the voltage signal supplied to the first conductive pattern 18A (and the second conductive pattern 18B) is increased, and an electric field for the position detection is hardly generated in a predetermined scan time. In addition, there is a possibility that the waveform rise or fall time of the signal transmitted from each of the first conductive patterns 18A and the second conductive patterns 18B becomes long, and the waveform change of the transmitted signal cannot be detected in a predetermined scan time. This leads to detection accuracy deterioration and response speed deterioration. Thus, in this case, the detection accuracy and the response speed can be improved only by reducing the number of the first large lattices 24A and the second large lattices 24B (lowering the resolution) or by reducing the size of the display screen, and the laminated conductive sheet cannot be used in a large screen such as a B5 sized, A4 sized, or larger screen.

In contrast, in this embodiment, as shown in FIG. 2A, the projected distance Lf between the straight side 30 of the first large lattice 24A and the straight side 30 of the second large lattice 24B is approximately equal to the side length of the small lattice 26. Therefore, only a small parasitic capacitance is formed between the first large lattice 24A and the second large lattice 24B. As a result, the CR time constant can be reduced to improve the detection accuracy and the response speed. In the combined pattern 75 of the first auxiliary pattern 20A and the second auxiliary pattern 20B, an end of the first auxiliary wire 56A may overlap with an end of the second auxiliary wire 56B. However, this overlap does not result in increase of the parasitic capacitance between the first large lattice 24A and the second large lattice 24B because the first auxiliary wire 56A is unconnected with and electrically isolated from the first large lattice 24A and the second auxiliary wire 56B is unconnected with and electrically isolated from the second large lattice 24B.

It is preferred that the optimum value of the projected distance Lf is appropriately determined depending not on the sizes of the first large lattices 24A and the second large lattices 24B but on the sizes (the line widths and the side lengths) of the small lattices 26 in the first large lattices 24A and the second large lattices 24B. When the small lattices 26 have an excessively large size as compared with the sizes of the first large lattices 24A and the second large lattices 24B, the laminated conductive sheet may have a high light transmittance, but the dynamic range of the transmitted signal may be reduced, lowering the detection sensitivity. On the other hand, when the small lattices 26 have an excessively small size, the laminated conductive sheet may have a high detection sensitivity, but the light transmittance may be deteriorated under the restriction of line width reduction.

When the small lattices 26 have a line width of 1 to 15 µm, the optimum value of the projected distance Lf (the optimum distance) is preferably 100 to 400 µm, more preferably 200 to 300 µm. In a case where the small lattices 26 have a smaller line width, the optimum distance can be further reduced. However, in this case, the electrical resistance may be increased, and the CR time constant may be increased even under a small parasitic capacitance, deteriorating the detection sensitivity and the response speed. Thus, the line width of the small lattice 26 is preferably within the above range.

For example, the sizes of the first large lattices 24A, the second large lattices 24B, and the small lattices 26 are determined based on the size of the display panel 110 or the size and touch position detection resolution (drive pulse period or the like) of the sensor region 112, and the optimum distance between the first large lattice 24A and the second large lattice 24B is obtained based on the line width of the small lattices 26.

In this embodiment, in the terminal wiring region 114, the first terminals 116a are formed in the longitudinal center of the periphery on the one long side of the first conductive sheet 12A, and the second terminals 116b are formed in the longitudinal center of the periphery on the one long side of the second conductive sheet 12B. Particularly, in the example of FIG. 7, the first terminals 116a and the second terminals 116b are close to and not overlapped with each other, and the first terminal wiring patterns 62A and the second terminal wiring patterns 62B do not overlap with each other. For example, the first terminal 116a may partially overlap with the odd-numbered second terminal wiring pattern 62B.

Thus, the first terminals 116a and the second terminals 116b can be electrically connected to the control circuit by using a cable and two connectors (a connector for the first terminals 116a and a connector for the second terminals 116b) or one connector (a complex connector for the first terminals 116a and the second terminals 116b).

Since the first terminal wiring patterns 62A and the second terminal wiring patterns 62B do not vertically overlap with each other, a parasitic capacitance is reduced therebetween to prevent the response speed deterioration.

Since the first wire connections 60A are arranged along the one long side of the sensor region 112 and the second wire connections 60B are arranged along the both short sides of the sensor region 112, the area of the terminal wiring region 114 can be reduced. Therefore, the size of the display panel 110 containing the touch panel 100 can be easily reduced, and the display screen 110a can be made to seem impressively larger. Also the operability of the touch panel 100 can be improved.

The area of the terminal wiring region 114 may be further reduced by reducing the distance between the adjacent first terminal wiring patterns 62A or the adjacent second terminal wiring patterns 62B. The distance is preferably 10 to 50 µm in view of preventing migration.

Alternatively, the area of the terminal wiring region 114 may be reduced by arranging the second terminal wiring pattern 62B between the adjacent first terminal wiring patterns 62A in the view from above. However, when the pattern is misaligned, the first terminal wiring pattern 62A may vertically overlap with the second terminal wiring pattern 62B to increase the parasitic capacitance therebetween. This leads to deterioration of the response speed. Thus, in the case of using such an arrangement, the distance between the adjacent first terminal wiring patterns 62A is preferably 50 to 100 µm.

As shown in FIG. 7, first alignment marks 118a and second alignment marks 118b are preferably formed, for example, on the corners of the first conductive sheet 12A and the second conductive sheet 12B. The first alignment marks 118a and the second alignment marks 118b are used for positioning the sheets in the process of bonding the first conductive sheet 12A and the second conductive sheet 12B. When the first conductive sheet 12A and the second conductive sheet 12B are bonded to obtain the first conductive sheet laminate 10A, the first alignment marks 118a and the second alignment marks 118b form composite alignment marks. The composite alignment marks may be used for positioning the first conductive sheet laminate 10A in the process of attaching to the display panel 110.

In the first conductive sheet laminate 10A, the CR time constant of the first conductive patterns 18A and the second conductive patterns 18B can be significantly reduced, whereby the response speed can be increased, and the position detection can be readily carried out in an operation time (a scan time). Thus, the screen sizes (not the thickness but the length and width) of the touch panel 100 can be easily increased.

When the overlap of the first connection 28A and the second connection 28B is observed from above, the connection point between the first conductive wire 44a and the second conductive wire 44b in the first conductive wire portion 40a of the first conductive sheet 12A is positioned at a vertex 76 of the small lattice 26 on the zigzag side 32 of the second large lattice 24B, the connection point between the first conductive wire 44a and the second conductive wire 44b in the fifth conductive wire portion 40e of the second conductive sheet 12B is positioned at a vertex 78 of the small lattice 26 on the zigzag side 32 of the first large lattice 24A, the ends of the first protruding wires 52A are positioned at the first intersection point P1 and the third intersection point P3 of the second connection 28B respectively, the ends of the second protruding wires 52B are positioned at the first intersection point P1 and the third intersection point P3 of the first connection 28A respectively, and the first to fourth conductive wire portions 40a to 40d and the first protruding wires 52A in the first connection 28A and the fifth to eighth conductive wire portions 40e to 40h and the second protruding wires 52B in the second connection 28B form a plurality of the small lattices 26 in combination. Therefore, the small lattices 26 are formed by the combination of the first connection 28A and the second connection 28B in the overlapped portion of the first connection 28A and the second connection 28B. Thus formed small lattices 26 cannot be distinguished from the surrounding small lattices 26 in the first large lattices 24A and the second large lattices 24B, so that the visibility is improved.

When the overlap of the first insulation 54A and the second insulation 54B is observed from above, the corner of the first L-shaped pattern 58A is positioned at the connection point of the straight sides 30 in the second large lattice 24B, the corner of the second L-shaped pattern 58B is positioned at the connection point of the straight sides 30 in the first large lattice 24A, and the first L-shaped pattern 58A and the second L-shaped pattern 58B form a plurality of the small lattices 26 in combination. Thus formed small lattices 26 cannot be distinguished from the surrounding small lattices 26 in the first large lattices 24A and the second large lattices 24B, so that the visibility is improved.

In this embodiment, the first large lattices 24A are connected via the eighteen connection paths in the first connection 28A. Therefore, for example, even when a part of the second conductive wire portion 40b and a part of the third conductive wire portion 40c are broken in the first connection 28A, the electric connection between the first large lattices 24A can be maintained by the unbroken first connection path and the like. Thus, the probability of the complete breakage of the first connection 28A can be lowered as compared with conventional technologies.

In this embodiment, the first connection 28A has a connection path 7 times longer than the side length of the small lattice 26 (such as the third or fifth connection paths), a connection path 8 times longer than the side length, a connection path 12 times longer than the side length of the small lattice 26 (such as the first or second connection paths), and a connection path 13 times longer than the side length of the small lattice 26 (such as the fourth or sixth connection paths). The third conductive wire 44c and the seventh conductive wire 44g in each connection path have a length equal to the side length of the small lattice 26. Therefore, the probability that the third conductive wire 44c or the seventh conductive wire 44g is broken in the connection path is $\frac{1}{7}$ or less. Thus, the probability that both of the third conductive wire 44c and the seventh conductive wire 44g in the first connection 28A are broken (the first connection 28A is completely broken) is significantly lowered. Examples of the connection paths, 8 times longer than the side length of the small lattice 26, include a connection path extending from the third contact point 38 of the first large lattice 24Aa through the third conductive wire portion 40c, the third conductive wire 44c, and the fourth conductive wire 44d to the second contact point 36 of the first large lattice 24Ab.

The second connection 28B has the same structure, and the second large lattices 24B are connected via the eighteen connection paths in the second connection 28B. Therefore, for example, even when a part of the sixth conductive wire portion 40f and a part of the seventh conductive wire portion 40g are broken in the second connection 28B, the electric connection between the second large lattices 24B can be maintained by the unbroken first connection path and the like. Thus, the probability of the complete breakage of the second connection 28B can be lowered as compared with conventional technologies.

As described above, the first conductive sheet laminate 10A has a low surface resistance. Therefore, when the first conductive sheet laminate 10A is used in a projected capacitive touch panel or the like, the response speed and the size of the touch panel can be easily increased. Furthermore, the first large lattices 24A and the second large lattices 24B, which function as charge storage cells, each contain a large number of the small lattices 26. Therefore, the first large lattices 24A and the second large lattices 24B can store a large amount of signal charge, whereby the dynamic range of output to input is increased. Thus, when the first conductive sheet 12A, the second conductive sheet 12B, or the first conductive sheet laminate 10A is used in a touch panel, the sensitivity for detecting the finger touch position (the detection sensitivity) can be increased. In addition, the ratio of the signal component to the noise component can be increased, and the S/N ratio of the detection signal can be improved. This leads to improvement of the touch position detection accuracy.

Furthermore, the combination of the first auxiliary patterns 20A formed around the first large lattices 24A in the first conductive sheet 12A and the second auxiliary patterns 20B formed around the second large lattices 24B in the second conductive sheet 12B, the combination of the first connections 28A and the second connections 28B, and the combination of the first insulations 54A and the second insulation 54B form a plurality of the small lattices 26. Therefore, the boundaries between the first large lattices 24A of the first conductive sheet 12A and the second large lattices 24B of the second conductive sheet 12B can be made less visible, defects such as the local line thickening can be prevented, and the overall visibility can be improved.

Though the small lattice 26 has a square shape in the above first conductive sheet laminate 10A, it may have another polygonal shape. Each side of the small lattice 26 may have a straight line shape, a curved shape, or an arc shape. When the small lattice 26 has arc-shaped sides, for example, two opposite sides may have an outwardly protruding arc shape, and the other two opposite sides may have an inwardly protruding arc shape. Alternatively, each side may have a wavy shape containing outwardly protruding arcs and inwardly protruding arcs formed continuously. Of course, each side may have a sine curve shape.

Though the first conductive wire 44a and the fifth conductive wire 44e are twice as long as the side of the small lattice 26 in the above first conductive sheet 12A and second conductive sheet 12B, each of the wires may be for example 1.5, 2.5, or 3 times longer than the side of the small lattice 26. Though the conductive wire extending in the third direction in the first conductive wire portion 40a (the second conductive wire 44b, the third conductive wire 44c, and the fourth conductive wire 44d), the conductive wire extending in the third direction in the second conductive wire portion 40b (the fifth conductive wire 44e, the sixth conductive wire 44f, and the seventh conductive wire 44g), the third conductive wire portion 40c, and the fourth conductive wire portion 40d are 5 times longer than the side of the small lattice 26, each of the wires may be for example 3, 4, or 6 times longer than the side. However, when the first connection 28A and the second connection 28B have an excessively large size, the first large lattices 24A and the second large lattices 24B cannot be easily arranged, and the overlaps thereof exhibit a large electrostatic capacitance change with considerable noise component. Therefore, it is preferred that the first conductive wire 44a and the fifth conductive wire 44e are 4 or less times longer than the side of the small lattice 26, and the conductive wire extending along the third direction in the first conductive wire portion 40a, the conductive wire extending along the third direction in the second conductive wire portion 40b, the third conductive wire portion 40c, and the fourth conductive wire portion 40d are 6 or less times longer than the side of the small lattice 26.

The structure of the first connection 28A may be optionally modified as long as the first connection 28A has three or more connection paths. For example, the third conductive wire portion 40c or the fourth conductive wire portion 40d may be omitted from the first connection 28A. In this case, the first connection 28A has nine connection paths. Thus, it is only necessary that the first connection 28A has three or more conductive wires for connecting one or more vertices of the small lattices 26 in the first large lattice 24Aa and one or more vertices of the small lattices 26 in the first large lattice 24Ab. This is true also for the second connection 28B.

Also, the sizes of the small lattice 26 (including the side length and the diagonal line length), the number of the small lattices 26 in the first large lattice 24A, and the number of the small lattices 26 in the second large lattice 24B may be appropriately selected depending on the size and the resolution (the line number) of the touch panel using the conductive sheet.

Figure 2B:
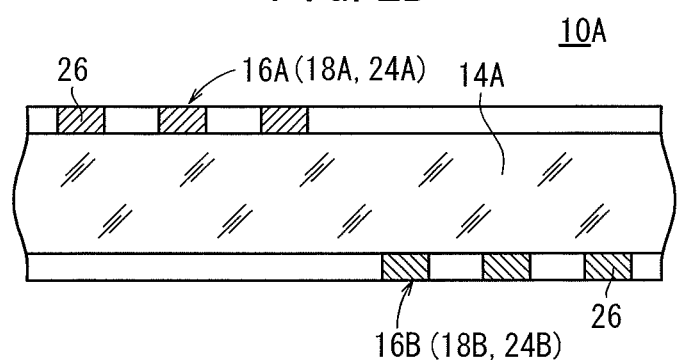
FIG. 2B is a cross-sectional view partially showing another example of the first conductive sheet laminate.

As shown in FIGS. 1 and 2A, in the above first conductive sheet laminate 10A, the first conductive part 16A is formed on the one main surface of the first transparent substrate 14A, the second conductive part 16B is formed on the one main surface of the second transparent substrate 14B, and the resultant sheets are stacked. Alternatively, as shown in FIG. 2B, the first conductive part 16A may be formed on one main surface of the first transparent substrate 14A, and the second conductive part 16B may be formed on the other main surface of the first transparent substrate 14A. In this case, the second transparent substrate 14B is not used, the first transparent substrate 14A is stacked on the second conductive part 16B, and the first conductive part 16A is stacked on the first transparent substrate 14A. In addition, another layer may be disposed between the first conductive sheet 12A and the second conductive sheet 12B. The first conductive part 16A and the second conductive part 16B may be arranged facing each other as long as they are insulated.

A conductive sheet laminate according to a second embodiment (hereinafter referred to as the second conductive sheet laminate 10B) will be described below with reference to FIGS. 9 to 11.

Figure 9:
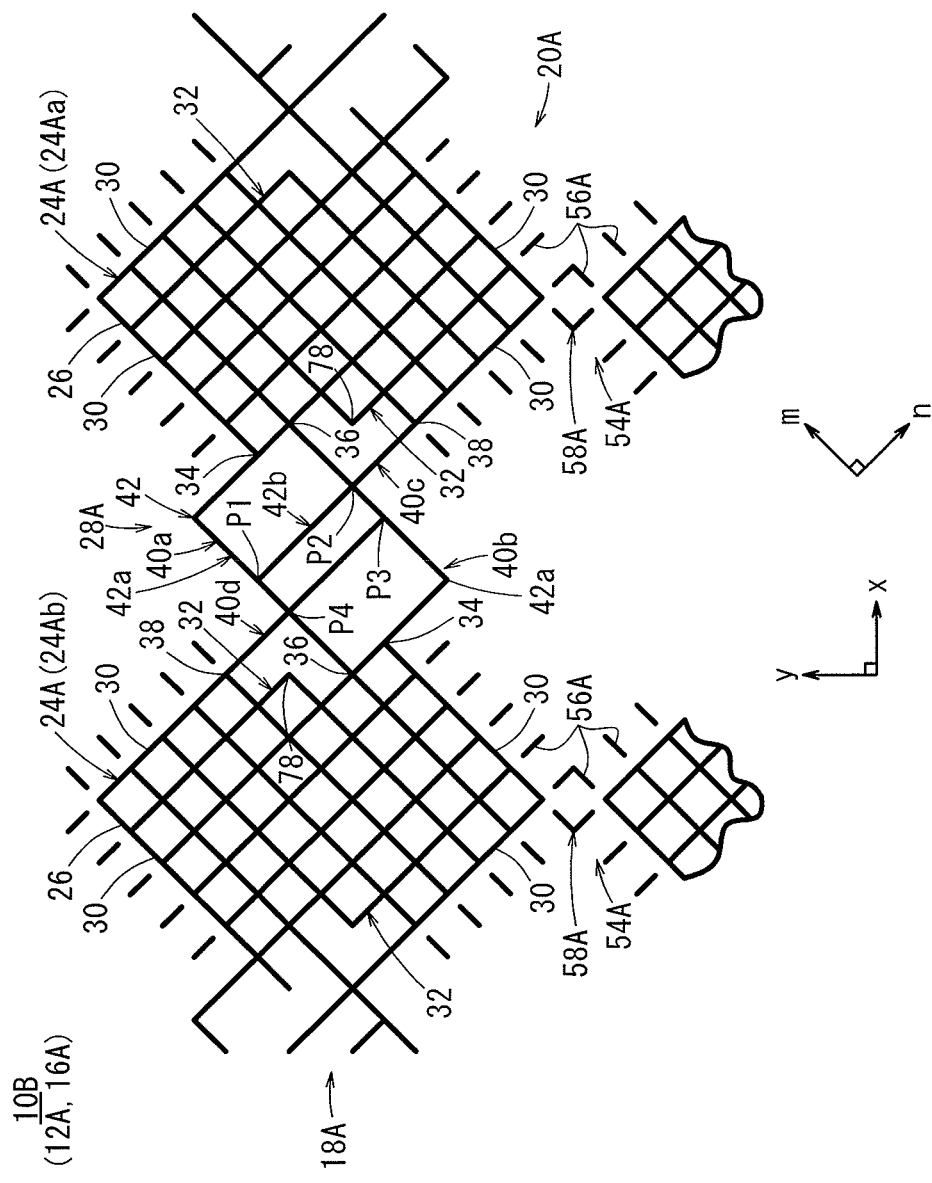
FIG. 9 is a plan view showing a pattern example of a first conductive part formed on a first conductive sheet of a conductive sheet laminate according to a second embodiment (a second conductive sheet laminate)
Figure 10:
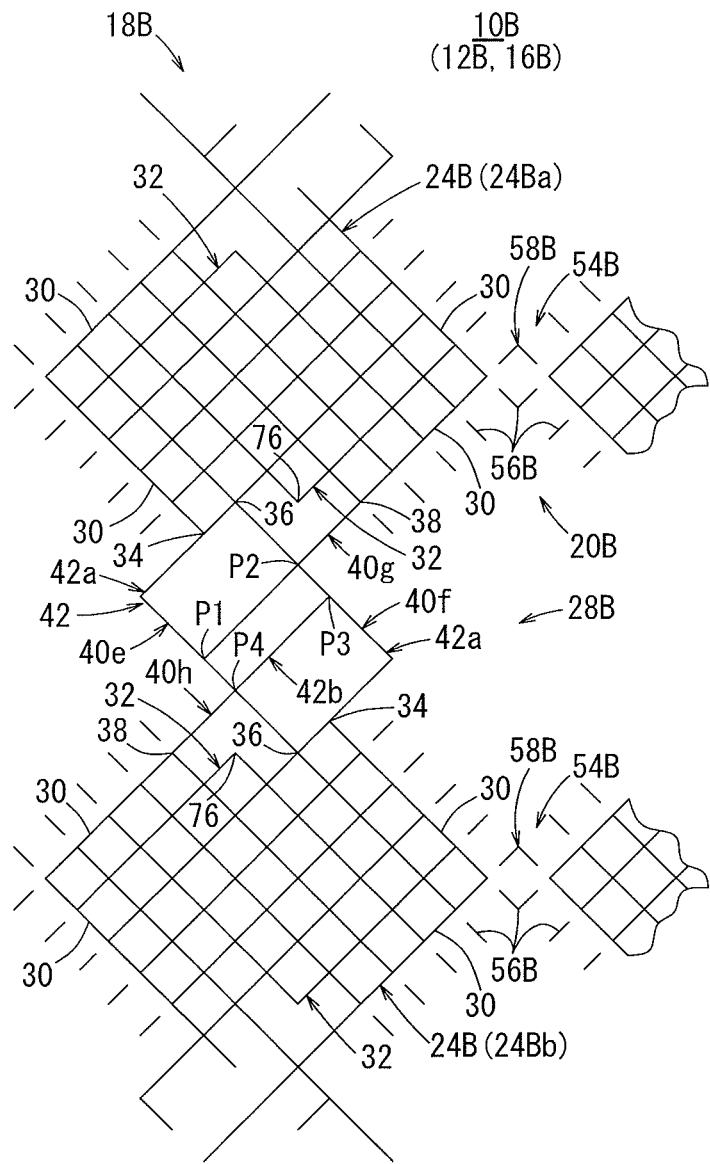
FIG. 10 is a plan view showing a pattern example of a second conductive part formed on a second conductive sheet of the second conductive sheet laminate.

The second conductive sheet laminate 10B has approximately the same structure as the above first conductive sheet laminate 10A, but is different in that the protrusions (the first protruding wires 52A) are not formed in the first connection 28A of the first conductive sheet 12A as shown in FIG. 9 and that the protrusions (the second protruding wires 52B) are not formed in the second connection 28B of the second conductive sheet 12B as shown in FIG. 10.

Figure 11:
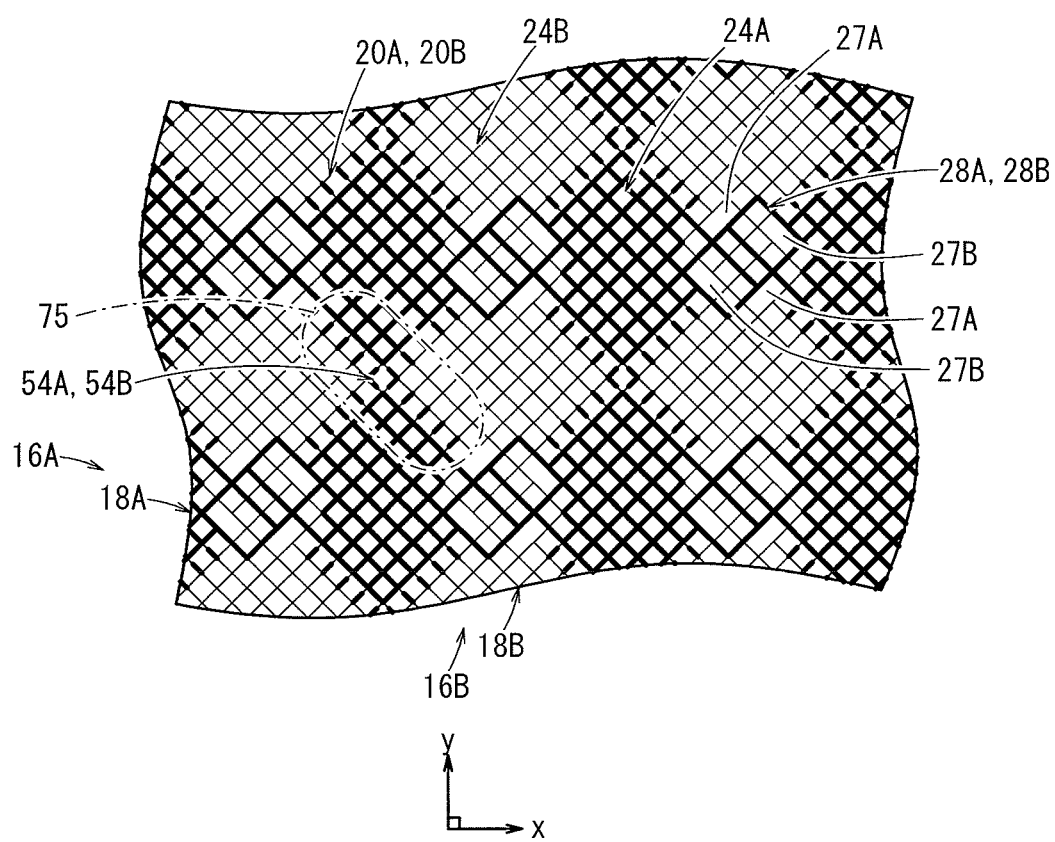
FIG. 11 is a plan view partially showing an example of the second conductive sheet laminate formed by combining the first and second conductive sheets.

Thus, as shown in FIG. 11, when the first conductive sheet 12A and the second conductive sheet 12B are stacked to form the second conductive sheet laminate 10B, the first blank area 27A having the same size as two small lattices 26 is formed in each of a portion adjacent to the first intersection point P1 and a portion adjacent to the third intersection point P3 in the first connection 28A, and the second blank area 27B having the same size as two small lattices 26 is formed in each of a portion adjacent to the first intersection point P1 and a portion adjacent to the third intersection point P3 in the second connection 28B.

In this embodiment, though the first blank areas 27A and the second blank areas 27B are less visible because they are regularly arranged and have the small size equal to two small lattices 26, the second conductive sheet laminate 10B is inferior in visibility to the first conductive sheet laminate 10A. In the first conductive sheet laminate 10A, each second blank area 27B is divided into two by the protrusion (the first protruding wire 52A) in the first connection 28A, each first blank area 27A is divided into two by the protrusion (the second protruding wire 52B) in the second connection 28B, and the areas cannot be distinguished from the surrounding small lattices 26 in the first large lattices 24A and the second large lattices 24B as shown in FIG. 8, so that the visibility is improved.

A conductive sheet laminate according to a third embodiment (hereinafter referred to as the third conductive sheet laminate 10C) will be described below with reference to FIGS. 12 to 14.

The third conductive sheet laminate 10C has approximately the same structure as the above first conductive sheet laminate 10A, but is different in that the protrusions extend outward from the connections.

Figure 12:
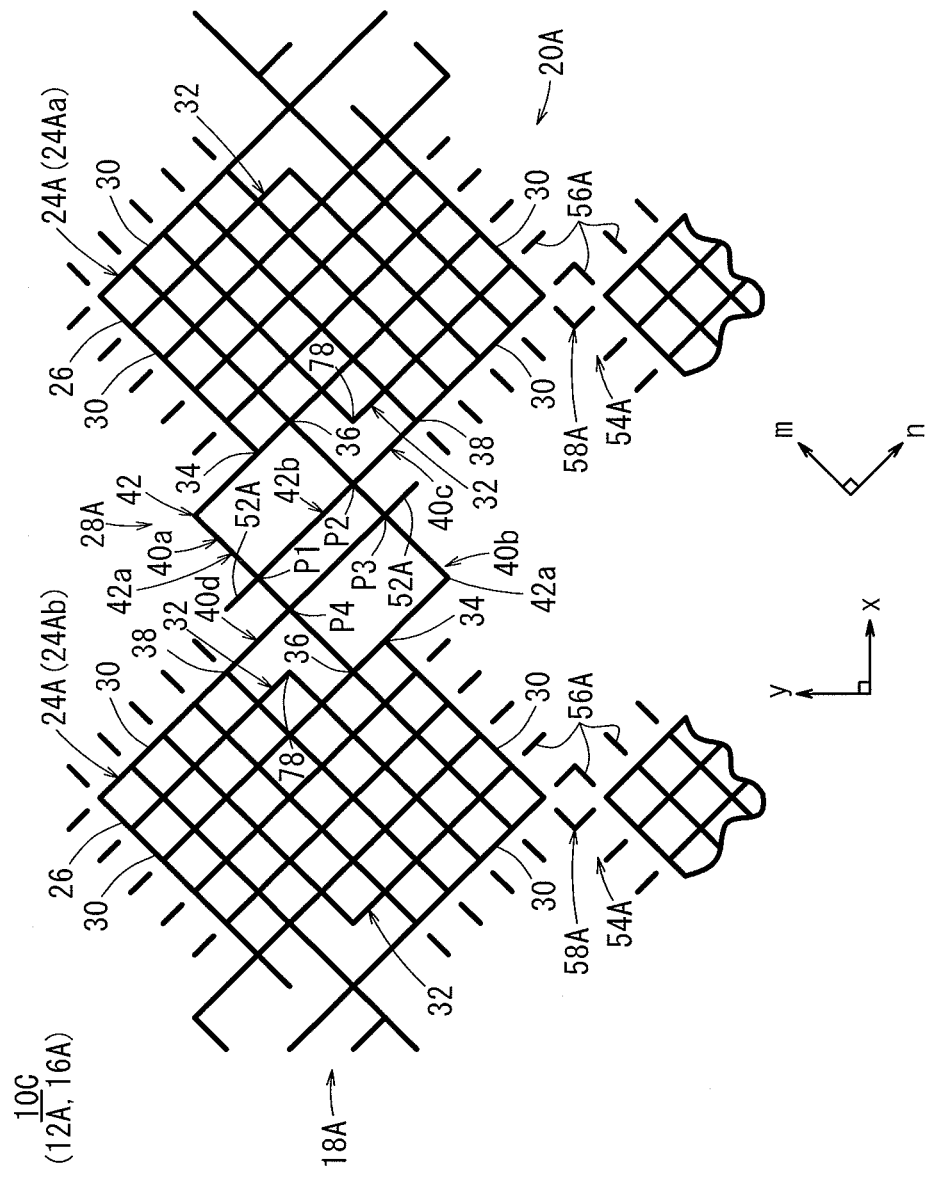
FIG. 12 is a plan view showing a pattern example of a first conductive part formed on a first conductive sheet of a conductive sheet laminate according to a third embodiment (a third conductive sheet laminate)

Thus, as shown in FIG. 12, the first connection 28A has the protrusions composed of the thin metal wire (the first protruding wires 52A), which are perpendicular to the conductive wires extending in the third direction in the first conductive wire portion 40a and the second conductive wire portion 40b, and extend from the first intersection point P1 and the third intersection point P3 on the conductive wires, respectively.

Figure 13:
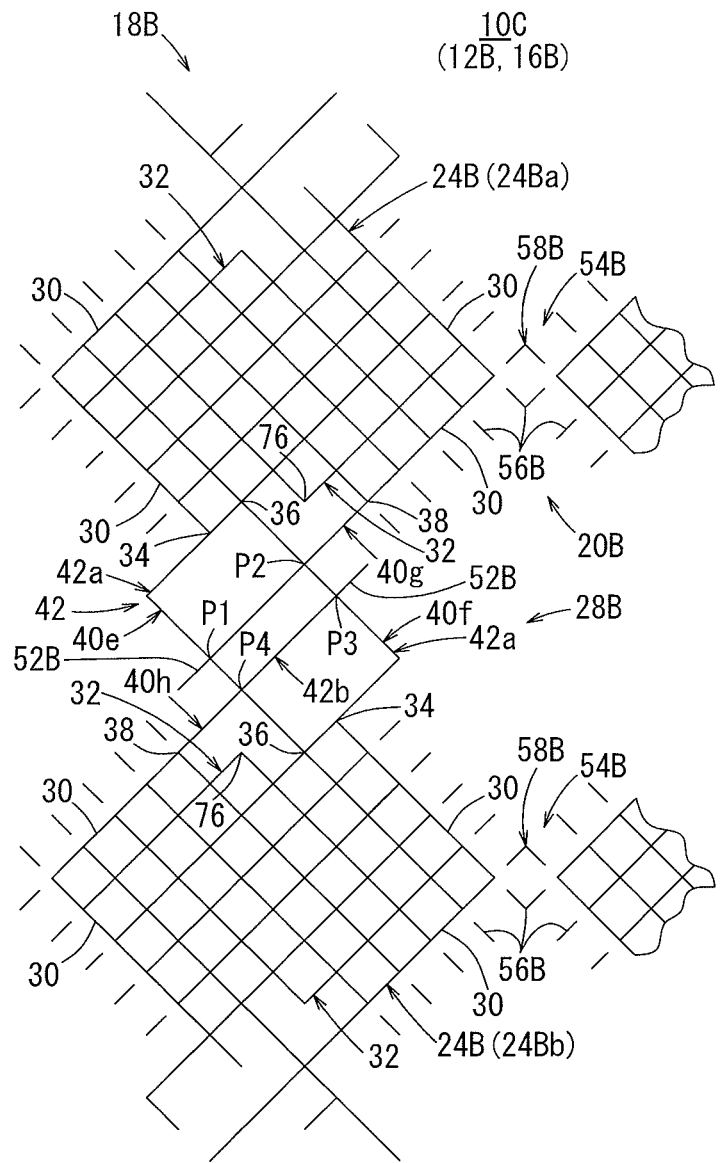
FIG. 13 is a plan view showing a pattern example of a second conductive part formed on a second conductive sheet of the third conductive sheet laminate.

Similarly, as shown in FIG. 13, the second connection 28B has the protrusions composed of the thin metal wire (the second protruding wires 52B), which are perpendicular to the conductive wires extending in the fourth direction in the fifth conductive wire portion 40e and the sixth conductive wire portion 40f, and extend from the first intersection point P1 and the third intersection point P3 on the conductive wires, respectively.

Figure 14:
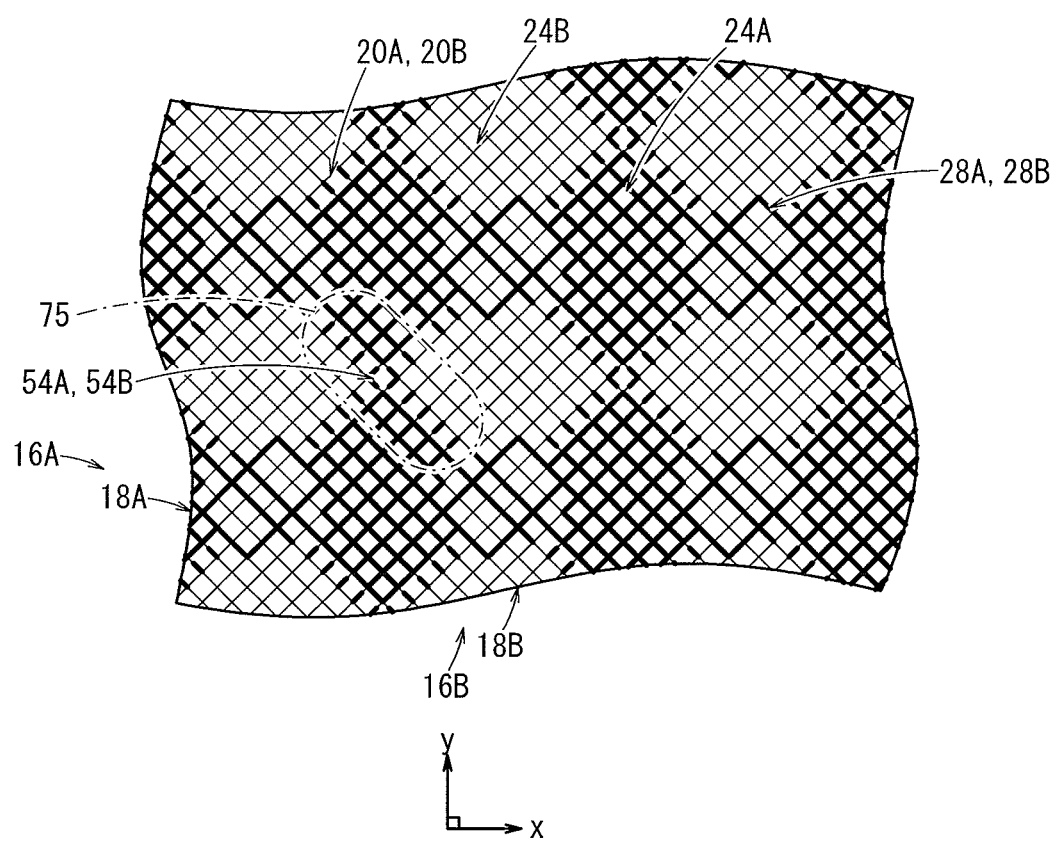
FIG. 14 is a plan view partially showing an example of the third conductive sheet laminate formed by combining the first and second conductive sheets.

Thus, as shown in FIG. 14, when the first conductive sheet 12A and the second conductive sheet 12B are stacked to form the third conductive sheet laminate 10C, each first blank area 27A (see FIG. 11) is divided into two by the protrusion (the first protruding wire 52A) in the first connection 28A, each second blank area 27B (see FIG. 11) is divided into two by the protrusion (the second protruding wire 52B) in the second connection 28B, and the areas cannot be distinguished from the surrounding small lattices 26 in the first large lattices 24A and the second large lattices 24B, so that the visibility is improved.

A conductive sheet laminate according to a fourth embodiment (hereinafter referred to as the fourth conductive sheet laminate 10D) will be described below with reference to FIGS. 15 to 18.

The fourth conductive sheet laminate 10D has approximately the same structure as the above first conductive sheet laminate 10A, but is different in the following points.

Figure 15:
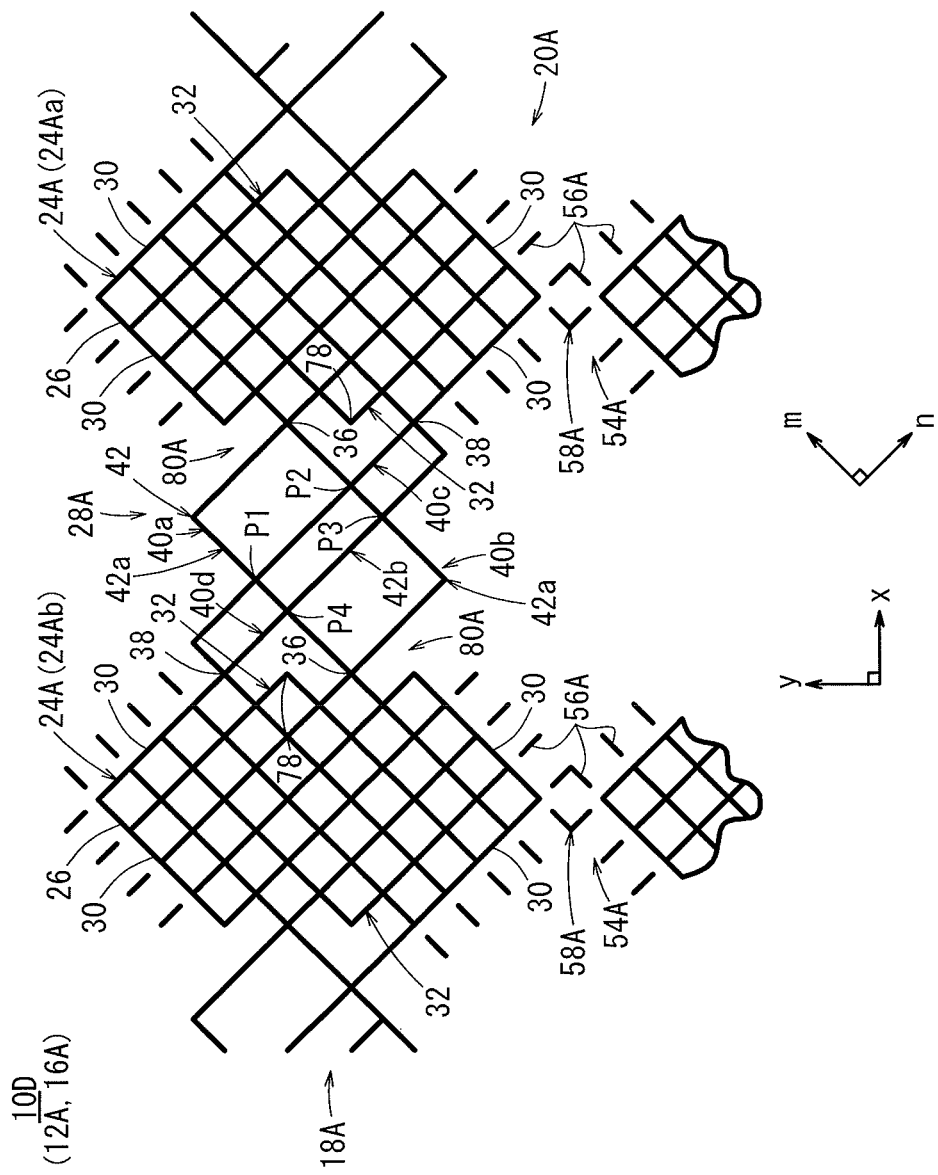
FIG. 15 is a plan view showing a pattern example of a first conductive part formed on a first conductive sheet of a conductive sheet laminate according to a fourth embodiment (a fourth conductive sheet laminate)
Figure 16:
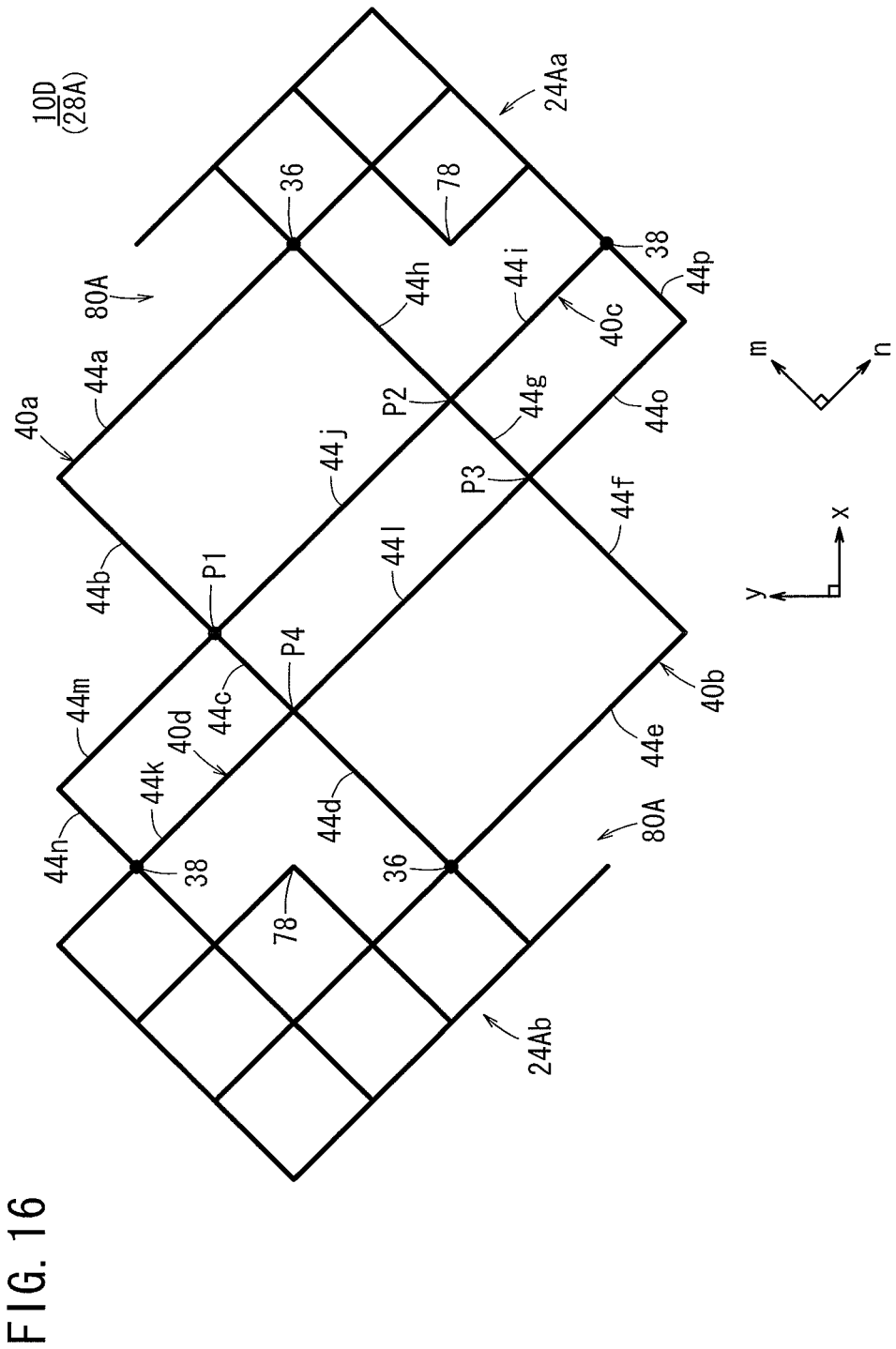
FIG. 16 is an enlarged plan view showing a first connection of FIG. 15.

Thus, as shown in FIGS. 15 and 16, in the first connection 28A, the third conductive wire portion 40c has an L-shaped with one corner for connecting the third contact point 38 of the one first large lattice 24Aa and the third contact point 38 of the other first large lattice 24Ab, and the fourth conductive wire portion 40d has an L-shaped with one corner for connecting the third contact point 38 of the other first large lattice 24Ab and the third contact point 38 of the one first large lattice 24Aa. In addition, a first absent portion 80A (a portion provided by removing a side from the small lattice 26) is formed between the first conductive wire portion 40a and a side of the first large lattice 24A extending in the third direction (the m direction) and between the second conductive wire portion 40b and a side of the first large lattice 24A extending in the third direction (the m direction), respectively, and also one first auxiliary wire 56A is removed. The first contact point 34 is not formed.

Similarly, as shown in FIG. 17, in the second connection 28B, the seventh conductive wire portion 40g has an L-shaped with one corner for connecting the third contact point 38 of the one second large lattice 24Ba and the third contact point 38 of the other second large lattice 24Bb, and the eighth conductive wire portion 40h has an L-shaped with one corner for connecting the third contact point 38 of the other second large lattice 24Bb and the third contact point 38 of the one second large lattice 24Ba. In addition, a second absent portion 80B (a portion provided by removing a side from the small lattice 26) is formed between the fifth conductive wire portion 40e and a side of the second large lattice 24B extending in the fourth direction (the n direction) and between the sixth conductive wire portion 40f and a side of the second large lattice 24B extending in the fourth direction (the n direction), respectively, and also one second auxiliary wire 56B is removed. Also in the second connection 28B, the first contact point 34 is not formed.

Though not shown in FIG. 17, as well as the third conductive wire portion 40c in the first connection 28A, the seventh conductive wire portion 40g contains the ninth conductive wire 44i, the tenth conductive wire 44j, a thirteenth conductive wire 44m, and a fourteenth conductive wire 44n. As well as the fourth conductive wire portion 40d in the first connection 28A, the eighth conductive wire portion 40h contains the eleventh conductive wire 44k, the twelfth conductive wire 44l, a fifteenth conductive wire 44o, and a sixteenth conductive wire 44p.

Therefore, in the first connection 28A of the fourth conductive sheet laminate 10D, Na (the number of the thin metal wires extending from the contact points between the one first large lattice 24Aa and the first connection 28A into the first connection 28A) is 4, Nb (the number of the thin metal wires extending between the intersection points in the first connection 28A) is 4, Nc (the number of the thin metal wires extending from the contact points between the other first large lattice 24Ab and the first connection 28A into the first connection 28A) is 4, and thus N (the number of the connection paths between the adjacent two first large lattices 24A) is 4×(4+4−1)=28. Thus, the connection path number N of the first connection 28A in the fourth conductive sheet laminate 10D is larger by 10 than the number N (=18) of the first connection 28A in the first conductive sheet laminate 10A. As a result, in this embodiment, the probability of the complete breakage of the first connection 28A can be further lowered to improve the reliability. This is true also for the second connection 28B.

Furthermore, the thirteenth conductive wire 44m of the third conductive wire portion 40c and the fifteenth conductive wire 44o of the fourth conductive wire portion 40d in the first connection 28A of the fourth conductive sheet laminate 10D function in the same manner as the protrusions (the first protruding wires 52A) in the first connection 28A of the third conductive sheet laminate 10C. Similarly, the thirteenth conductive wire 44m of the seventh conductive wire portion 40g and the fifteenth conductive wire 44o of the eighth conductive wire portion 40h in the second connection 28B of the fourth conductive sheet laminate 10D function in the same manner as the protrusions (the second protruding wires 52B) in the second connection 28B of the third conductive sheet laminate 10C.

Figure 18:
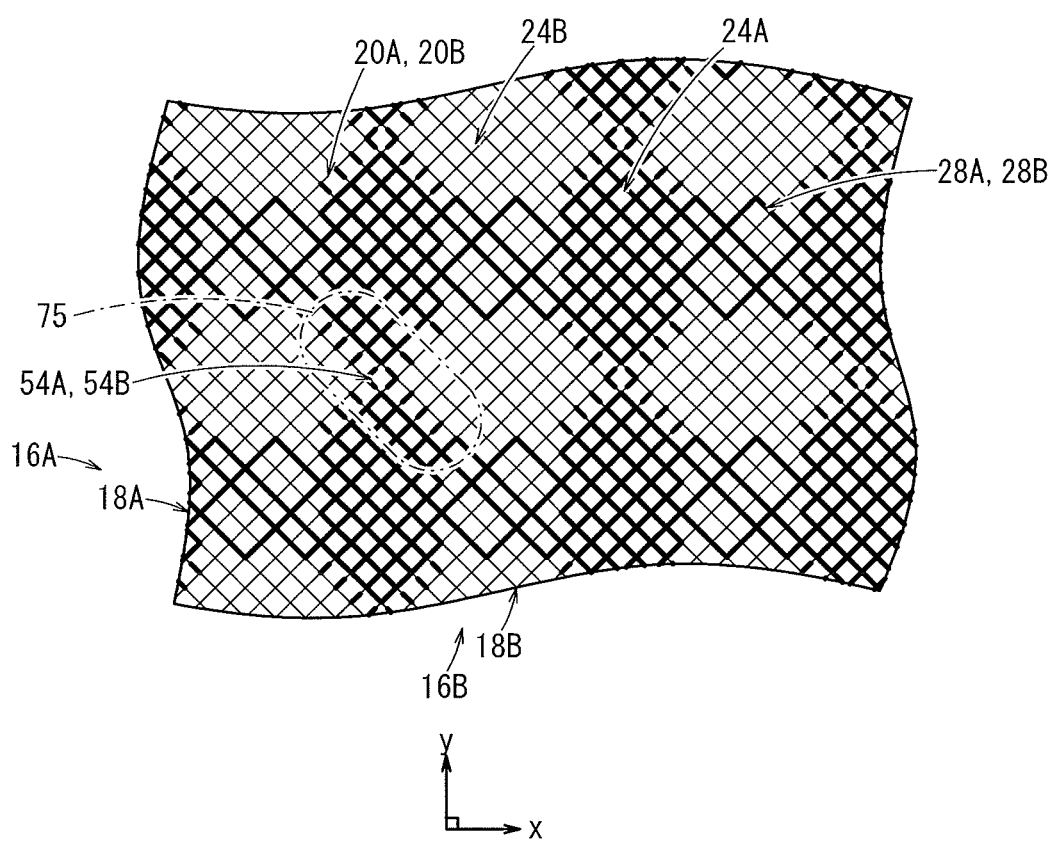
FIG. 18 is a plan view partially showing an example of the fourth conductive sheet laminate formed by combining the first and second conductive sheets.

Thus, as shown in FIG. 18, when the first conductive sheet 12A and the second conductive sheet 12B are stacked to form the fourth conductive sheet laminate 10D, each first blank area 27A (see FIG. 11) is divided into two by the thirteenth conductive wire 44m and the fourteenth conductive wire 44n of the third conductive wire portion 40c and the fifteenth conductive wire 44o and the sixteenth conductive wire 44p of the fourth conductive wire portion 40d in the first connection 28A, whereby the second absent portions 80B and the spaces corresponding to the removed second auxiliary wires 56B are compensated. In addition, each second blank area 27B (see FIG. 11) is divided into two by the thirteenth conductive wire 44m and the fourteenth conductive wire 44n of the seventh conductive wire portion 40g and the fifteenth conductive wire 44o and the sixteenth conductive wire 44p of the eighth conductive wire portion 40h in the second connection 28B, whereby the first absent portions 80A and the spaces corresponding to the removed first auxiliary wires 56A are compensated. As a result, the areas cannot be distinguished from the surrounding small lattices 26 in the first large lattices 24A and the second large lattices 24B, so that the visibility is improved.

A conductive sheet laminate according to a fifth embodiment (hereinafter referred to as the fifth conductive sheet laminate 10E) will be described below with reference to FIGS. 19 to 21.

The fifth conductive sheet laminate 10E is different from the above first conductive sheet laminate 10A in the following points.

Figure 19:
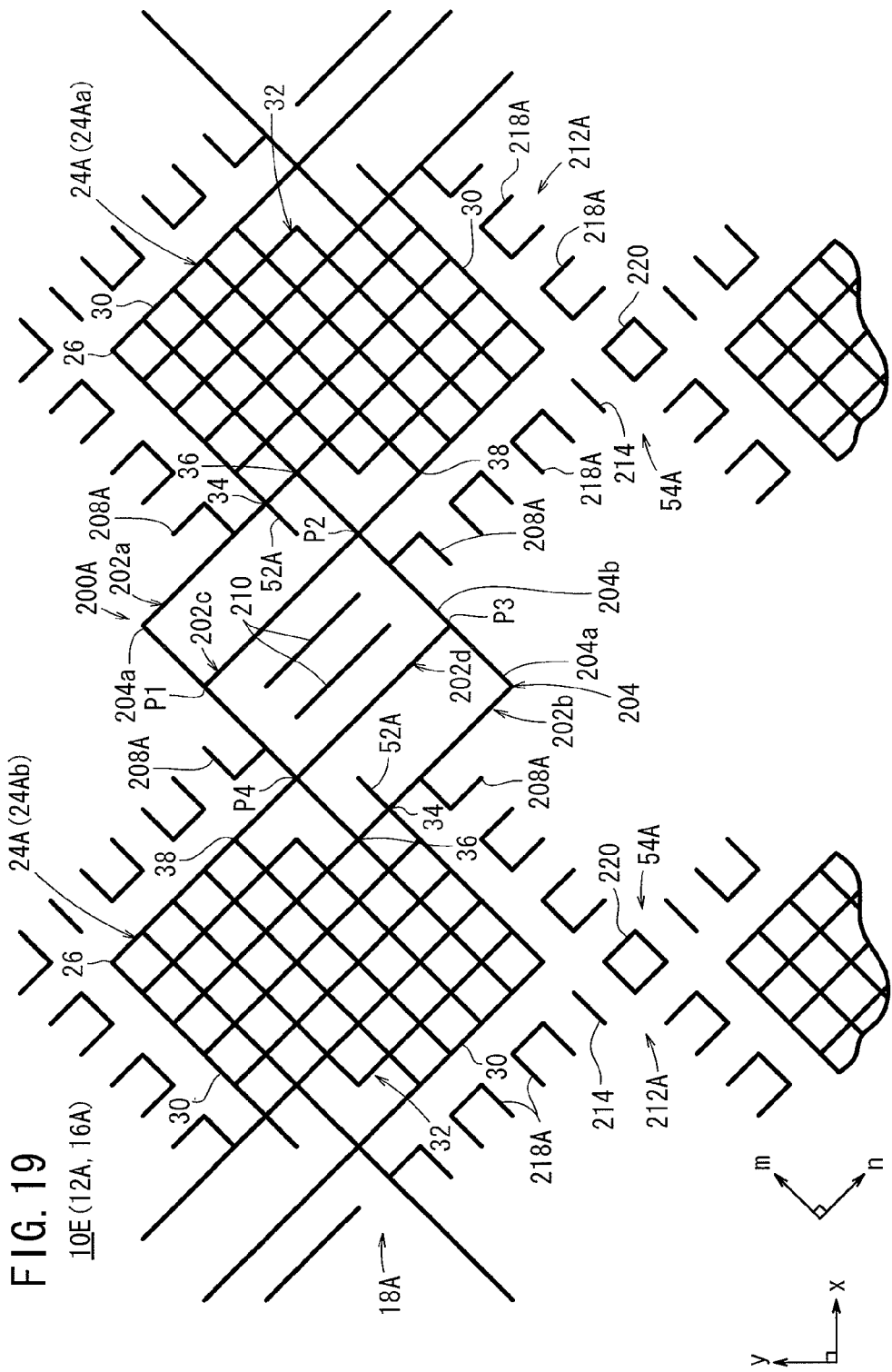
FIG. 19 is a plan view showing a pattern example of a first conductive part formed on a first conductive sheet of a conductive sheet laminate according to a fifth embodiment (a fifth conductive sheet laminate)

Thus, as shown in FIG. 19, in the first conductive part 16A according to the present embodiment, the interval between the first large lattices 24A forming the first conductive pattern 18A is wide and the area of the first insulation 54A is broad.

Specifically, the first connection 200A has a first conductive wire portion 202a including an L-shaped with one corner for connecting the first contact point 34 of the one first large lattice 24Aa and the second contact point 36 of the other first large lattice 24Ab, and further includes a second conductive wire portion 202b having an L-shaped with one corner for connecting the first contact point 34 of the other first large lattice 24Ab and the second contact point 36 of the one first large lattice 24Aa. One rectangular portion 204 is formed by the first conductive wire portion 202a and the second conductive wire portion 202b. The rectangular portion 204 is slightly larger than the rectangular portion 42 described above.

The first connection 200A has a third conductive wire portion 202c extending from the third contact point 38 of the one first large lattice 24Aa to the first conductive wire portion 202a in the fourth direction, and further has a fourth conductive wire portion 202d extending from the third contact point 38 of the other first large lattice 24Ab to the second conductive wire portion 202b in the fourth direction.

The first connection 200A includes an intersection point P1 between the first conductive wire portion 202a and the third conductive wire portion 202c, an intersection point P2 between the second conductive wire portion 202b and the third conductive wire portion 202c, an intersection point P3 between the second conductive wire portion 202b and the fourth conductive wire portion 202d, and an intersection point P4 between the first conductive wire portion 202a and the fourth conductive wire portion 202d.

The rectangular portion 204 contains first rectangular portions 204a and a second rectangular portion 204b, like the rectangular portion 42. In the first rectangular portions 204a, the long side is 5 times longer than the side of the small lattice 26, and the short side is 2 times longer than the side of the small lattice 26. In the second rectangular portion 204b, the long side is 5 times longer than the side of the small lattice 26, and the short side is 3 times longer than the side of the small lattice 26.

The first connection 200A has four protrusions (protruding wire 208A). Specifically, the protruding wire 208A is connected to: a point on a conductive wire of the first conductive wire portion 202a extending along the fourth direction, which is positioned away from the first contact point 34 of the one first large lattice 24Aa by a distance equal to the length of the side of the small lattice 26; a point on a conductive wire of the first conductive wire portion 202a extending along the third direction, which is positioned away from the fourth intersection point P4 toward the first intersection point P1 by a distance equal to the length of the side of the small lattice 26; a point on a conductive wire of the second conductive wire portion 202b extending along the fourth direction, which is positioned away from the first contact point 34 of the other first large lattice 24Ab by a distance equal to the length of the side of the small lattice 26; and a point on a conductive wire of the second conductive wire portion 202b extending along the third direction, which is positioned away from the second intersection point P2 toward the third intersection point P3 by a distance equal to the length of the side of the small lattice 26. The protruding wire 208A is composed of two straight thin metal wires which have a length equal to the length of the side of the small lattice 26 and are connected into an L-shaped.

As is clear from FIG. 19, the first contact points 34 of the first large lattices 24A are provided with protruding wires 52A.

The first auxiliary pattern 212A has a pair of parallel auxiliary wires 210 arranged inside the second rectangular portion 204b of the first connection 200A, U-shaped patterns (gate shaped patterns) 218A arranged along the side of the first large lattice 24A perpendicular to the third direction, U-shaped patterns (gate shaped patterns) 218A arranged along the side of the first large lattice 24A perpendicular to the fourth direction, and a square frame pattern 220 positioned at the first insulation 54A.

The pair of auxiliary wires 210 has the same length in the fourth direction and is apart from each other in the third direction. Each of the U-shaped patterns 218A is composed of three straight thin metal wires having the same length as the side of the small lattice 26. Each of the U-shaped patterns 218A is positioned at a predetermined distance from the first large lattice 24A (a distance equal to the side length of the small lattice 26 in this example). The square frame pattern 220 has the same shape and size as the small lattice 26. Further, as is clear from FIG. 19, an auxiliary wire 214 extending in the third direction is arranged between the square frame pattern 220 and the U-shaped pattern 218A in the fourth direction.

Figure 20:
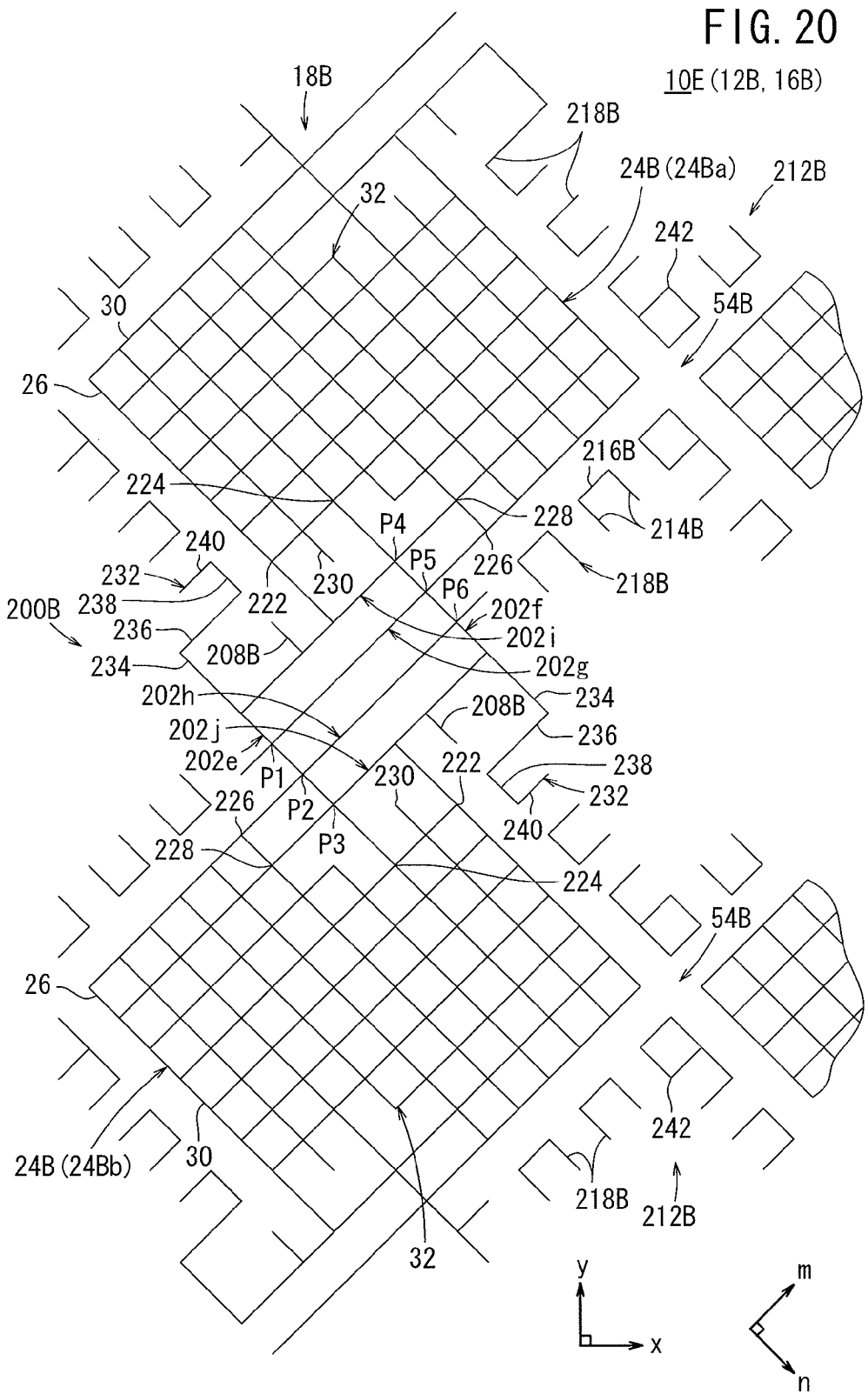
FIG. 20 is a plan view showing a pattern example of a second conductive part formed on a second conductive sheet of the fifth conductive sheet laminate.

Further, as shown in FIG. 20, in the second conductive part 16B according to this embodiment, the second large lattice 24B is formed slightly larger. That is, the second large lattice 24B has a substantially squared shape slightly larger than the first large lattices 24A.

In this example, there are four connecting points (contact points) between one second large lattice 24B and the second connection 200B, i.e., the first contact point 222, the second contact point 224, the third contact point 226 and the fourth contact point 228. The first contact point 222 corresponds to the intersection point between the straight side 30 extending in the fourth direction and the zigzag side 32. The second contact point 224 corresponds to the vertex of the small lattice 26 of the second large lattice 24B, which is positioned at the zigzag side 32 and away from the first contact point 222 by a distance two times the side length of the small lattice 26. The third contact point 226 corresponds to the intersection point between the straight side 30 extending along the third direction and the zigzag side 32. The fourth contact point 228 corresponds to the vertex of the small lattice 26 of the second large lattice 24B, which is positioned at the zigzag side 32 and adjacent to the third contact point 226.

The second large lattice 24B is provided with a protruding wire 230 extending in the fourth direction from the vertex of the small lattice 26 positioned between the first contact point 222 and the second contact point 224 on the zigzag side 32.

The second connection 200B has a fifth conductive wire portion 202e with two corners for connecting the first contact point 222 of the one second large lattice 24Ba and the second contact point 224 of the other second large lattice 24Bb, a sixth conductive wire portion 202f with two corners for connecting the first contact point 222 of the other second large lattice 24Bb and the second contact point 224 of the one second large lattice 24Ba, and a seventh conductive wire portion 202g extending in the third direction from the third contact point 226 of the one second large lattice 24Ba to the fifth conductive wire portion 202e, an eighth conductive wire portion 202h extending in the third direction from the third contact point 226 of the other second large lattice 24Bb to the sixth conductive wire portion 202f, a ninth conductive wire portion 202i extending in the third direction from the fourth contact point 228 of the one second large lattice 24Ba to the fifth conductive wire portion 202e, and a tenth conductive wire portion 202j extending in the third direction from the fourth contact point 228 of the other second large lattice 24Bb to the sixth conductive wire portion 202f.

Also, the second connection 200B includes an intersection point P1 between the fifth conductive wire portion 202e and the seventh conductive wire portion 202g, an intersection point P2 between the fifth conductive wire portion 202e and the eighth conductive wire portion 202h, an intersection point P3 between the fifth conductive wire portion 202e and the tenth conductive wire portion 202j, an intersection point P4 between the sixth conductive wire portion 202f and the ninth conductive wire portion 202i, an intersection point P5 between the sixth conductive wire portion 202f and the seventh conductive wire portion 202g, and an intersection point P6 between the sixth conductive wire portion 202f and the eighth conductive wire portion 202h.

Thus, in the second connection 200B of the fifth conductive sheet laminate 10E, the number Na of the thin metal wires extending from a plurality of contact points between the one second large lattice 24Ba and the second connection 200B inward the second connection 200B is 4, the number Nb of the thin metal wires between a plurality of intersection points inside the second connection 200B is 8, and the number Nc of the thin metal wires extending from a plurality of contact points between the other second large lattice 24Bb and the second connection 200B inward the second connection 28B is 4. Accordingly, the number N of the connection paths between the adjacent two second large lattices 24B is 4×(8+4−1)=44. Thus, the connection path number N of the second connection 200B of the fifth conductive sheet laminate 10E is larger by 26 than the number (=18) of the connection paths of the second connection 28B in the second conductive part 16B of the first conductive sheet laminate 10A. As a result, in this embodiment, the probability of the complete breakage of the second connection 200B can be further lowered, improving the reliability.

The second connection 200B has four straight protrusions (protruding wires 208B) and a pair of protrusions (protruding wires 232) each including three corners. The protruding wires 208B are respectively connected to: a point on a conductive wire of the fifth conductive wire portion 202e extending along the third direction, which is positioned away from the intersection point with the ninth conductive wire portion 202i toward the first intersection point P1 by a distance equal to the length of the side of the small lattice 26; the first intersection point P1; a point on a conductive wire of the sixth conductive wire portion 202f extending along the third direction, which is positioned away from the intersection point with the tenth conductive wire portion 202j toward the sixth intersection point P6 by a distance equal to the length of the side of the small lattice 26; and the sixth intersection point P6.

The protruding wires 232 are respectively connected to the fifth conductive wire portion 202e at the vertex (corner) on the other second large lattice 24Bb side, and to the sixth conductive wire portion 202f at the vertex (corner) on the one second large lattice 24Ba side.

As can be seen from FIG. 20, the protruding wire 232 includes a first straight wire 234 extending outward from the fifth conductive wire portion 202e (or sixth conductive wire portion 202f) in the fourth direction, a second straight wire 236 extending from a tip end of the first straight wire 234 toward the second large lattice 24B, a third straight wire 238 extending outward from a tip end of the second straight wire 236, and a fourth straight wire 240 extending from a tip end of the third straight wire 238 toward the side opposite to the second large lattice 24B.

A second auxiliary pattern 212B contains U-shaped patterns (gate shaped patterns) 218B arranged along the side of the second large lattice 24B perpendicular to the third direction, U-shaped patterns (gate shaped patterns) 218B arranged along the side of the second large lattice 24B perpendicular to the fourth direction, and combined patterns 242. The combined pattern 242 is provided between the second large lattice 24B forming adjacent second conductive patterns 18B and the above-mentioned U-shaped pattern 218B.

Each of the U-shaped patterns 218B is composed of three straight thin metal wires having the same length as the side of the small lattice 26. Each of the U-shaped patterns 218B is positioned at a predetermined distance from the second large lattices 24B (a distance equal to the side length of the small lattice 26 in this example). The combined pattern 242 is formed by connecting a square frame pattern and an L-shaped pattern into the shape of 9 or 6 of Arabic numeral. The square frame pattern has the same shape and size as the small lattice 26, and the L-shaped pattern is composed of two straight thin metal wires having the same axial length as the side of the small lattice 26.

Figure 21:
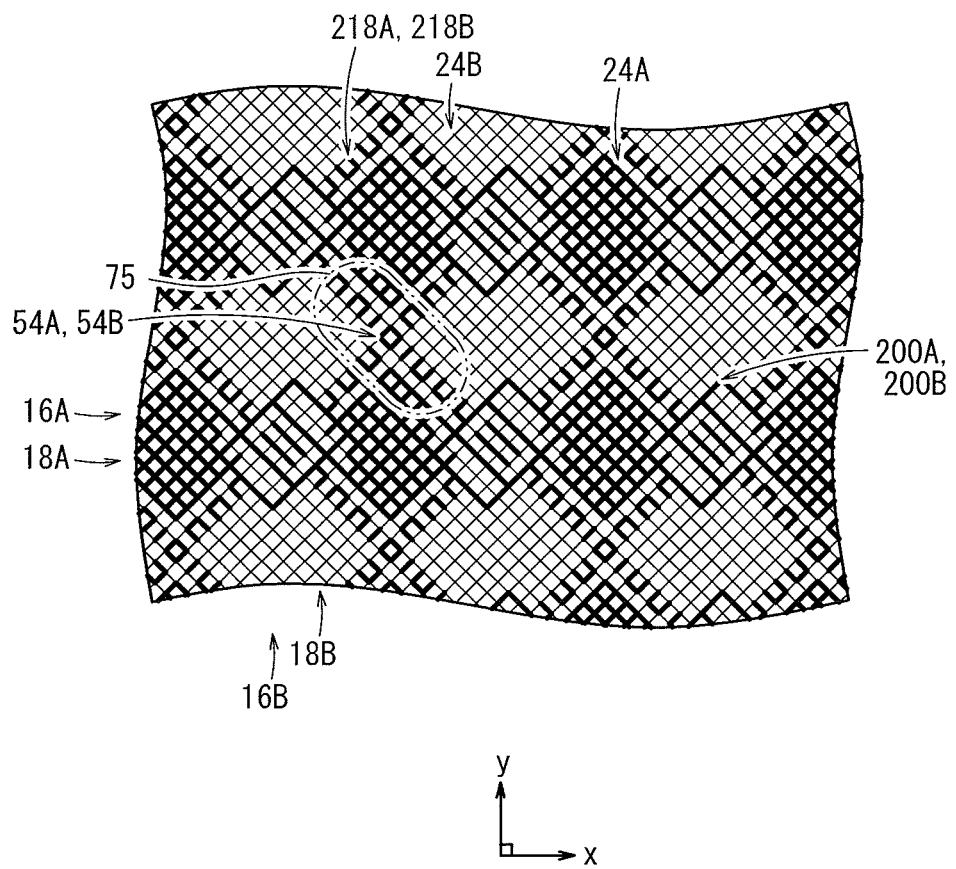
FIG. 21 is a plan view partially showing an example of the fifth conductive sheet laminate formed by combining the first and second conductive sheets.

Accordingly, when the first conductive sheet 12A and the second conductive sheet 12B are stacked to form the fifth conductive sheet laminate 10E, because the first conductive part 16A is provided with the protruding wires 52A, the protruding wires 208A and the first auxiliary patterns 212A, and the second conductive part 16B is provided with the protruding wires 230, the protruding wires 208B, the protruding wires 232 and the second auxiliary patterns 212B, the conductive parts cannot be distinguishable from the small lattices 26 in the first large lattices 24A or the second large lattices 24B, so that the visibility is improved (see FIG. 21).

Although the second large lattice 24B is made larger than the first large lattices 24A in the present embodiment, the second large lattice 24B may be smaller than the first large lattice 24A. In this manner, the size of the first large lattice 24A can be made different from the size of the second large lattice 24B, leading to increased variations of the combination of the first conductive sheet 12A and second conductive sheet 12B.

Next, a conductive sheet laminate according to the sixth embodiment (hereinafter referred to as the sixth conductive sheet laminate 10F) will be described below with reference to FIGS. 22 to 24.

The sixth conductive sheet laminate 10F differs from the above-mentioned fifth conductive sheet laminate 10E in the following respects.

Figure 22:
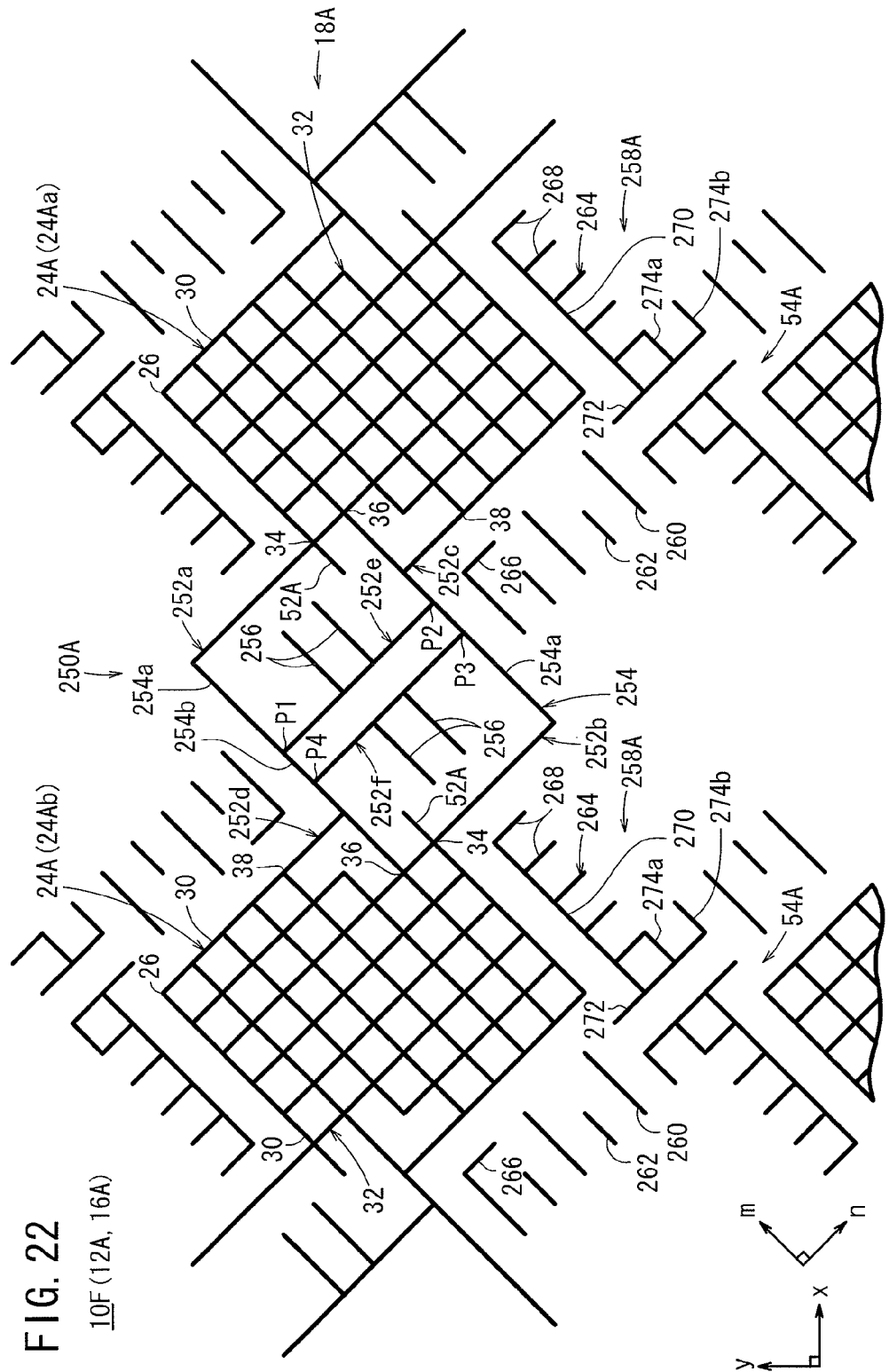
FIG. 22 is a plan view showing a pattern example of a first conductive part formed on a first conductive sheet of a conductive sheet laminate according to a sixth embodiment (a sixth conductive sheet laminate)

Thus, as shown in FIG. 22, the first conductive part 16A according to this embodiment is different in a first connection 250A. The first connection 250A includes a first conductive wire portion 252a having a shape identical to the first conductive wire portion 202a and a second conductive wire portion 252b having a shape identical to the second conductive wire portion 202b, and forms one rectangular portion 254 incorporating both the first conductive wire portion 252a and the second conductive wire portion 252b.

Further, the first connection 250A has a third conductive wire portion 252c extending in the fourth direction from the third contact point 38 of the one first large lattice 24Aa to the second conductive wire portion 252b, a fourth conductive wire portion 252d extending in the fourth direction from the third contact point 38 of the other first large lattice 24Ab to the first conductive wire portion 252a, a fifth conductive wire portion 252e and a sixth conductive wire portion 252f, each connecting a conductive wire of the first conductive wire portion 252a along the third direction and a conductive wire of the second conductive wire portion 252b along the third direction.

The first connection 250A includes an intersection point P1 between the first conductive wire portion 252a and the fifth conductive wire portion 252e, an intersection point P2 between the second conductive wire portion 252b and the fifth conductive wire portion 252e, an intersection point P3 between the second conductive wire portion 252b and the sixth conductive wire portion 252f, and an intersection point P4 between the first conductive wire portion 252a and the sixth conductive wire portion 252f.

The rectangular portion 254 has first rectangular portions 254a and second rectangular portion 254b, like the rectangular portion 204. In the first rectangular portions 254a, the long side is 5 times longer than the side of the small lattice 26, and the short side is 3 times longer than the side of the small lattice 26. In the second rectangular portion 254b, the long side is 5 times longer than the side of the small lattice 26, and the short side has the same length as the side of the small lattice 26. Thus, in the first connection 250A according to the present embodiment, the inequality of La>Lb is satisfied, i.e., La=3× Lb in this example.

Further, the first connection 250A is provided with four protrusions (protruding wires 256). Specifically, the protruding wire 256 is connected to: a point on the fifth conductive wire portion 252e, which is positioned away from the first intersection point P1 by a distance two times the length of the side of the small lattice 26; a point on the fifth conductive wire portion 252e, which is positioned away from the second intersection point P2 by a distance two times the length of the side of the small lattice 26; a point on the sixth conductive wire portion 252f, which is positioned away from the third intersection point P3 by a distance two times the length of the side of the small lattice 26; and a point on the sixth conductive wire portion 252f, which is positioned away from the fourth intersection point P4 by a distance two times the length of the side of the small lattice 26. The protruding wire 256 is composed of a straight thin metal wire having a length two times the length of the side of the small lattice 26.

As is clear from FIG. 22, the first contact points 34 of the first large lattices 24A are provided with protruding wires 52A.

The first auxiliary pattern 258A has a plurality of auxiliary long wires 260 arranged along the side of the first large lattice 24A perpendicular to the third direction, a plurality of auxiliary short wires 262 disposed between the auxiliary long wires 260, and a combined pattern 264 arranged to face the straight side 30 of the first large lattice 24A extending along the third direction.

The axial length of each of the auxiliary long wires 260 is two times the side length of the small lattice 26. Each of the auxiliary long wires 260 is positioned at a predetermined distance from the first large lattice 24A (a distance equal to the side length of the small lattice 26 in this example). The axial length of each of the auxiliary short wires 262 is the same as the side length of the small lattice 26. Each of the auxiliary short wires 262 is positioned at a predetermined distance from the first large lattice 24A (a distance two times the side length of the small lattice 26 in this example).

As shown in FIG. 22, an end of the auxiliary long wire 260 closest to the first connection 250A on the side of the first large lattice 24A is connected to an auxiliary wire 266 extending along the fourth direction. That is, the auxiliary long wire 260 and the auxiliary wire 266 are combined to form an L-shaped pattern.

The combined pattern 264 has a plurality of (5 in FIG. 22) auxiliary wires 268 arranged along the side of the first large lattice 24A perpendicular to the fourth direction, a long auxiliary wire 270 connecting each end of these auxiliary wires 268 on the side of the first large lattices 24A, an auxiliary wire 272 extending along the fourth direction and connected to an end of the auxiliary wire 270 on the side of the first insulation 54A, and a pair of auxiliary wires 274a, 274b extending from the auxiliary wire 272 along the third direction.

The axial length of the auxiliary wires 268 and the auxiliary wires 274a, 274b is equal to the side length of the small lattice 26. Each of the auxiliary wires 268 is positioned at a predetermined distance from the first large lattices 24A (a distance equal to the side length of the small lattice 26 in this example). Thus, the combined pattern 264 is separated from the first large lattices 24A.

As is clear from FIG. 22, the auxiliary wire 274a is connected to one of the auxiliary wires 268 to form a square frame pattern, and the auxiliary wire 274b is connected to an end of the auxiliary wire 272 on the side opposite to the position of the first large lattice 24A.

Figure 23:
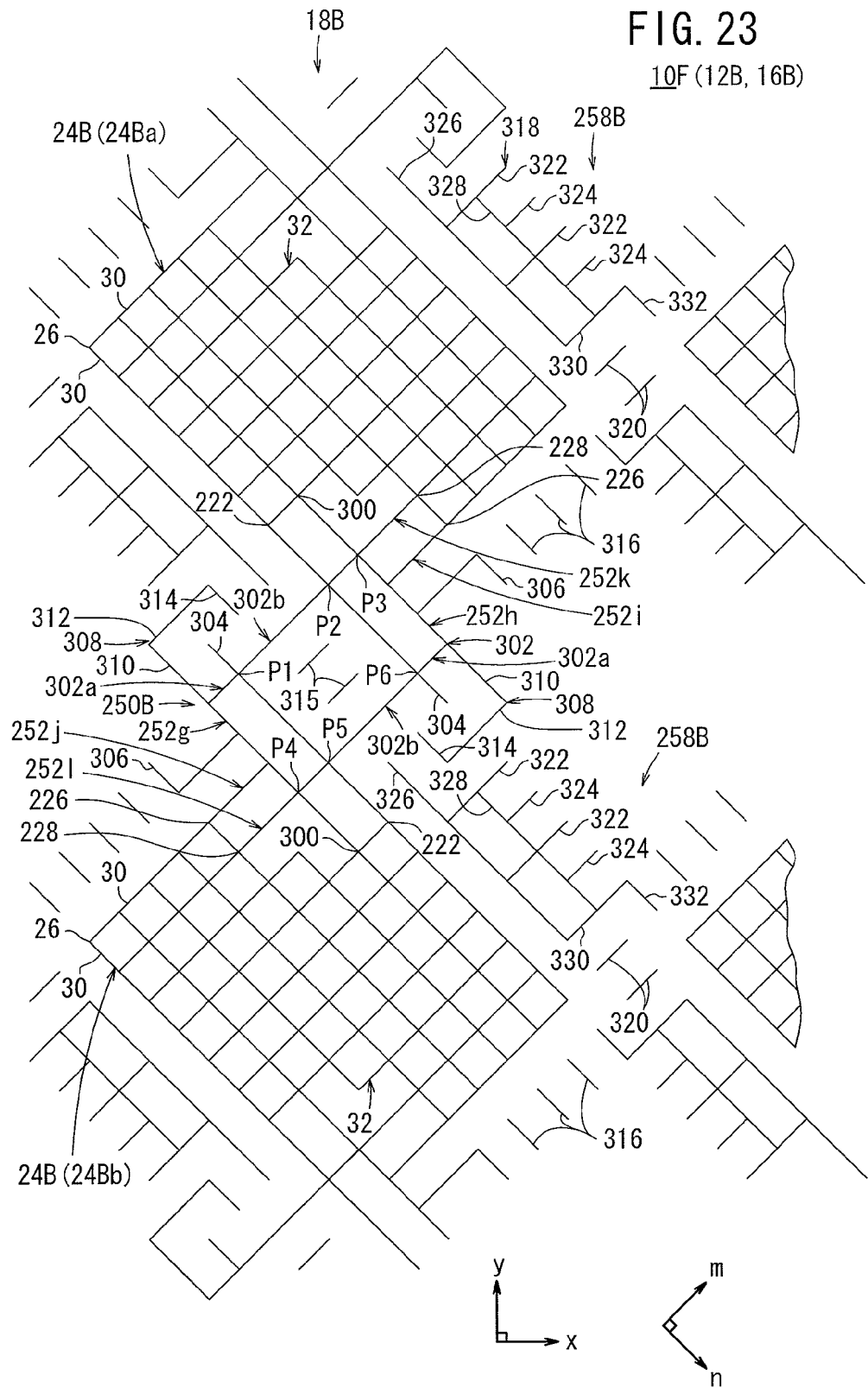
FIG. 23 is a plan view showing a pattern example of a second conductive part formed on a second conductive sheet of the sixth conductive sheet laminate.

Further, as shown in FIG. 23, in the second conductive part 16B according to the present embodiment, the second large lattices 24B are formed to have a substantially rectangular shape. That is, the second large lattices 24B have a size and a shape different from those of the first large lattices 24A. In this example, the long side of the second large lattices 24B extends along the fourth direction.

The connecting points (contact points) between one second large lattice 24B and a second connection 250B are a first contact point 222, a second contact point 300, a third contact point 226 and a fourth contact point 228. The second contact point 300 corresponds to the vertex of the small lattice 26 of the second large lattice 24B, which is positioned at the zigzag side 32 and away from the first contact point 222 by a distance equal to the side length of the small lattice 26. In FIG. 23, the protruding wires 230 shown in FIG. 20 are omitted.

The second connection 250B has a seventh conductive wire portion 252g identical to the fifth conductive wire portion 202e, an eighth conductive wire portion 252h identical to the sixth conductive wire portion 202f, a ninth conductive wire portion 252i extending in the third direction from the third contact point 226 of the one second large lattice 24Ba to the eighth conductive wire portion 252h, a tenth conductive wire portion 252j extending in the third direction from the third contact point 226 of the other second large lattice 24Bb to the seventh conductive wire portion 252g, an eleventh conductive wire portion 252k, which has one corner, contacts the seventh conductive wire portion 252g, and connects the fourth contact point 228 of the one second large lattice 24Ba to the eighth conductive wire portion 252h, and a twelfth conductive wire portion 252l, which has one corner, contacts the eighth conductive wire portion 252h, and connects the fourth contact point 228 of the other second large lattice 24Bb to the seventh conductive wire portion 252g.

Further, the second connection 250B includes an intersection point P1 between the conductive wire of the seventh conductive wire portion 252g extending along the third direction and the conductive wire of the twelfth conductive wire portion 252l extending along the fourth direction, an intersection point P2 between the seventh conductive wire portion 252g and the eleventh conductive wire portion 252k, an intersection point P3 between the conductive wire of the eighth conductive wire portion 252h extending along the fourth direction and the conductive wire of the eleventh conductive wire portion 252k extending along the third direction, an intersection point P4 between the conductive wire of the seventh conductive wire portion 252g extending along the fourth direction and the conductive wire of the twelfth conductive wire portion 252l extending along the third direction, an intersection point P5 between the eighth conductive wire portion 252h and the twelfth conductive wire portion 252l, and an intersection point P6 of the conductive wire of the eighth conductive wire portion 252h extending along the third direction and the conductive wire of the eleventh conductive wire portion 252k extending along the fourth direction.

In this manner, a rectangular portion 302 is formed by the conductive wire of the seventh conductive wire portion 252g extending between the second intersection point P2 and the fourth intersection point P4, the conductive wire of the eighth conductive wire portion 252h extending between the third intersection point P3 and the fifth intersection point P5, the conductive wire of the eleventh conductive wire portion 252k extending between the second intersection point P2 and the third intersection point P3, and the conductive wire of the twelfth conductive wire portion 252*l* extending between the fourth intersection point P4 and the fifth intersection point P5.

The long sides of the rectangular portion 302 extend along the third direction. The rectangular portion 302 contains a small rectangular portion 302*a* on the one second large lattice 24Ba side having the second intersection point P2, the third intersection point P3 and the sixth intersection point P6, a square portion 302*b* having the first intersection point P1, the second intersection point P2, the fifth intersection point P5 and the sixth intersection point P6, and the small rectangular portion 302*a* on the other second large lattice 24Bb side having the first intersection point P1, the fourth intersection point P4 and the fifth intersection point P5.

The small rectangular portion 302*a* has a long side length four times the side length of the small lattice 26, and a short side length equal to the side length of the small lattice 26. The second square portion 302*b* has a side length three times the side length of the small lattice 26. Accordingly, the second connection 250B according to the present embodiment satisfies La>Lb, i.e., La=3×Lb in this example.

Further, the second connection 250B includes a pair of straight protrusions (protruding wires 304), a pair of protrusions (protruding wires 306) each having one corner, and a pair of protrusions (protruding wires 308) each having two corners. The protruding wires 304 are respectively connected to the first intersection point P1 and the sixth intersection point P6.

The pair of protruding wires 306 are connected respectively to a point on the seventh conductive wire portion 252*g*, which is positioned away from the fourth intersection point P4 by a distance two times the side of the small lattice 26 toward the first intersection point P1, and to a point on the eighth conductive wire portion 252*h*, which is positioned away from the third intersection point P3 by a distance two times the side of the small lattice 26 toward the sixth intersection point P6. Each of the protruding wires 306 has an L shape.

The pair of the protruding wires 308 are connected respectively to the seventh conductive wire portion 252*g* at the vertex (corner) on the other second large lattice 24Bb side, and to the eighth conductive wire portion 252*h* at the vertex (corner) on the one second large lattice 24Ba side. Each of the protruding wires 308 includes a first straight wire 310 extending outward from the seventh conductive wire portion 252*g* (or the eighth conductive wire portion 252*h*) in the fourth direction, a second straight wire 312 extending from a tip end of the first straight wire 310 toward the second large lattice 24B, and the third straight wire 314 extending inward from the tip end of the second straight wire 312.

A second auxiliary pattern 258B has a pair of parallel auxiliary wires 315 arranged inside the second rectangular portion 302*b* of the second connection 250B, a plurality of auxiliary wires 316 arranged along the side of the second large lattice 24B perpendicular to the fourth direction, a combined pattern 318 arranged to face the straight side 30 of the second large lattice 24B extending along the fourth direction, and a pair of auxiliary wires 320 arranged in parallel at the second insulation 54B.

The pair of the auxiliary wires 315 has the same length in the third direction and is apart from each other in the fourth direction. The pair of the auxiliary wires 320 is arranged in the same manner. Each of the axial lengths of the auxiliary wires 315, 316, 320 is equal to the side length of the small lattice 26. Each of the auxiliary wires 316 is positioned at a predetermined distance from the second large lattice 24B (a distance equal to the side length of the small lattice 26 in this example).

The combined pattern 318 has auxiliary long wires 322 and auxiliary short wires 324 arranged alternately along the side of the second large lattice 24B perpendicular to the third direction, a long auxiliary wire 326 extending in the fourth direction and connecting each end of the auxiliary long wires 322 on the second large lattice 24B side, a long auxiliary wire 328 extending in the fourth direction and connecting each end of the auxiliary short wires 324 on the second large lattice 24B side, an auxiliary wire 330 extending in the third direction and connecting each end of the auxiliary wires 328 on the second insulation 54B side, and an auxiliary wire 332 extending outward form the end of the auxiliary wire 330 positioned opposite to the second large lattice 24B.

The axial length of each auxiliary long wire 322 is two times the side length of the small lattice 26. Each of the auxiliary long wires 322 is positioned at a predetermined distance from the second large lattice 24B (a distance equal to the side length of the small lattice 26 in this example). The axial length of each auxiliary short wire 324 is equal to the side length of the small lattice 26. Each of the auxiliary short wires 324 is positioned at a predetermined distance from the second large lattice 24B (a distance equal to the side length of the small lattice 26 in this example). Thus, the combined pattern 318 is separated from the second large lattices 24B.

Figure 24:
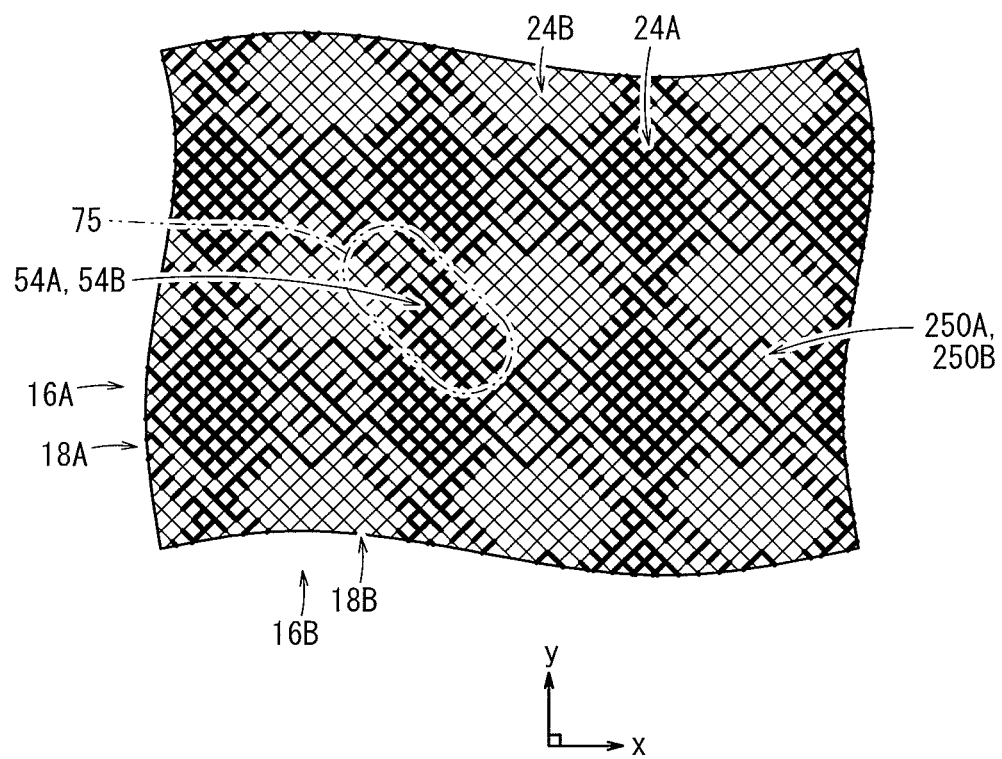
FIG. 24 is a plan view partially showing an example of the sixth conductive sheet laminate formed by combining the first and second conductive sheets.

Accordingly, when the first conductive sheet 12A and the second conductive sheet 12B are stacked to form the sixth conductive sheet laminate 10F, because the first conductive part 16A is provided with the protruding wires 52A, the protruding wires 256 and the first auxiliary patterns 258A, and the second conductive part 16B is provided with the protruding wires 304, the protruding wires 306, the protruding wires 312 and the second auxiliary patterns 258B, the conductive parts cannot be distinguishable from the small lattices 26 in the first large lattices 24A or the second large lattices 24B, so that the visibility is improved (see FIG. 24).

Although the first large lattice 24A is formed into a substantially square shape and the second large lattice 24B is formed into a substantially rectangular shape, the first large lattice 24A may be formed into a substantially rectangular shape and the second large lattice 24B may be formed into a substantially square shape. In this manner, the shape of the first large lattice 24A can be made different from the shape of the second large lattice 24B, leading to increased variations of the combination of the first conductive sheet 12A and second conductive sheet 12B.

Though the first conductive sheet 12A and the second conductive sheet 12B are used in the projected capacitive touch panel 100 in the above embodiments, they can be used in a surface capacitive touch panel or a resistive touch panel.

The first conductive patterns 18A and the second conductive patterns 18B may be formed as follows. For example, a photosensitive material having the first transparent substrate 14A or the second transparent substrate 14B and thereon a photosensitive silver halide-containing emulsion layer may be exposed and developed, whereby metallic silver portions and light-transmitting portions may be formed in the exposed areas and the unexposed areas respectively to obtain the first conductive patterns 18A or the second conductive patterns 18B. The metallic silver portions may be subjected to a physical development treatment and/or a plating treatment to deposit a conductive metal thereon.

As shown in FIG. 2B, the first conductive patterns 18A may be formed on one main surface of the first transparent substrate 14A, and the second conductive patterns 18B may be formed on the other main surface thereof. In this case, when the one main surface is exposed and then the other main surface is exposed in the usual method, the desired first conductive patterns 18A and second conductive patterns 18B cannot be obtained occasionally. In particular, it is difficult to uniformly form the pattern of the first auxiliary wires 56A arranged along the straight side 30 of the first large lattice 24A, the first L-shaped pattern 58A arranged in the first insulation 54A, the pattern of the second auxiliary wires 56B arranged along the straight side 30 of the second large lattice 24B, the second L-shaped pattern 58B arranged in the second insulation 54B, and the like.

Therefore, the following production method can be preferably used.

Thus, the first conductive patterns 18A on the one main surface and the second conductive patterns 18B on the other main surface are formed by subjecting the photosensitive silver halide emulsion layers on both sides of the first transparent substrate 14A to one-shot exposure.

A specific example of the production method will be described below with reference to FIGS. 25 to 27.

Figure 25:
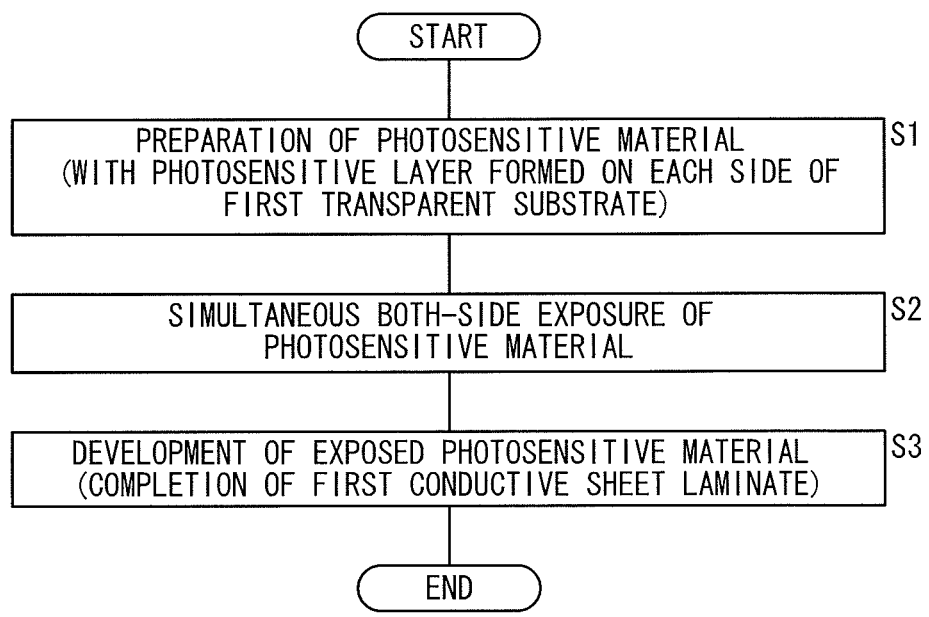
FIG. 25 is a flow chart of a method for producing the first conductive sheet laminate.
Figure 26A:
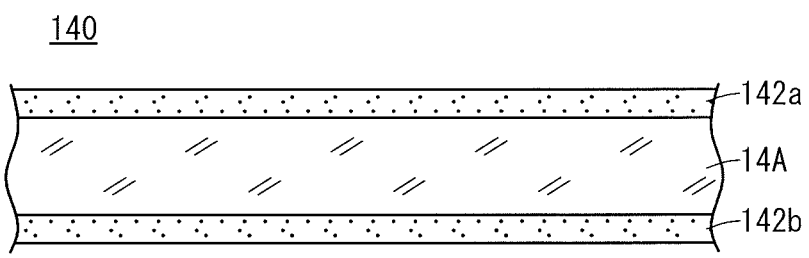
FIG. 26A is a cross-sectional view partially showing a produced photosensitive material.

First, in the step S1 of FIG. 25, a long photosensitive material 140 is prepared. As shown in FIG. 26A, the photosensitive material 140 has the first transparent substrate 14A, a photosensitive silver halide emulsion layer (hereinafter referred to as the first photosensitive layer 142a) formed on one main surface of the first transparent substrate 14A, and a photosensitive silver halide emulsion layer (hereinafter referred to as the second photosensitive layer 142b) formed on the other main surface of the first transparent substrate 14A.

Figure 26B:
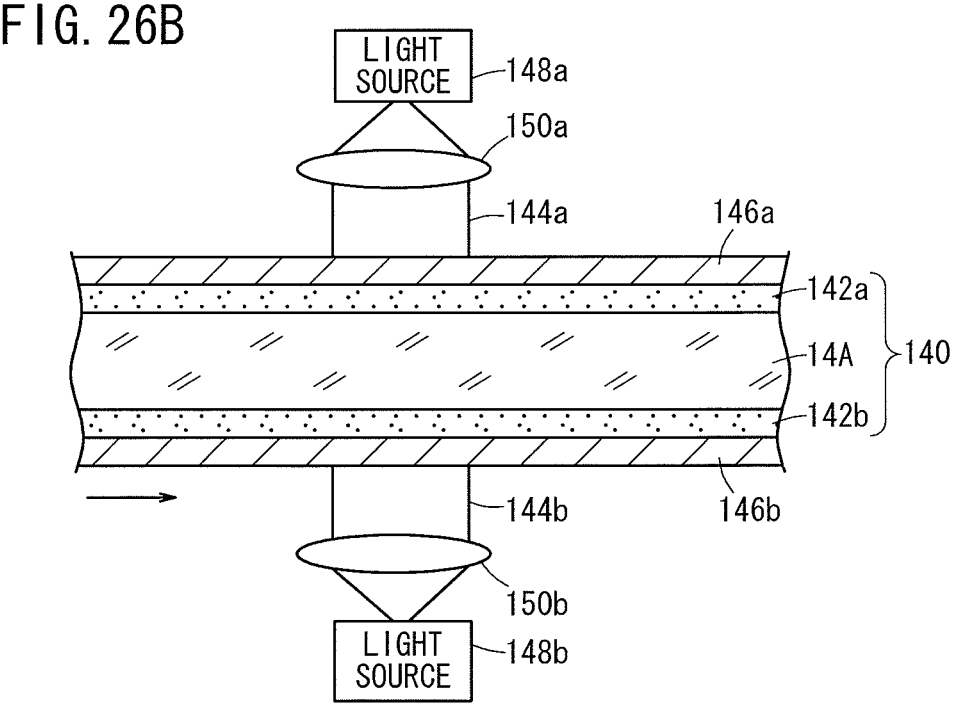
FIG. 26B is an explanatory view showing a simultaneous both-side exposure of the photosensitive material.

In the step S2 of FIG. 25, the photosensitive material 140 is exposed. In this step, a simultaneous both-side exposure, which includes a first exposure treatment for irradiating the first photosensitive layer 142a on the first transparent substrate 14A with a light in a first exposure pattern and a second exposure treatment for irradiating the second photosensitive layer 142b on the first transparent substrate 14A with a light in a second exposure pattern, is carried out. In the example of FIG. 26B, the first photosensitive layer 142a is irradiated through a first photomask 146a with a first light 144a (a parallel light), and the second photosensitive layer 142b is irradiated through a second photomask 146b with a second light 144b (a parallel light), while conveying the long photosensitive material 140 in one direction. The first light 144a is such that a light from a first light source 148a is converted to a parallel light by an intermediate first collimator lens 150a, and the second light 144b is such that a light from a second light source 148b is converted to a parallel light by an intermediate second collimator lens 150b. Though two light sources (the first light source 148a and the second light source 148b) are used in the example of FIG. 26B, only one light source may be used. In this case, a light from the one light source may be divided by an optical system into the first light 144a and the second light 144b for exposing the first photosensitive layer 142a and the second photosensitive layer 142b.

In the step S3 of FIG. 25, the exposed photosensitive material 140 is developed to prepare the first conductive sheet laminate 10A shown in FIG. 2B. The first conductive sheet laminate 10A has the first transparent substrate 14A, the first conductive part 16A (including the first conductive patterns 18A) formed in the first exposure pattern on the one main surface of the first transparent substrate 14A, and the second conductive part 16B (including the second conductive patterns 18B) formed in the second exposure pattern on the other main surface of the first transparent substrate 14A. Preferred exposure time and development time for the first photosensitive layer 142a and the second photosensitive layer 142b depend on the types of the first light source 148a, the second light source 148b, and a developer, etc., and cannot be categorically determined. The exposure time and development time may be selected in view of achieving a development ratio of 100%.

Figure 27:
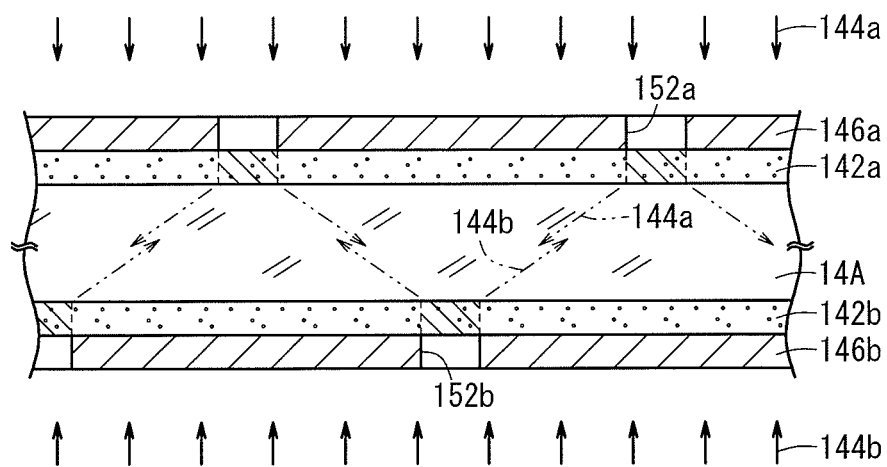
FIG. 27 is an explanatory view showing first and second exposure treatments performed while preventing a light incident on a first photosensitive layer to a second photosensitive layer and a light incident on the second photosensitive layer to the first photosensitive layer from being transmitted.

As shown in FIG. 27, in the first exposure treatment in the production method of this embodiment, for example, the first photomask 146a is placed in close contact with the first photosensitive layer 142a, the first light source 148a is arranged facing the first photomask 146a, and the first light 144a is emitted from the first light source 148a toward the first photomask 146a, so that the first photosensitive layer 142a is exposed. The first photomask 146a has a glass substrate composed of a transparent soda glass and a mask pattern (a first exposure pattern 152a) formed thereon. Therefore, in the first exposure treatment, areas in the first photosensitive layer 142a, corresponding to the first exposure pattern 152a in the first photomask 146a, are exposed. A space of approximately 2 to 10 μm may be formed between the first photosensitive layer 142a and the first photomask 146a.

Similarly, in the second exposure treatment, for example, the second photomask 146b is placed in close contact with the second photosensitive layer 142b, the second light source 148b is arranged facing the second photomask 146b, and the second light 144b is emitted from the second light source 148b toward the second photomask 146b, so that the second photosensitive layer 142b is exposed. The second photomask 146b, as well as the first photomask 146a, has a glass substrate composed of a transparent soda glass and a mask pattern (a second exposure pattern 152b) formed thereon. Therefore, in the second exposure treatment, areas in the second photosensitive layer 142b, corresponding to the second exposure pattern 152b in the second photomask 146b, are exposed. In this case, a space of approximately 2 to 10 μm may be formed between the second photosensitive layer 142b and the second photomask 146b.

In the first and second exposure treatments, the emission of the first light 144a from the first light source 148a and the emission of the second light 144b from the second light source 148b may be carried out simultaneously or independently. When the emissions are simultaneously carried out, the first photosensitive layer 142a and the second photosensitive layer 142b can be simultaneously exposed in one exposure process to reduce the treatment time.

In a case where both of the first photosensitive layer 142a and the second photosensitive layer 142b are not spectrally sensitized, a light incident on one side may affect the image formation on the other side (the back side) in the both-side exposure of the photosensitive material 140.

Thus, the first light 144a from the first light source 148a reaches the first photosensitive layer 142a and is scattered by silver halide particles in the first photosensitive layer 142a, and a part of the scattered light is transmitted through the first transparent substrate 14A and reaches the second photosensitive layer 142b. Then, a large area of the boundary between the second photosensitive layer 142b and the first transparent substrate 14A is exposed to form a latent image. As a result, the second photosensitive layer 142b is exposed to the second light 144b from the second light source 148b and the first light 144a from the first light source 148a. When the second photosensitive layer 142b is developed to prepare the first conductive sheet laminate 10A, the conductive pattern corresponding to the second exposure pattern 152b (the second conductive part 16B) is formed, and additionally a thin conductive layer is formed due to the first light 144a from the first light source 148a between the conductive patterns, so that the desired pattern (corresponding to the second exposure pattern 152b) cannot be obtained. This is true also for the first photosensitive layer 142a.

As a result of intense research in view of solving this problem, it has been found that when the thicknesses and the applied silver amounts of the first photosensitive layer 142a and the second photosensitive layer 142b are selected within particular ranges, the incident light can be absorbed by the silver halide to suppress the light transmission to the back side. In this embodiment, the thicknesses of the first photosensitive layer 142a and the second photosensitive layer 142b may be 1 to 4 μm. The upper limit is preferably 2.5 μm. The applied silver amounts of the first photosensitive layer 142a and the second photosensitive layer 142b may be 5 to 20 g/m$^2$.

In the above described both-side contact exposure technology, the exposure may be inhibited by dust or the like attached to the film surface to generate an image defect. It is known that the dust attachment can be prevented by applying a conductive substance such as a metal oxide or a conductive polymer to the film. However, the metal oxide or the like remains in the processed product, deteriorating the transparency of the final product, and the conductive polymer is disadvantageous in storage stability, etc. As a result of intense research, it has been found that a silver halide layer with reduced binder content exhibits a satisfactory conductivity for static charge prevention. Thus, the volume ratio of silver/binder is limited in the first photosensitive layer 142a and the second photosensitive layer 142b. The silver/binder volume ratios of the first photosensitive layer 142a and the second photosensitive layer 142b are 1/1 or more, preferably 2/1 or more.

When the thicknesses, the applied silver amounts, and the silver/binder volume ratios of the first photosensitive layer 142a and the second photosensitive layer 142b are selected as described above, the first light 144a emitted from the first light source 148a to the first photosensitive layer 142a does not reach the second photosensitive layer 142b as shown in FIG. 27. Similarly, the second light 144b emitted from the second light source 148b to the second photosensitive layer 142b does not reach the first photosensitive layer 142a. As a result, in the following development for producing the first conductive sheet laminate 10A, as shown in FIG. 2B, only the conductive pattern corresponding to the first exposure pattern 152a (the pattern of the first conductive part 16A) is formed on the one main surface of the first transparent substrate 14A, and only the conductive pattern corresponding to the second exposure pattern 152b (the pattern of the second conductive part 16B) is formed on the other main surface of the first transparent substrate 14A, so that the desired pattern can be obtained.

In the production method using the above one-shot both-side exposure, the first photosensitive layer 142a and the second photosensitive layer 142b can have both of the satisfactory conductivity and both-side exposure suitability, and the same or different patterns can be formed on the sides of the first transparent substrate 14A by the exposure, whereby the electrodes of the touch panel 100 can be easily formed, and the touch panel 100 can be made thinner (smaller).

In the above production method, the first conductive patterns 18A and the second conductive patterns 18B are formed using the photosensitive silver halide emulsion layer. The other production methods include the following methods.

A photoresist film on a copper foil disposed on the first transparent substrate 14A or the second transparent substrate 14B may be exposed and developed to form a resist pattern, and the copper foil exposed from the resist pattern may be etched to obtain the first conductive part 16A or the second conductive part 16B.

Alternatively, a paste containing fine metal particles may be printed on the first transparent substrate 14A or the second transparent substrate 14B, and the printed paste may be plated with a metal to obtain the first conductive part 16A or the second conductive part 16B.

The first conductive part 16A or the second conductive part 16B may be printed on the first transparent substrate 14A or the second transparent substrate 14B by using a screen or gravure printing plate.

The first conductive patterns 18A or the second conductive patterns 18B may be formed on the first transparent substrate 14A or the second transparent substrate 14B by using an inkjet method.

A particularly preferred method, which contains using a photographic photosensitive silver halide material for producing the first conductive sheet 12A and the second conductive sheet 12B according to this embodiment, will be mainly described below.

The method for producing the first conductive sheet 12A and the second conductive sheet 12B of this embodiment includes the following three processes different in the photosensitive materials and development treatments.

(1) A process comprising subjecting a photosensitive black-and-white silver halide material free of physical development nuclei to a chemical or thermal development to form the metallic silver portions on the material.

(2) A process comprising subjecting a photosensitive black-and-white silver halide material having a silver halide emulsion layer containing physical development nuclei to a solution physical development to form the metallic silver portions on the material.

(3) A process comprising subjecting a stack of a photosensitive black-and-white silver halide material free of physical development nuclei and an image-receiving sheet having a non-photosensitive layer containing physical development nuclei to a diffusion transfer development to form the metallic silver portions on the non-photosensitive image-receiving sheet.

In the process of (1), an integral black-and-white development procedure is used to form a transmittable conductive film such as a light-transmitting conductive film on the photosensitive material. The resulting silver is a chemically or thermally developed silver containing a high-specific surface area filament, and thereby shows a high activity in the following plating or physical development treatment.

In the process of (2), the silver halide particles are melted around and deposited on the physical development nuclei in the exposed areas to form a transmittable conductive film such as a light-transmitting conductive film on the photosensitive material. Also in this process, an integral black-and-white development procedure is used. Though high activity can be achieved since the silver halide is deposited on the physical development nuclei in the development, the developed silver has a spherical shape with small specific surface.

In the process of (3), the silver halide particles are melted in the unexposed areas, and are diffused and deposited on the development nuclei of the image-receiving sheet, to form a transmittable conductive film such as a light-transmitting conductive film on the image-receiving sheet. In this process, a so-called separate-type procedure is used, the image-receiving sheet being peeled off from the photosensitive material.

A negative or reversal development treatment can be used in the processes. In the diffusion transfer development, the negative development treatment can be carried out using an auto-positive photosensitive material.

The chemical development, thermal development, solution physical development, and diffusion transfer development have the meanings generally known in the art, and are explained in common photographic chemistry texts such as Shin-ichi Kikuchi, "Shashin Kagaku (Photographic Chemistry)", Kyoritsu Shuppan Co., Ltd., 1955 and C. E. K. Mees, "The Theory of Photographic Processes, 4th ed.", Mcmillan, 1977. A liquid treatment is generally used in the present invention, and also a thermal development treatment can be utilized. For example, techniques described in Japanese Laid-Open Patent Publication Nos. 2004-184693, 2004-334077, and 2005-010752 and Japanese Patent Application Nos. 2004-244080 and 2004-085655 can be used in the present invention.

The structure of each layer in the first conductive sheet 12A and the second conductive sheet 12B of this embodiment will be described in detail below.

[First Transparent Substrate 14A and Second Transparent Substrate 14B]

The first transparent substrate 14A and the second transparent substrate 14B may be a plastic film, a plastic plate, a glass plate, etc.

Examples of materials for the plastic film and the plastic plate include polyesters such as polyethylene terephthalates (PET) and polyethylene naphthalates (PEN); polyolefins such as polyethylenes (PE), polypropylenes (PP), polystyrenes, and EVA; vinyl resins; polycarbonates (PC); polyamides; polyimides; acrylic resins; and triacetyl celluloses (TAC).

The first transparent substrate 14A and the second transparent substrate 14B are preferably a film or plate of a plastic having a melting point of about 290° C. or lower, such as PET (melting point 258° C.), PEN (melting point 269° C.), PE (melting point 135° C.), PP (melting point 163° C.), polystyrene (melting point 230° C.), polyvinyl chloride (melting point 180° C.), polyvinylidene chloride (melting point 212° C.), or TAC (melting point 290° C.). The PET is particularly preferred from the viewpoints of light transmittance, workability, etc. The conductive film such as the first conductive sheet 12A or the second conductive sheet 12B used in the conductive sheet laminate 10 is required to be transparent, and therefore the first transparent substrate 14A and the second transparent substrate 14B preferably have a high transparency.

[Silver Salt Emulsion Layer]

The silver salt emulsion layer to be converted to the first conductive part 16A of the first conductive sheet 12A (including the first large lattices 24A, the first connections 28A, and the first auxiliary patterns 20A) and the second conductive part 16B of the second conductive sheet 12B (including the second large lattices 24B, the second connections 28B, and the second auxiliary patterns 20B) contains a silver salt and a binder and may further contain a solvent and an additive such as a dye.

The silver salt used in this embodiment may be an inorganic silver salt such as a silver halide or an organic silver salt such as silver acetate. In this embodiment, the silver halide is preferred because of its excellent light sensing property.

The applied silver amount (the amount of the applied silver salt in the silver density) of the silver salt emulsion layer is preferably 1 to 30 g/m², more preferably 1 to 25 g/m², further preferably 5 to 20 g/m². When the applied silver amount is within this range, the resultant conductive sheet laminate 10 can exhibit a desired surface resistance.

Examples of the binders used in this embodiment include gelatins, polyvinyl alcohols (PVA), polyvinyl pyrolidones (PVP), polysaccharides such as starches, celluloses and derivatives thereof, polyethylene oxides, polyvinylamines, chitosans, polylysines, polyacrylic acids, polyalginic acids, polyhyaluronic acids, and carboxycelluloses. The binders show a neutral, anionic, or cationic property depending on the ionicity of a functional group.

In this embodiment, the amount of the binder in the silver salt emulsion layer is not particularly limited, and may be appropriately selected to obtain sufficient dispersion and adhesion properties. The volume ratio of silver/binder in the silver salt emulsion layer is preferably 1/4 or more, more preferably 1/2 or more. The silver/binder volume ratio is preferably 100/1 or less, more preferably 50/1 or less. Particularly, the silver/binder volume ratio is further preferably 1/1 to 4/1, most preferably 1/1 to 3/1. When the silver/binder volume ratio of the silver salt emulsion layer is within the range, the resistance variation can be reduced even under various applied silver amount, whereby the conductive sheet laminate can be produced with a uniform surface resistance. The silver/binder volume ratio can be obtained by converting the silver halide/binder weight ratio of the material to the silver/binder weight ratio, and by further converting the silver/binder weight ratio to the silver/binder volume ratio.

<Solvent>

The solvent used for forming the silver salt emulsion layer is not particularly limited, and examples thereof include water, organic solvents (e.g. alcohols such as methanol, ketones such as acetone, amides such as formamide, sulfoxides such as dimethyl sulfoxide, esters such as ethyl acetate, ethers), ionic liquids, and mixtures thereof.

In this embodiment, the ratio of the solvent to the total of the silver salt, the binder, and the like in the silver salt emulsion layer is 30% to 90% by mass, preferably 50% to 80% by mass.

<Other Additives>

The additives used in this embodiment are not particularly limited, and may be preferably selected from known additives.

[Other Layers]

A protective layer (not shown) may be formed on the silver salt emulsion layer. The protective layer used in this embodiment contains a binder such as a gelatin or a high-molecular polymer, and is disposed on the photosensitive silver salt emulsion layer to improve the scratch prevention or mechanical property. The thickness of the protective layer is preferably 0.5 μm or less. The method of applying or forming the protective layer is not particularly limited, and may be appropriately selected from known applying or forming methods. In addition, an undercoat layer or the like may be formed below the silver salt emulsion layer.

The steps for producing the first conductive sheet 12A and the second conductive sheet 12B will be described below.

[Exposure]

In this embodiment, the first conductive part 16A and the second conductive part 16B may be formed in a printing process, and may be formed by exposure and development treatments, etc. in another process. Thus, a photosensitive material having the first transparent substrate 14A or the second transparent substrate 14B and thereon the silver salt-containing layer or a photosensitive material coated with a photopolymer for photolithography is subjected to the exposure treatment. An electromagnetic wave may be used in the exposure. For example, the electromagnetic wave may be a light such as a visible light or an ultraviolet light, or a radiation ray such as an X-ray. The exposure may be carried out using a light source having a wavelength distribution or a specific wavelength.

The exposure is preferably carried out using a glass mask method or a laser lithography pattern exposure method.

[Development Treatment]

In this embodiment, the emulsion layer is subjected to the development treatment after the exposure. Common development treatment technologies for photographic silver salt films, photographic papers, print engraving films, emulsion masks for photomasking, and the like may be used in the present invention. The developer used in the development treatment is not particularly limited, and may be a PQ developer, an MQ developer, an MAA developer, etc. Examples of commercially available developers usable in the present invention include CN-16, CR-56, CP45X, FD-3, and PAPITOL available from FUJIFILM Corporation, C-41, E-6, RA-4, D-19, and D-72 available from Eastman Kodak Company, and developers contained in kits thereof. The developer may be a lith developer.

In the present invention, the development process may include a fixation treatment for removing the silver salt in the unexposed areas to stabilize the material. Fixation treatment technologies for photographic silver salt films, photographic papers, print engraving films, emulsion masks for photomasking, and the like may be used in the present invention.

In the fixation treatment, the fixation temperature is preferably about 20° C. to 50° C., more preferably 25° C. to 45° C. The fixation time is preferably 5 seconds to 1 minute, more preferably 7 to 50 seconds. The amount of the fixer used is preferably 600 ml/m$^2$ or less, more preferably 500 ml/m$^2$ or less, particularly preferably 300 ml/m$^2$ or less, per 1 m$^2$ of the photosensitive material treated.

The developed and fixed photosensitive material is preferably subjected to a water washing treatment or a stabilization treatment. The amount of water used in the water washing or stabilization treatment is generally 20 L or less, and may be 3 L or less, per 1 m$^2$ of the photosensitive material. The water amount may be 0, and thus the photosensitive material may be washed with storage water.

The ratio of the metallic silver contained in the exposed areas after the development to the silver contained in the areas before the exposure is preferably 50% or more, more preferably 80% or more by mass. When the ratio is 50% or more by mass, a high conductivity can be achieved.

In this embodiment, the tone (gradation) obtained by the development is preferably more than 4.0, though not particularly restrictive. When the tone is more than 4.0 after the development, the conductivity of the conductive metal portion can be increased while maintaining the high transmittance of the light-transmitting portion. For example, the tone of 4.0 or more can be obtained by doping with rhodium or iridium ion.

The conductive sheet is obtained by the above steps. The surface resistance of the resultant conductive sheet is preferably within the range of 0.1 to 100 ohm/sq. The lower limit is preferably 1 ohm/sq or more, 3 ohm/sq or more, 5 ohm/sq or more, or 10 ohm/sq. The upper limit is preferably 70 ohm/sq or less or 50 ohm/sq or less. When the surface resistance is controlled within this range, the position detection can be performed even in a large touch panel having an area of 10 cm×10 cm or more. The conductive sheet may be subjected to a calender treatment after the development treatment to obtain a desired surface resistance.

[Physical Development Treatment and Plating Treatment]

In this embodiment, to increase the conductivity of the metallic silver portion formed by the above exposure and development treatments, conductive metal particles may be deposited thereon by a physical development treatment and/or a plating treatment. In the present invention, the conductive metal particles may be deposited on the metallic silver portion by only one of the physical development and plating treatments or by the combination of the physical development and plating treatments. The metallic silver portion, subjected to the physical development treatment and/or the plating treatment in this manner, is also referred to as the conductive metal portion.

In this embodiment, the physical development is such a process that metal ions such as silver ions are reduced by a reducing agent, whereby metal particles are deposited on a metal or metal compound core. Such physical development has been used in the fields of instant B & W film, instant slide film, printing plate production, etc., and the technologies can be used in the present invention.

The physical development may be carried out at the same time as the above development treatment after the exposure, and may be carried out after the development treatment separately.

In this embodiment, the plating treatment may contain electroless plating such as chemical reduction plating or displacement plating. Known electroless plating technologies for printed circuit boards, etc. may be used in this embodiment. The electroless plating is preferably electroless copper plating.

[Oxidation Treatment]

In this embodiment, the metallic silver portion formed by the development treatment or the conductive metal portion formed by the physical development treatment and/or the plating treatment is preferably subjected to an oxidation treatment. For example, by the oxidation treatment, a small amount of a metal deposited on the light-transmitting portion can be removed, so that the transmittance of the light-transmitting portion can be increased to approximately 100%.

[Conductive Metal Portion]

In this embodiment, the lower limit of the line width of the conductive metal portion (the thin metal wire) is preferably 1 μm or more, 3 μm or more, 4 μm or more, or 5 μm or more, and the upper limit thereof is preferably 15 μm or less, 10 μm or less, 9 μm or less, or 8 μm or less. When the line width is less than the lower limit, the conductive metal portion has an insufficient conductivity, whereby a touch panel using the conductive part has an insufficient detection sensitivity. On the other hand, when the line width is more than the upper limit, moire is significantly generated due to the conductive metal portion, and a touch panel using the conductive part has a poor visibility. When the line width is within the above range, the moire of the conductive metal portion is improved, and the visibility is remarkably improved. The line distance (the distance between the sides facing each other in the small lattice 26) is preferably 30 to 500 μm, more preferably 50 to 400 μm, most preferably 100 to 350 μm. The conductive metal portion may have a part with a line width of more than 200 μm for the purpose of ground connection, etc.

In this embodiment, the opening ratio of the conductive metal portion is preferably 85% or more, more preferably 90% or more, most preferably 95% or more, in view of the visible light transmittance. The opening ratio is the ratio of the light-transmitting portions other than the conductive portions to the entire first conductive part 16A or second conductive part 16B. For example, a square lattice having a line width of 15 μm and a pitch of 300 μm has an opening ratio of 90%.

[Light-Transmitting Portion]

In this embodiment, the light-transmitting portion is a portion having light transmittance, other than the conductive metal portions in the first conductive sheet 12A and the second conductive sheet 12B. The transmittance of the light-transmitting portion, which is herein a minimum transmittance value in a wavelength region of 380 to 780 nm obtained neglecting the light absorption and reflection of the first transparent substrate 14A and the second transparent substrate 14B, is 90% or more, preferably 95% or more, more preferably 97% or more, further preferably 98% or more, most preferably 99% or more.

[First Conductive Sheet 12A and Second Conductive Sheet 12B]

In the first conductive sheet 12A and the second conductive sheet 12B of this embodiment, the thicknesses of the first transparent substrate 14A and the second transparent substrate 14B are preferably 5 to 350 μm, more preferably 30 to 150 μm. When the thicknesses are 5 to 350 μm, a desired visible light transmittance can be obtained, and the substrates can be easily handled.

The thickness of the metallic silver portion formed on the first transparent substrate 14A and the second transparent substrate 14B may be appropriately selected by controlling the thickness of the coating liquid for the silver salt-containing layer applied to the first transparent substrate 14A and the second transparent substrate 14B. The thickness of the metallic silver portion may be selected within a range of 0.001 to 0.2 mm, and is preferably 30 μm or less, more preferably 20 μm or less, further preferably 0.01 to 9 μm, most preferably 0.05 to 5 μm. The metallic silver portion is preferably formed in a patterned shape. The metallic silver portion may have a monolayer structure or a multilayer structure containing two or more layers. When the metallic silver portion has a patterned multilayer structure containing two or more layers, the layers may have different wavelength color sensitivities. In this case, different patterns can be formed in the layers by using exposure lights with different wavelengths.

In the case of using the first conductive sheet 12A or the second conductive sheet 12B in a touch panel, the conductive metal portion preferably has a smaller thickness. As the thickness is reduced, the viewing angle and visibility of the display panel are improved. Thus, the thickness of the layer of the conductive metal on the conductive metal portion is preferably less than 9 μm, more preferably 0.1 μm or more but less than 5 μm, further preferably 0.1 μm or more but less than 3 μm.

In this embodiment, the thickness of the metallic silver portion can be controlled by changing the coating thickness of the silver salt-containing layer, and the thickness of the conductive metal particle layer can be controlled in the physical development treatment and/or the plating treatment, whereby the first conductive sheet 12A and the second conductive sheet 12B having a thickness of less than 5 μm (preferably less than 3 μm) can be easily produced.

The plating or the like is not necessarily carried out in the method for producing the first conductive sheet 12A and the second conductive sheet 12B of this embodiment. This is because the desired surface resistance can be obtained by controlling the applied silver amount and the silver/binder volume ratio of the silver salt emulsion layer in the method for producing the first conductive sheet 12A and the second conductive sheet 12B of this embodiment. The calender treatment or the like may be carried out if necessary.

(Film Hardening Treatment after Development Treatment)

It is preferred that after the silver salt emulsion layer is developed, the resultant is immersed in a hardener and thus subjected to a film hardening treatment. Examples of the hardeners include boric acid, 2,3-dihydroxy-1,4-dioxane, and dialdehydes such as glutaraldehyde and adipaldehyde, described in Japanese Laid-Open Patent Publication No. 02-141279.

In the above example, the first conductive pattern 18A contains the two or more first large lattices 24A connected in series in the first direction, and the second conductive pattern 18B contains the two or more second large lattices 24B connected in series in the second direction. Alternatively, the first conductive pattern 18A may contain two or more transparent ITO (indium tin oxide) film electrodes having a rhombic shape or the like connected in series in the first direction, and the second conductive pattern 18B may contain two or more transparent ITO film electrodes having a rhombic shape or the like connected in series in the second direction.

An additional functional layer such as an antireflection layer or a hard coat layer may be formed in the conductive sheet.

The present invention may be appropriately combined with technologies described in the following patent publications and international patent pamphlets shown in Tables 1 and 2. "Japanese Laid-Open Patent", "Publication No.", "Pamphlet No.", etc. are omitted.

TABLE 1

| | | | | |
|---|---|---|---|---|
| 2004-221564 | 2004-221565 | 2007-200922 | 2006-352073 | 2007-129205 |
| 2007-235115 | 2007-207987 | 2006-012935 | 2006-010795 | 2006-228469 |
| 2006-332459 | 2009-21153 | 2007-226215 | 2006-261315 | 2007-072171 |
| 2007-102200 | 2006-228473 | 2006-269795 | 2006-269795 | 2006-324203 |
| 2006-228478 | 2006-228836 | 2007-009326 | 2006-336090 | 2006-336099 |
| 2006-348351 | 2007-270321 | 2007-270322 | 2007-201378 | 2007-335729 |
| 2007-134439 | 2007-149760 | 2007-208133 | 2007-178915 | 2007-334325 |
| 2007-310091 | 2007-116137 | 2007-088219 | 2007-207883 | 2007-013130 |
| 2005-302508 | 2008-218784 | 2008-227350 | 2008-227351 | 2008-244067 |
| 2008-267814 | 2008-270405 | 2008-277675 | 2008-277676 | 2008-282840 |
| 2008-283029 | 2008-288305 | 2008-288419 | 2008-300720 | 2008-300721 |
| 2009-4213 | 2009-10001 | 2009-16526 | 2009-21334 | 2009-26933 |
| 2008-147507 | 2008-159770 | 2008-159771 | 2008-171568 | 2008-198388 |
| 2008-218096 | 2008-218264 | 2008-224916 | 2008-235224 | 2008-235467 |
| 2008-241987 | 2008-251274 | 2008-251275 | 2008-252046 | 2008-277428 |

TABLE 2

| | | | | |
|---|---|---|---|---|
| 2006/001461 | 2006/088059 | 2006/098333 | 2006/098336 | 2006/098338 |
| 2006/098335 | 2006/098334 | 2007/001008 | | |

EXAMPLES

The present invention will be described more specifically below with reference to Examples. Materials, amounts, ratios, treatment contents, treatment procedures, and the like, used in Examples, may be appropriately changed without departing from the scope of the present invention. The following specific examples are therefore to be considered in all respects as illustrative and not restrictive.

First Example

In First Example, 100 first conductive sheets 12A and 100 second conductive sheets 12B were produced by the following treatments. The thin metal wires had a line width of 1 μm, and the small lattices 26 had a side length of 100 μm.

(Photosensitive Silver Halide Material)

An emulsion containing an aqueous medium, a gelatin, and silver iodobromochloride particles was prepared. The amount of the gelatin was 10.0 g per 150 g of Ag, and the silver iodobromochloride particles had an I content of 0.2 mol %, a Br content of 40 mol %, and an average spherical equivalent diameter of 0.1 μm.

$K_3Rh_2Br_9$ and $K_2IrCl_6$ were added to the emulsion at a concentration of $10^{-7}$ mol/mol-silver to dope the silver bromide particles with Rh and Ir ions. $Na_2PdCl_4$ was further added to the emulsion, and the resultant emulsion was subjected to gold-sulfur sensitization using chlorauric acid and sodium thiosulfate. The emulsion and a gelatin hardening agent were applied to a first transparent substrate 14A or a second transparent substrate 14B, both composed of a polyethylene terephthalate (PET) herein. The amount of the applied silver was 10 g/m², and the Ag/gelatin volume ratio was 2/1.

The PET support had a width of 30 cm, and the emulsion was applied thereto into a width of 25 cm and a length of 20 m. The both end portions having a width of 3 cm were cut off to obtain a roll photosensitive silver halide material having a width of 24 cm.

(Exposure)

An A4 (210 mm×297 mm) sized area of the first transparent substrate 14A was exposed in the pattern of the first conductive sheet 12A shown in FIGS. 1 and 3, and an A4 sized area of the second transparent substrate 14B was exposed in the pattern of the second conductive sheet 12B shown in FIGS. 1 and 4. The exposure was carried out using a parallel light from a light source of a high-pressure mercury lamp and patterned photomasks.

(Development Treatment)

Formulation of 1 L of Developer

| | |
|---|---|
| Hydroquinone | 20 g |
| Sodium sulfite | 50 g |
| Potassium carbonate | 40 g |
| Ethylenediaminetetraacetic acid | 2 g |
| Potassium bromide | 3 g |
| Polyethylene glycol 2000 | 1 g |
| Potassium hydroxide | 4 g |
| pH | Controlled at 10.3 |

Formulation of 1 L of Fixer

| | |
|---|---|
| Ammonium thiosulfate solution (75%) | 300 ml |
| Ammonium sulfite monohydrate | 25 g |
| 1,3-Diaminopropanetetraacetic acid | 8 g |
| Acetic acid | 5 g |
| Aqueous ammonia (27%) | 1 g |
| pH | Controlled at 6.2 |

The exposed photosensitive material was treated with the above treatment agents under the following conditions using an automatic processor FG-710PTS manufactured by FUJIFILM Corporation. A development treatment was carried out at 35° C. for 30 seconds, a fixation treatment was carried out at 34° C. for 23 seconds, and then a water washing treatment was carried out for 20 seconds at a water flow rate of 5 L/min.

Comparative Example 100 first comparative conductive sheets corresponding to the first conductive sheet 12A and 100 second comparative conductive sheets corresponding to the second conductive sheet 12B were produced in accordance with FIG. 7(a) of International Publication No. WO 2010/013679. The thin metal wires had a line width of 1 µm, and the smallest lattices had a side length of 100 µm.

(Evaluation Method)

Before the first conductive sheet 12A (the first comparative conductive sheet) was stacked on the second conductive sheet 12B (the second comparative conductive sheet) to produce a conductive sheet laminate, the resistance value between both ends of the conductive pattern formed on each conductive sheet was measured by a circuit tester. Each conductive sheet had a plurality of the conductive patterns, and the resistance values of all the conductive patterns were measured.

When the resistance value measured by the circuit tester was 1 MΩ or more, at least one of a plurality of connections (for connecting the large lattices) in the conductive pattern was judged to be completely broken. Meanwhile, when the resistance value measured by the circuit tester was less than 1 MΩ, the connections in the conductive pattern were judged to be not broken.

(Evaluation Result)

In Example, in all the first conductive sheets 12A, breakage of the first connection 28A was not detected. Furthermore, in all the second conductive sheets 12B, breakage of the second connection 28B was not detected. In Comparative Example, in 12 first comparative conductive sheets, the first connection was broken. Furthermore, in 13 second comparative conductive sheets, the second connection was broken.

Thus, in Comparative Example, the connection of the conductive pattern was often completely broken in the conductive sheet production process. In contrast, in Example, the complete breakage of the first connection 28A and the second connection 28B could be prevented.

Second Example

Conductive sheet laminates of Examples 1 to 9 were produced respectively. The surface resistance and the transmittance of each conductive sheet were measured, and the moire and the visibility of each conductive sheet were evaluated. The components, measurement results, and evaluation results of Examples 1 to 9 are shown in Table 3.

The first conductive sheets 12A and the second conductive sheets 12B of Examples 1 to 9 were produced in the same manner as First Example.

Example 1

In the first conductive sheet 12A and the second conductive sheet 12B produced in Example 1, the conductive portions (the first conductive patterns 18A and the second conductive patterns 18B) had a line width of 1 µm, the small lattices 26 had a side length of 50 µm, and the large lattices (the first large lattices 24A and the second large lattices 24B) had a side length of 3 mm.

Example 2

The first conductive sheet 12A and the second conductive sheet 12B of Example 2 were produced in the same manner as Example 1 except that the small lattices 26 had a side length of 100 µm.

Example 3

The first conductive sheet 12A and the second conductive sheet 12B of Example 3 were produced in the same manner as Example 1 except that the conductive portions had a line width of 3 µm, the small lattices 26 had a side length of 150 µm, and the large lattices had a side length of 4 mm.

Example 4

The first conductive sheet 12A and the second conductive sheet 12B of Example 4 were produced in the same manner as Example 1 except that the conductive portions had a line width of 4 μm, the small lattices 26 had a side length of 210 μm, and the large lattices had a side length of 5 mm.

Example 5

The first conductive sheet 12A and the second conductive sheet 12B of Example 5 were produced in the same manner as Example 1 except that the conductive portions had a line width of 5 μm, the small lattices 26 had a side length of 250 μm, and the large lattices had a side length of 5 mm.

Example 6

The first conductive sheet 12A and the second conductive sheet 12B of Example 6 were produced in the same manner as Example 1 except that the conductive portions had a line width of 8 μm, the small lattices 26 had a side length of 300 μm, and the large lattices had a side length of 6 mm.

Example 7

The first conductive sheet 12A and the second conductive sheet 12B of Example 7 were produced in the same manner as Example 1 except that the conductive portions had a line width of 9 μm, the small lattices 26 had a side length of 300 μm, and the large lattices had a side length of 10 mm.

Example 8

The first conductive sheet 12A and the second conductive sheet 12B of Example 8 were produced in the same manner as Example 1 except that the conductive portions had a line width of 10 μm, the small lattices 26 had a side length of 400 μm, and the large lattices had a side length of 10 mm.

Example 9

The first conductive sheet 12A and the second conductive sheet 12B of Example 9 were produced in the same manner as Example 1 except that the conductive portions had a line width of 15 μm, the small lattices 26 had a side length of 500 μm, and the large lattices had a side length of 10 mm.

(Surface Resistance Measurement)

In each of the first conductive sheets 12A and the second conductive sheets 12B, the surface resistivity values of optionally selected 10 areas were measured by LORESTA GP (Model No. MCP-T610) manufactured by Dia Instruments Co., Ltd. utilizing an in-line four-probe method (ASP), and the average of the measured values was obtained to evaluate the detection accuracy.

(Transmittance Measurement)

The transmittance of each of the first conductive sheets 12A and the second conductive sheets 12B was measured by a spectrophotometer to evaluate the transparency.

(Moire Evaluation)

In each of Examples 1 to 9, the first conductive sheet 12A was stacked on the second conductive sheet 12B to obtain a first conductive sheet laminate 10A. The first conductive sheet laminate 10A was attached to a display screen of a liquid crystal display device to obtain a touch panel 100. The touch panel 100 was fixed to a turntable, and the liquid crystal display device was operated to display a white color. The moire of the first conductive sheet laminate 10A was visually observed and evaluated while turning the turntable within a bias angle range of −45° to +45°.

The moire was observed at a distance of 1.5 m from the display screen of the liquid crystal display device. The first conductive sheet laminate 10A was evaluated as "Excellent" when the moire was not visible, as "Fair" when the moire was slightly visible to an acceptable extent, or as "Poor" when the moire was highly visible.

(Visibility Evaluation)

When the touch panel 100 was fixed to the turntable and the liquid crystal display device was operated to display the white color, before the moire evaluation, whether a thickened line or a black point was formed or not on the touch panel 100 and whether boundaries of the first large lattices 24A and the second large lattices 24B in the touch panel 100 were visible or not were observed by the naked eye.

TABLE 3

|  | Line width of conductive portion (μm) | Side length of small lattice (μm) | Side length of large lattice (mm) | Surface resistance (Ω/sq) | Transmittance (%) | Moire evaluation | Visibility evaluation |
|---|---|---|---|---|---|---|---|
| Example 1 | 1 | 50 | 3 | 55 | 85 | Excellent | Excellent |
| Example 2 | 1 | 100 | 3 | 55 | 86 | Excellent | Excellent |
| Example 3 | 3 | 150 | 4 | 55 | 86 | Excellent | Excellent |
| Example 4 | 4 | 210 | 5 | 50 | 87 | Excellent | Excellent |
| Example 5 | 5 | 250 | 5 | 40 | 88 | Excellent | Excellent |
| Example 6 | 8 | 300 | 6 | 50 | 87 | Excellent | Excellent |
| Example 7 | 9 | 300 | 10 | 45 | 86 | Excellent | Excellent |
| Example 8 | 10 | 400 | 10 | 40 | 86 | Excellent | Excellent |
| Example 9 | 15 | 500 | 10 | 38 | 85 | Fair | Fair |

As shown in Table 3, of Examples 1 to 9, the conductive sheets of Examples 1 to 8 were excellent in the conductivity, transmittance, moire, and visibility. The conductive sheets of Example 9 were inferior to those of Examples 1 to 8 in the moire and visibility evaluation, but the moire was only slightly visible to an acceptable extent, and the image on the display device was not deteriorated.

Third Example

A projected capacitive touch panel was produced using each of the first conductive sheets 12A and the second conductive sheets 12B of Examples 1 to 9 in Second Example. The produced touch panel had no highly visible moire. When the touch panel was operated by a finger touch, it exhibited a high response speed and an excellent detection sensitivity. Furthermore, when two or more points were touched, the touch panel exhibited the same excellent properties. Thus, it was confirmed that the touch panel was capable of multi-touch detection.

It is to be understood that the conductive sheet of the present invention and the capacitive touch panel using the sheet are not limited to the above embodiments, and various changes and modifications may be made therein without departing from the scope of the present invention.

What is claimed is:

1. A conductive sheet comprising a substrate, a first conductive part formed on one main surface of the substrate, and a second conductive part formed on another main surface of the substrate, wherein
the first conductive part contains two or more first conductive patterns that each contain two or more first sensing sections electrically connected in series in a first direction by a first connection, the two or more first conductive patterns being arranged in a second direction perpendicular to the first direction such that the two or more first conductive patterns are electrically isolated from each other,
the second conductive part contains two or more second conductive patterns that each contain two or more second sensing sections electrically connected in series in the second direction by a second connection, the two or more second conductive patterns being arranged in the first direction such that the two or more second conductive patterns are electrically isolated from each other,
the first sensing sections and the second sensing sections each contain a combination of two or more small lattices,
the first conductive patterns are arranged adjacent to the second conductive patterns as viewed from above,
the first connection and the second connection are arranged facing each other with the substrate interposed therebetween,
the first sensing sections are electrically connected to each other via three or more connection paths in the first connection, and
the second sensing sections are electrically connected to each other via three or more connection paths in the second connection.

2. The conductive sheet according to claim 1, wherein
the first connection contains three or more conductive wires connecting one or more vertices of the small lattices in one first sensing section and one or more vertices of the small lattices in another first sensing section, and
the second connection contains three or more conductive wires connecting one or more vertices of the small lattices in one second sensing section and one or more vertices of the small lattices in another second sensing section.

3. The conductive sheet according to claim 1, wherein
the first connection contains a first conductive wire portion and a second conductive wire portion connecting one or more vertices of the small lattices in one first sensing section and one or more vertices of the small lattices in another first sensing section, a third conductive wire portion connecting another vertex of the small lattices in the one first sensing section and the first conductive wire portion, and a fourth conductive wire portion connecting another vertex of the small lattices in the other first sensing section and the second conductive wire portion, and
the second connection contains a fifth conductive wire portion and a sixth conductive wire portion connecting one or more vertices of the small lattices in one second sensing section and one or more vertices of the small lattices in another second sensing section, a seventh conductive wire portion connecting another vertex of the small lattices in the one second sensing section and the fifth conductive wire portion, and an eighth conductive wire portion connecting another vertex of the small lattices in the other second sensing section and the sixth conductive wire portion.

4. The conductive sheet according to claim 1, wherein
the first conductive part further contains a first auxiliary pattern containing a plurality of first auxiliary wires around a side of the first sensing sections,
the second conductive part further contains a second auxiliary pattern containing a plurality of second auxiliary wires around a side of the second sensing sections, and
the first auxiliary pattern and the second auxiliary pattern overlap with each other to form a combined pattern between the first conductive patterns and the second conductive patterns as viewed from above.

5. The conductive sheet according to claim 4, wherein the combined pattern contains a combination of two or more small lattices.

6. The conductive sheet according to claim 1, wherein the first sensing section and the second sensing section have substantially the same size or different sizes.

7. The conductive sheet according to claim 1, wherein the first sensing section comprises a substantially square large lattice, and the second sensing section comprises a substantially rectangular large lattice.

8. A conductive sheet comprising a substrate and a conductive part formed on a main surface of the substrate, wherein
the conductive part contains two or more conductive patterns that each contain two or more sensing sections composed of a thin metal wire electrically connected in series in a first direction by a connection composed of a thin metal wire, the two or more conductive patterns being arranged in a second direction perpendicular to the first direction such that the two or more conductive patterns are electrically isolated from each other,
the sensing sections each contain a combination of two or more small lattices, and
the sensing sections are electrically connected via three or more connection paths in the connection.

9. The conductive sheet according to claim 8, wherein when Na represents the number of the thin metal wires extending from contact points between one sensing section and the connection into the connection, Nb represents the number of the thin metal wires extending between a plurality of intersection points in the connection, Nc represents the number of the thin metal wires extending from contact points between another adjacent sensing section and the connection into the connection, and N represents the number of the connection paths between the two sensing sections, the conductive sheet satisfies $N=Na \times (Nb+Nc-1)$.

10. The conductive sheet according to claim 8, wherein
the connection contains a quadrangular portion arranged in a predetermined connection direction between the adjacent two sensing sections, and
the quadrangular portion contains a first quadrangular portion having thin metal wires opposing to each other at a distance La and a second quadrangular portion having thin metal wires opposing to each other at a distance Lb, and satisfies La>Lb.

11. The conductive sheet according to claim 10, wherein the distance Lb is equal to a side length of the small lattices.

12. The conductive sheet according to claim 10, wherein the quadrangular portion satisfies $1.2 \times Lb \leq La \leq 3.0 \times Lb$.

13. The conductive sheet according to claim 10, wherein the quadrangular portion satisfies La=2×Lb.

14. The conductive sheet according to claim 10, wherein the first quadrangular portion is arranged on each side of the second quadrangular portion.

15. The conductive sheet according to claim 8, wherein the connection contains a protrusion composed of a thin metal wire perpendicularly extending from a side, the length of the side being 3 or more times a side length of the small lattices.

16. The conductive sheet according to claim 15, wherein the protrusion extends toward an inside of the connection.

17. The conductive sheet according to claim 15, wherein the protrusion extends outward from the connection.

18. A conductive sheet comprising a substrate, a first conductive part formed on one main surface of the substrate, and a second conductive part formed on the other main surface of the substrate, wherein
the first conductive part contains two or more first conductive patterns that each contain two or more first sensing sections connected by a first connection, the two or more first sensing sections being arranged in the second direction perpendicular to the first direction such that the two or more first sensing sections are electrically isolated from each other,
the second conductive part contains two or more second conductive patterns that each contain two or more second sensing sections connected by a second connection, the two or more second sensing sections being arranged in the first direction such that the two or more second sensing sections are electrically isolated from each other,
the first conductive patterns and the second conductive patterns are approximately perpendicularly crossed on the connections,
the first conductive patterns and the second conductive patterns are composed of a thin wire pattern having a line width of 15 μm or less,
the first sensing sections are electrically connected via three or more connection paths in the first connection, and
the second sensing sections are electrically connected via three or more connection paths in the second connection.

19. A capacitive touch panel comprising a conductive sheet comprising a substrate, a first conductive part formed on one main surface of the substrate, and a second conductive part formed on another main surface of the substrate, wherein the first conductive part contains two or more first conductive patterns that each contain two or more first sensing sections electrically connected in series in a first direction by a first connection, the two or more first conductive patterns being arranged in a second direction perpendicular to the first direction such that the two or more first conductive patterns are electrically isolated from each other, the second conductive part contains two or more second conductive patterns that each contain two or more second sensing sections electrically connected in series in the second direction by a second connection, the two or more second conductive patterns being arranged in the first direction such that the two or more second conductive patterns are electrically isolated from each other, the first sensing sections and the second sensing sections each contain a combination of two or more small lattices, the first conductive patterns are arranged adjacent to the second conductive patterns as viewed from above, the first connection and the second connection are arranged facing each other with the substrate interposed therebetween, the first sensing sections are electrically connected to each other via three or more connection paths in the first connection, and the second sensing sections are electrically connected to each other via three or more connection paths in the second connection.

20. A capacitive touch panel comprising a conductive sheet comprising a substrate and a conductive part formed on a main surface of the substrate, wherein the conductive part contains two or more conductive patterns that each contain two or more sensing sections composed of a thin metal wire electrically connected in series in a first direction by a connection composed of a thin metal wire, the two or more conductive patterns being arranged in a second direction perpendicular to the first direction such that the two or more conductive patterns are electrically isolated from each other, the sensing sections each contain a combination of two or more small lattices, and the sensing sections are electrically connected via three or more connection paths in the connection.

* * * * *